(12) United States Patent
Xia et al.

(10) Patent No.: US 11,838,957 B2
(45) Date of Patent: Dec. 5, 2023

(54) NSTR MLD CHANNEL ACCESS WITH SHARED TXOP

(71) Applicants: SONY GROUP CORPORATION, Tokyo (JP); SONY CORPORATION OF AMERICA, New York, NY (US)

(72) Inventors: Qing Xia, San Jose, CA (US); Mohamed Abouelseoud, Burlingame, CA (US); Liangxiao Xin, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 28 days.

(21) Appl. No.: 17/551,034

(22) Filed: Dec. 14, 2021

(65) Prior Publication Data
US 2022/0312506 A1    Sep. 29, 2022

Related U.S. Application Data

(60) Provisional application No. 63/166,316, filed on Mar. 26, 2021.

(51) Int. Cl.
*H04W 74/08* (2009.01)
*H04B 1/525* (2015.01)
(Continued)

(52) U.S. Cl.
CPC ........ *H04W 74/0891* (2013.01); *H04B 1/525* (2013.01); *H04L 27/2662* (2013.01); *H04W 72/12* (2013.01)

(58) Field of Classification Search
CPC .. H04W 74/0891; H04W 72/12; H04B 1/525; H04L 27/2662; H04L 27/2602
See application file for complete search history.

(56) References Cited

U.S. PATENT DOCUMENTS

2020/0260488 A1    8/2020 Cherian
2021/0212118 A1*   7/2021 Lu ..................... H04W 74/0816
(Continued)

FOREIGN PATENT DOCUMENTS

CN    112512135 A    3/2021
EP    3793313 A1    3/2021

OTHER PUBLICATIONS

Liangxiao Xin (Sony): "Channel Access for STR AP MLD with non-STR non-AP MLD", IEEE Draft; 11-20-0974-04-00BE-CHANNEL-ACCESS-FOR-STR-AP-MLD-WITH-NON-STR-NON-AP-MLD,IEEE-SA Mentor, Piscataway, NJ USA, vol. 082.11 EHT: 802.11be, No. 4 Jan. 29, 2021(Jan. 29, 2021), p. 1-16, XP068176084.

(Continued)

*Primary Examiner* — Yaotang Wang
(74) *Attorney, Agent, or Firm* — O'BANION & RITCHEY LLP; John P. O'Banion

(57) ABSTRACT

Enhanced Multi-Link Operation (MLO) is performed in this protocol in which non-simultaneous transmit/receive (NSTR) Multi-Link Devices (MLDs) cooperate with each other in sharing a portion of their available Transmit Opportunity (TXOP) toward reducing contention and competition for channel access across the group of cooperating MLDs. The shared TXOP is performed at an MLD level after all links for an NSTR MLD are obtained by stations which do not need to be in part of the same NSTR MLD, thus synchronized transmissions and receptions are performed which eliminate in-device coexistence (IDC) interference in any single NSTR MLD. The time gap while awaiting for all links to be obtained, is also made use of for performing transmission(s) toward increasing data throughput.

28 Claims, 60 Drawing Sheets

(51) Int. Cl.
*H04L 27/26* (2006.01)
*H04W 72/12* (2023.01)

(56) References Cited

U.S. PATENT DOCUMENTS

2021/0321455 A1* 10/2021 Zhu .................... H04W 74/008
2022/0225406 A1* 7/2022 Kim ................. H04W 74/0816

OTHER PUBLICATIONS

Liuming Lu (OPPO): "AP Assisted Multi-link Synchronous Transmission", IEEE Draft; 11-21-0361-00-00BE-AP-ASSISTED-MULTI-LINK-SYNCHRONOUS-TRANSMISSION, IEEE-SA Mentor, Piscataway, NJ USA, vol. 802.11 EHT; 802.11be Mar. 3, 2021 (Mar. 3, 2021), pp. 1-12, XP068178973.
Loginov, Vyascheslav et al., "On throughput estimation with TXOP sharing in IEEE 802.11 ah networks," 2016 IEEE International Black Sea Conference on Communications and Networking (BlackSeaCom), Varna, Bulgaria, 2016, pp. 1-5.

\* cited by examiner

NSTR MLD CHANNEL ACCESS WITH SHARED TXOP

CROSS-REFERENCE TO RELATED APPLICATIONS

This application claims priority to, and the benefit of, U.S. provisional patent application Ser. No. 63/166,316 filed on Mar. 26, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to sharing transmit opportunities (TXOP) on a wireless multi-link device (MLD) station, and more particularly to sharing a TXOP on a non-simultaneous transmit/receive (NSTR) MLD.

2. Background Discussion

In many current IEEE 802.11 wireless Local Area Network ((WLANs) CSMA/CA is used by stations (STAs) to contend for channel access on a single link (i.e., frequency band). Once the STA obtains the channel, the STA is denoted as the Transmission Opportunity (TXOP) holder, as it reserves the TXOP on the single link. The TXOP holder doesn't need to re-contend for channel access during its TXOP.

However, there are issues with TXOP sharing within multi-link operations (MLOs) in which channels are accessed on more than one link.

Accordingly, a need exists for an IEEE802.11 WLAN protocol which overcomes these MLO TXOP sharing issues. The present disclosure fulfills that need and provides additional benefits.

BRIEF SUMMARY

An 802.11 WLAN protocol is described which allows sharing Transmit Opportunities (TXOPs) during Multi-Link Operations (MLO) among NSTR MLDs, so that Non-Simultaneous Transmit/Receive (NSTR) Multi-Link Devices (MLDs) may cooperate in sharing a partial TXOP with other stations (STAs), or join a shared TXOP from other STAs to reduce contention and competition for channel access for all cooperating NSTR MLDs. The ability to use a shared TXOP should reduce delays caused by channel contention and be of particular benefit for improving worst-case performance.

Because of an In-Device Coexistence (IDC) interference issue in NSTR MLDs, the present disclosure operates the shared TXOP among NSTR MLDs at the MLD level. In this case, stations affiliated with the same NSTR MLD on different links of a NSTR link pair perform synchronized transmission and reception, and thus shall not experience IDC interference in any NSTR MLD. Operating a shared TXOP at an MLD level makes the shared TXOP scheduling both simple and efficient; yet it requires all links of a NSTR link pair to be idle so that they may be accessed simultaneously by the shared TXOP holder MLD.

To achieve the synchronized channel access on different links of a NSTR link pair for a shared TXOP holder MLD, the present disclosure does not insist on having all links of the NSTR link pair obtained by the stations affiliated with the same NSTR MLD (i.e., shared TXOP holder MLD). Instead, the present disclosure allows the shared TXOP holder to initiate a shared TXOP at the MLD level insofar as all links of the NSTR link pair are have been gained by an STA, regardless of whether the STA is affiliated with the same NSTR MLD (i.e., shared TXOP holder MLD). In this case, the present disclosure can achieve more rapid (faster) channel access to initiate shared TXOP among MLDs.

In order to efficiently utilize the time gap, between the time when one link of a NSTR link pair has been obtained until the time when all links of the NSTR link pair have been gained, the disclosure describes several methodologies to improve channel access efficiency over multiple NSTR links.

In addition, the disclosed methods determine the shared TXOP holder MLD if the links of the NSTR link pair are obtained by stations from different NSTR MLDs.

The disclosed methods are aimed at utilizing a shared TXOP in MLO systems and improving channel utilization efficiency for NSTR MLDs over multiple links, such as for use with applications involving, but not limited to, high Access Class (AC) traffic, such as under Enhanced Distributed Channel Access (EDCA). The disclosed methods can improve overall throughput and low latency performance, especially for worse-case scenarios.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a communications diagram of synchronized channel access at the MLD level with TXOP holders of the same MLD.

FIG. 5 is a communications diagram of synchronized channel access at the MLD level with TXOP holders of different MLDs.

FIG. 6 is a communications diagram of unsynchronized channel access at the station level without aligning the start of shared TXOP process.

FIG. 7 is a communications diagram of synchronized channel access at the station level which includes aligning the start of shared TXOP processes.

DETAILED DESCRIPTION

1. Introduction

Figure 1:
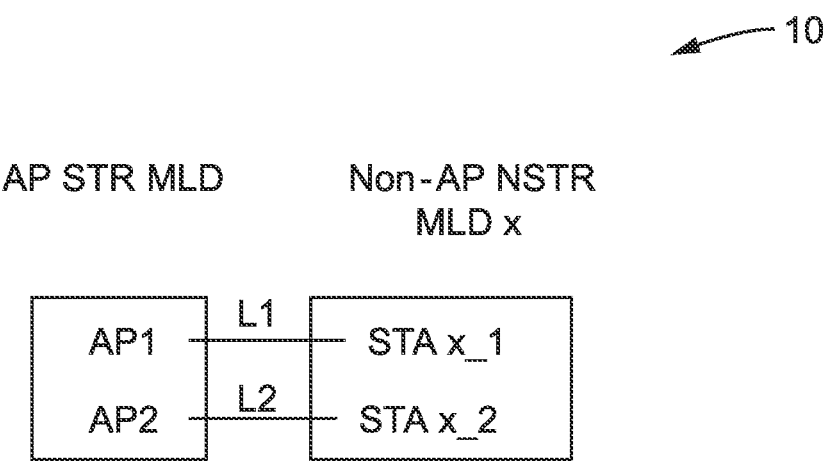
FIG. 1 is a generic topology of a link connection between an AP STR MLD and any non-AP NSTR MLD x for sharing a TXOP with cooperating NSTR MLDs.
Figure 1:
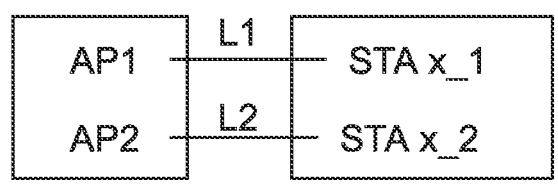

The present disclosure describes an IEEE 802.11 wireless local area network (WLAN) protocol which allows sharing transmit opportunities (TXOP) on a wireless multi-link device (MLD) station, which is configured for non-simultaneous transmit/receive (NSTR) MLD In our previous work, stations could cooperate with each other to share the obtained TXOP with multiple stations among UL transmission and DL transmission in the time or frequency domain, toward reducing contention delay and improving channel utilization efficiency.

In current wireless communication systems, multi-link devices (MLDs) are allowed to have more than one affiliated STA. An AP multi-Link device (AP MLD) is a MLD whose affiliated STAs are Access Points (APs). A non-AP Multi-Link device (non-AP MLD) is a MLD in which the affiliated STAs are non-AP STAs.

A MLD has at least one link pair of STAs. A STA affiliated with the MLD that performs transmitting (TX) or receiving (RX) on one link of the (NSTR) link pair can impact simultaneous TX or RX of another STA affiliated with the same MLD. The link pair of the MLD can be either Simultaneous Transmit and Receive (STR), or Non-Simultaneous Transmit and Receive (NSTR) as defined in IEEE 802.11be. A MLD having at least one NSTR link pair is denoted as NSTR MLD. Otherwise, a MLD without an NSTR link pair is denoted as an STR MLD. Due to the in-device coexistence (IDC) interference, one STA of the NSTR MLD may not receive a packet successfully on one link of the NSTR link pair while another STA of the same NSTR MLD is simultaneously transmitting a packet on another link of the NSTR link pair.

A transmission from a MLD STA on a NSTR link creates a CCA busy condition on this link and pauses the backoff counter of other STAs of a different MLD that are listening on the same NSTR link. At the same time, the transmission can also cause pausing of the backoff counter of other STAs of the same MLD STA that are listening on the other NSTR links due to the in-device coexistence interference. The Multi-Link Operation (MLO) presented in this disclosure supports a wireless protocol which increases channel access flexibility across multiple links to lower contention delay and increase efficiency for Real-Time Applications (RTAs).

Multi-link Operations (MLOs) are included in 802.11be which is directed to being Extremely High Throughput (EHT) with Multi-band/multi-channel aggregation and operation, multi-access point (AP) coordination and providing extensions to support low-latency traffic. The present disclosure is configured for providing enhanced MLO operations.

2. General Considerations

In the present disclosure MLDs cooperate with each other to share a portion of their TXOP (if available) with other MLDs or join the shared TXOP of other MLDs, thus reducing contention and competition for channel access for all cooperating MLDs. This MLO shared TXOP scheme provides numerous benefits and in particular can improve worst case performance.

It should be noted, however, that in performing MLO operations, the problem with IDC interference complicates channel access on different links of a NSTR link pair over that of single link channel access, and thus it may introduce channel access delays. It should be noted that when a station of a NSTR MLD initially obtains (grabs) a link it can not immediately initiate channel access for a shared TXOP over multiple links if another station of the same NSTR MLD is receiving a signal over the other link of the NSTR link pair.

Operating the shared TXOP at the MLD level makes the shared TXOP schedule simple and efficient. In this case, stations affiliated with the same NSTR MLD on different links of a NSTR link pair shall perform synchronized transmission and reception, and thus shall not experience IDC interference in any single NSTR MLD which should reduce the corresponding delay.

It can be time consuming and inefficient for a MLD to be required to access the multi-link channel and obtain all the links of the NSTR link pair, before starting the shared TXOP. To solve this issue, in the present disclosure the shared TXOP in MLD level can be initiated with the requirement being that all links of the NSTR link pair have been obtained, and this may be by stations that are not necessarily affiliated with the same NSTR MLD (i.e., shared TXOP holder MLD). In this case, the present disclosure can achieve faster channel access for initiating a shared TXOP among MLDs.

2.1. Issues with TXOP Sharing with MLOs

The above described benefits derive from the presented approach, which also addresses two additional issues which can arise with the basic approach.

Issue 1: possible introduction of a large time gap which starts when a first STA of the NSTR MLD first obtains a link (e.g., L1) of the NSTR link pair, until the time when another STA of the same/different NSTR MLD on another link (e.g., L2) counts down to zero and the shared TXOP can commence. The time gap duration should not be ignored, especially when using large contention window (CW) sizes, because this time gap represents a waste (loss) of channel access, and thus lowers overall throughput. The present disclosure addresses this time gap issue.

Issue 2: synchronization of shared TXOP scheduling is provided since the TXOP holder stations may be from different MLDs. However, in order to make the shared TXOP procedure simpler and more efficient among NSTR MLDs, the shared TXOP procedure is executed at the MLD level. Thus, a synchronization process is utilized between these NSTR MLDs to determine the shared TXOP holder MLD among the NSTR MLDs. The present disclosure addresses this synchronization issue.

2.2. Overcoming Time Gap Issues in TXOP Sharing in MLOs

In order to efficiently utilize the time gap between one link of a NSTR link pair having been obtained until all links of the NSTR link pair have been gained, several methodologies are proposed to improve channel utilization efficiency over multiple NSTR links.

If one link (L1) of the NSTR link pair is obtained by a STA and the other link (L2) of the NSTR link pair is not gained by any other STAs, then only the STA having the smallest BO value should continue counting down over L2 and the other stations from different MLDs shall utilize this BO period to transmit PPDU(s) over L1.

A modified RTS frame is transmitted on L1 by the station that wins channel access of L1. The modified RTS frame incorporates an indication of BO value for the other affiliated station of the same NSTR MLD on L2.

AP shall broadcast a SYN frame on L1 to indicate the received latest BO value counting down on L2.

After receiving a modified RTS frame or SYN frame sent from the AP on L1, the non-AP STAs respond with a SYN frame, either after an IFS time, or immediately after a SIFS slot in different frequency slots on L1. The SYN indicates the BO value of other affiliated stations of the same MLD that are counting down on L2.

The AP collects the BO info and decides on which station that shall continue/pause BO counting on L2 and the station that shall transmit/receive on L1 during a certain period and using certain frequency band. Then AP broadcasts this information with TX_req frame. The STAs are configured to perform the transmission/reception or BO counting/pausing based on the requirement indicated in the TX_req frame.

2.3. Overcoming Synchronization Issues in TXOP Sharing in MLOs

To address the synchronization issue of the shared TXOP, methodologies are proposed to determine the shared TXOP holder MLD to operate the shared TXOP at the MLD level to avoid IDC interference in any single NSTR MLD.

If the stations obtaining channel access over multiple links are from the same MLD, then this MLD shall automatically be the shared TXOP holder MLD.

If the stations obtaining channel access over multiple links are from different MLDs, then the AP MLD can perform as the shared TXOP holder MLD by directly initiating the shared TXOP process; or a non-AP MLD that contains the station which gained the last NSTR link can be the shared TXOP holder MLD. After this station receives the CTS frame, as the response of an immediately previously transmitted modified RTS frame, its affiliated NSTR MLD can initiate the shared TXOP process.

3. Motivation and Problem Statement

3.1. Motivation for Applying Shared TXOP in Cooperative MLOs

The value of using a shared TXOP among cooperative stations is still valid in MLO systems. More specifically, MLDs can cooperate with each other to share a portion of their TXOP (if available) to others, or join the shared TXOPs of other STAs to reduce contention and competition for channel access for all cooperating MLDs. Shared TXOP schemes provide numerous benefits and especially provide for improving worst case throughput performance.

Possible IDC interference in MLO systems complicate the channel access process on different links of a NSTR link pair and can introduce further access delays. The application of a shared TXOP among MLDs at the MLD level can eliminate IDC interference and thus can reduce the corresponding delay.

FIG. 1 illustrates a generic example 10 of example of link connection between an AP STR MLD and any non-AP NSTR MLD x for sharing a TXOP with cooperating NSTR MLDs. An AP STR MLD is shown with affiliated AP1 and AP2 STAs with links L1 and L2 with a non-AP MLD having affiliated STA x_1 and STA x_2. The shared TXOP scheduling stage can differ depending on different methodologies, and can be outside of the shared TXOP and implemented during link setup (a preconfigured semi-static scenario. By way of example and not limitation the following analysis is based on a topology with a single AP MLD.

Figure 2:
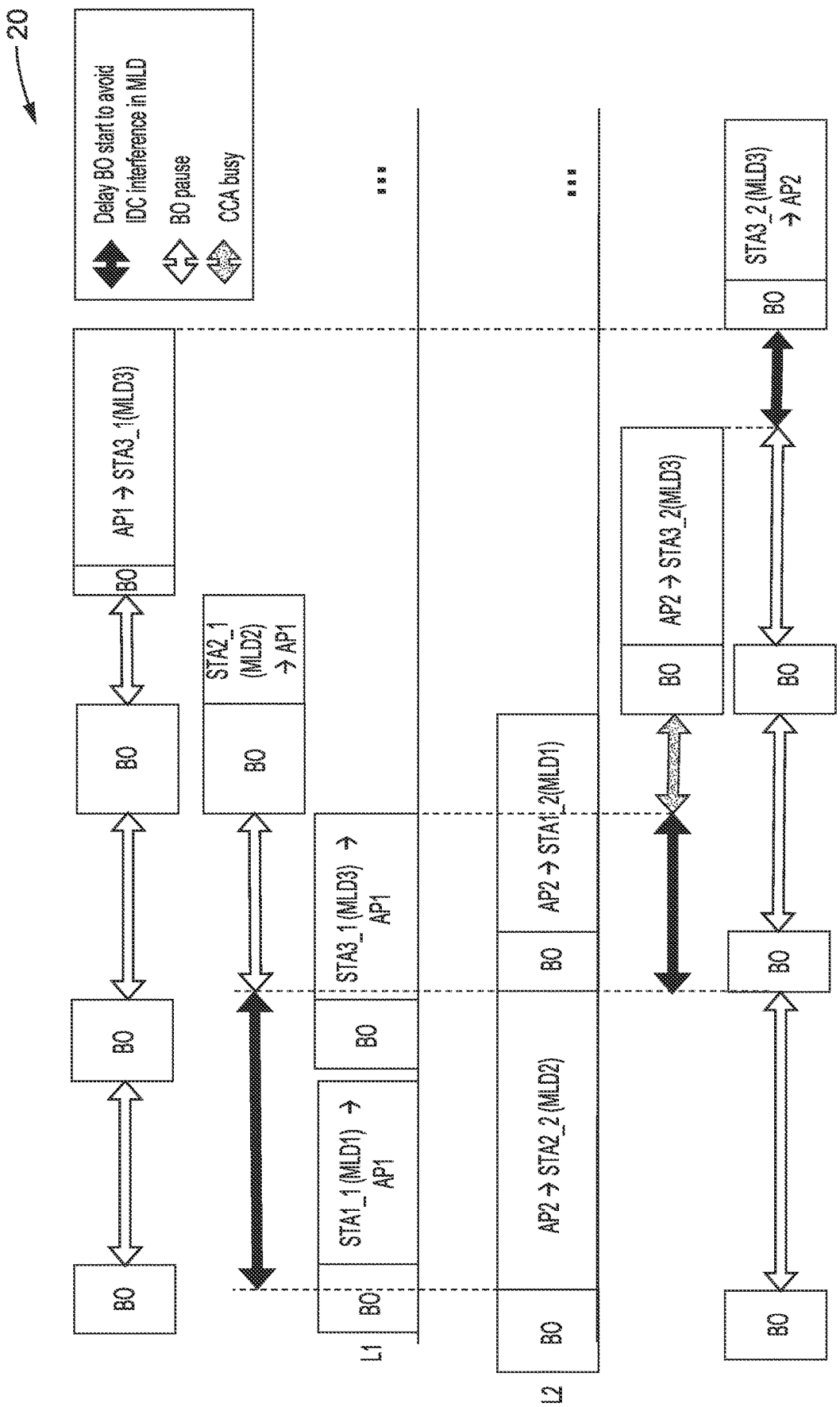
FIG. 2 is a communications diagram of simultaneous transmit (TX) and/or receive (Rx) operations among NSTR links without TXOP alignment and without sharing the TXOP.

FIG. 2 illustrates an example implementation of 20 of simultaneous TX and/or Rx among NSTR links without TXOP alignment and without sharing the TXOP.

The figure depicts channel access and delay of NSTR MLDs in a heavy contention scenario without showing implementation of a shared TXOP scheme. The solid arrows represent the delay of starting a backoff due to the limitation of IDC interference (e.g., for the solid arrow on L1, it means the backoff for UL transmission from STA2_1 of MLD2 to AP1 of AP STR MLD should not start within the dark arrow covered duration; as otherwise reception failures will arise in response to the simultaneous DL transmissions from AP2 of AP STR MLD to STA2_2 of MLD2 on L2. This is because of the IDC interference). The non-shaded arrows represent the delay cased by backoff pausing due to CCA busy and the shaded arrows represent the access/backoff starting delay due to CCA busy. Otherwise the backoffs (BO) are shown in the figure as well as various transmissions between the two MLDs.

This example shows that for a heavy contention scenario without shared TXOP, other than the backoff (BO) before each TXOP, each station may undergo a delay of BO to avoid IDC interference in its own MLD, and a further delay if another station gains the channel access during the BO counting down.

Figure 3:
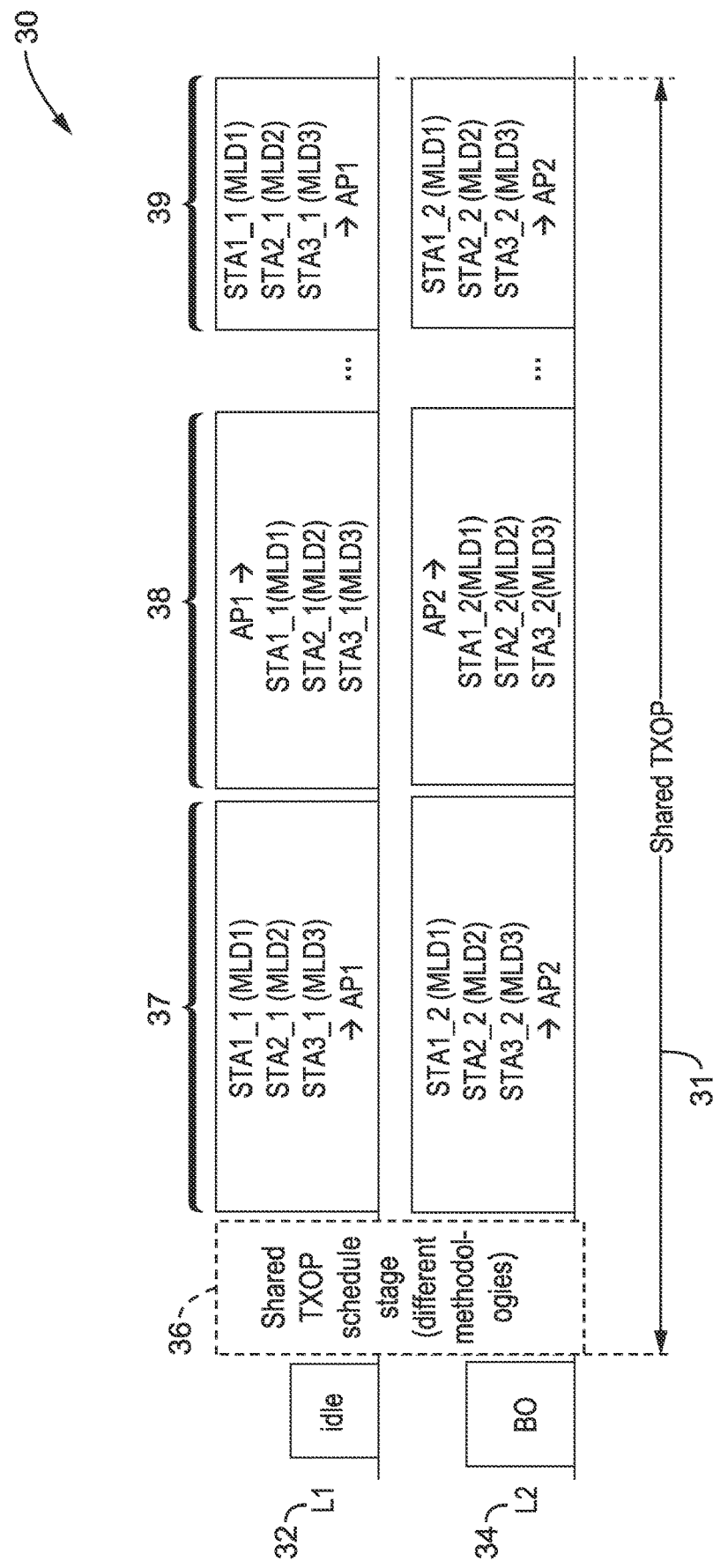
FIG. 3 is a communications diagram of simultaneous TX or Rx among NSTR links with a shared TXOP.

FIG. 3 illustrates an example embodiment 30 of simultaneous TX or Rx among NSTR links with a shared TXOP. The figure shows a generic sharing of the TXOP for cooperating NSTR MLDs. An idle state 32 for L1, and backoff (BO) 34 for L2 are shown preceding a shared TXOP schedule stage 36 that could differ depending on different methodologies, and could be outside of the shared TXOP and implemented during link setup, such as in a preconfigured semi-static scenario. Transmissions are seen as uplinks 37 and 39, as well as downlinks 38.

Comparing this figure with the heavy contention scenario without shared TXOP of FIG. 2, the following will be observed. Only one BO is required before the shared TXOP begins. Inside the shared TXOP, each station: (a) has no need of a backoff before accessing the channel; (b) there is no need to delay the backoff to avoid IDC interference.

An additional shared TXOP scheduling delay may apply at the beginning of the shared TXOP. As mentioned before, the shared TXOP is especially beneficial for improving worst-case performance, which otherwise could be subject to severe delays in heavy contention scenarios. Thus, as seen in the figure can make it worth undergoing the shared TXOP schedule delay, rather than requiring some stations to continue postponing their channel access for an indefinite period.

3.2. Problem Statement

Before starting a shared TXOP among cooperative MLDs, there is still an issue in the channel access process, especially for low priority access categories (ACs).

Due to the in-device coexistence (IDC) interference of the NSTR MLD, when a station first obtains a link (STA is denoted as TXOP holder), it cannot immediately initiate channel access for a shared TXOP over multiple links if another station of the same NSTR MLD is receiving signals over the other link of the NSTR link pair.

Figures 4, 5:
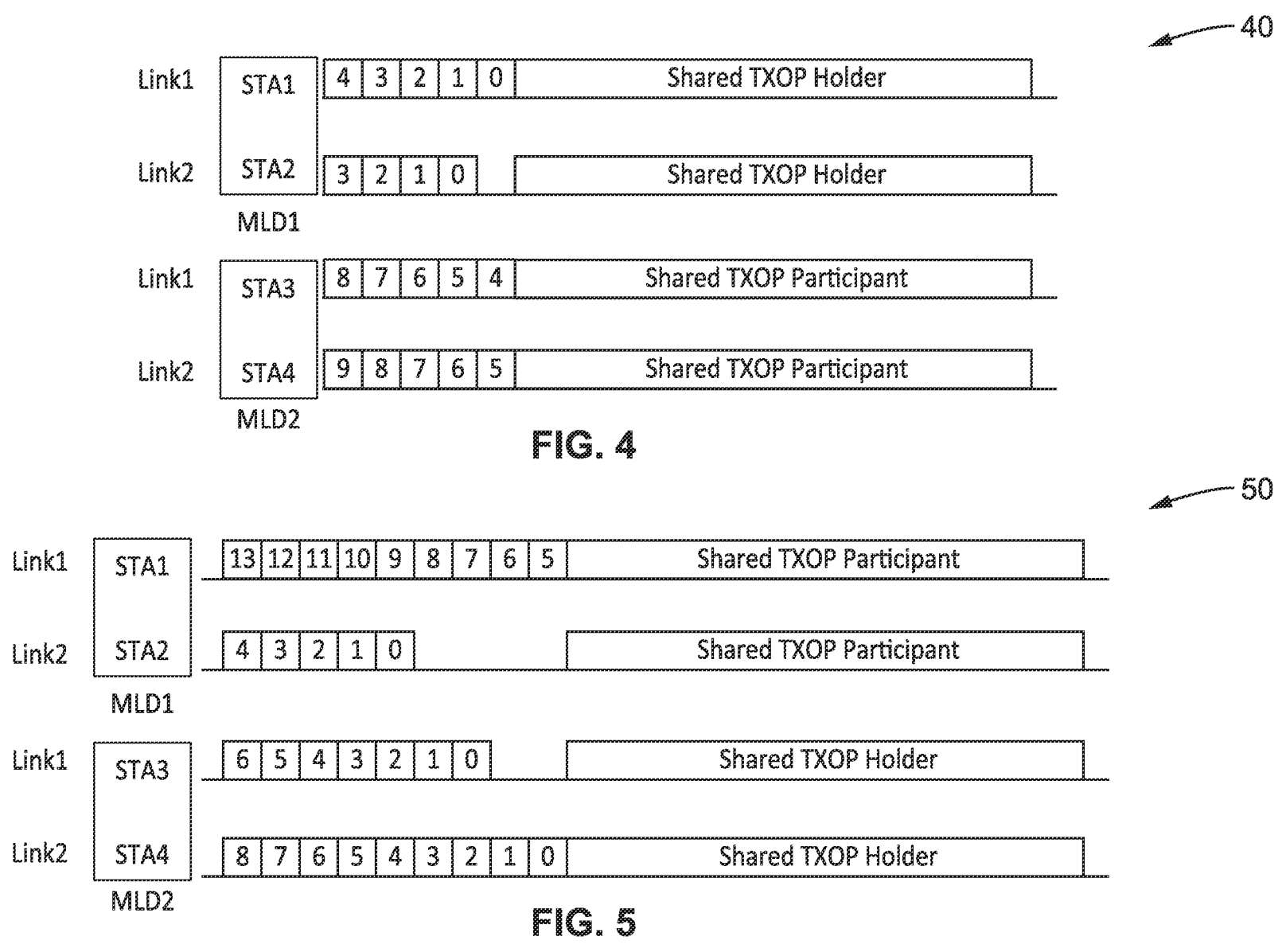

FIG. 4 illustrates an example 40 of synchronized channel access at the MLD level with TXOP holders of the same MLD. This figure depicts a case in which the MLD can wait until its affiliated stations obtain channel accesses over all links of the NSTR link pair before it initiates synchronized channel access over multiple links at the MLD level (obtained by stations affiliate with the same NSTR MLD) for the shared TXOP. The figure shows MLD1 having STA1 and STA2, and MLD2 having STA3 and STA4 which are all contending for synchronized channel access at the MLD level. It can be time consuming and inefficient for a MLD to be required to delay its channel access of the multi-link channel until after its affiliated stations have obtained channel accesses over all the links of the NSTR link pair. It can be seen that STA2 backoff has reached zero, but it still cannot access the channel and must wait for STA1 to complete its backoff.

FIG. 5 illustrates an example 50 of synchronized channel access at the MLD level with TXOP holders of different MLD. This figure depicts the same MLDs as shown in FIG. 4. In addition, this also wastes channel access opportunities for those stations (e.g., STA2) that has already gained an access opportunity, but is unable to use it due to the unsynchronized backoff (BO) counter of the affiliated stations. During this delay another MLD (e.g., MLD2) obtains the TXOP, wherein the first MLD (e.g., MLD1) has lost the opportunity to be the TXOP holder.

Figures 6, 7:
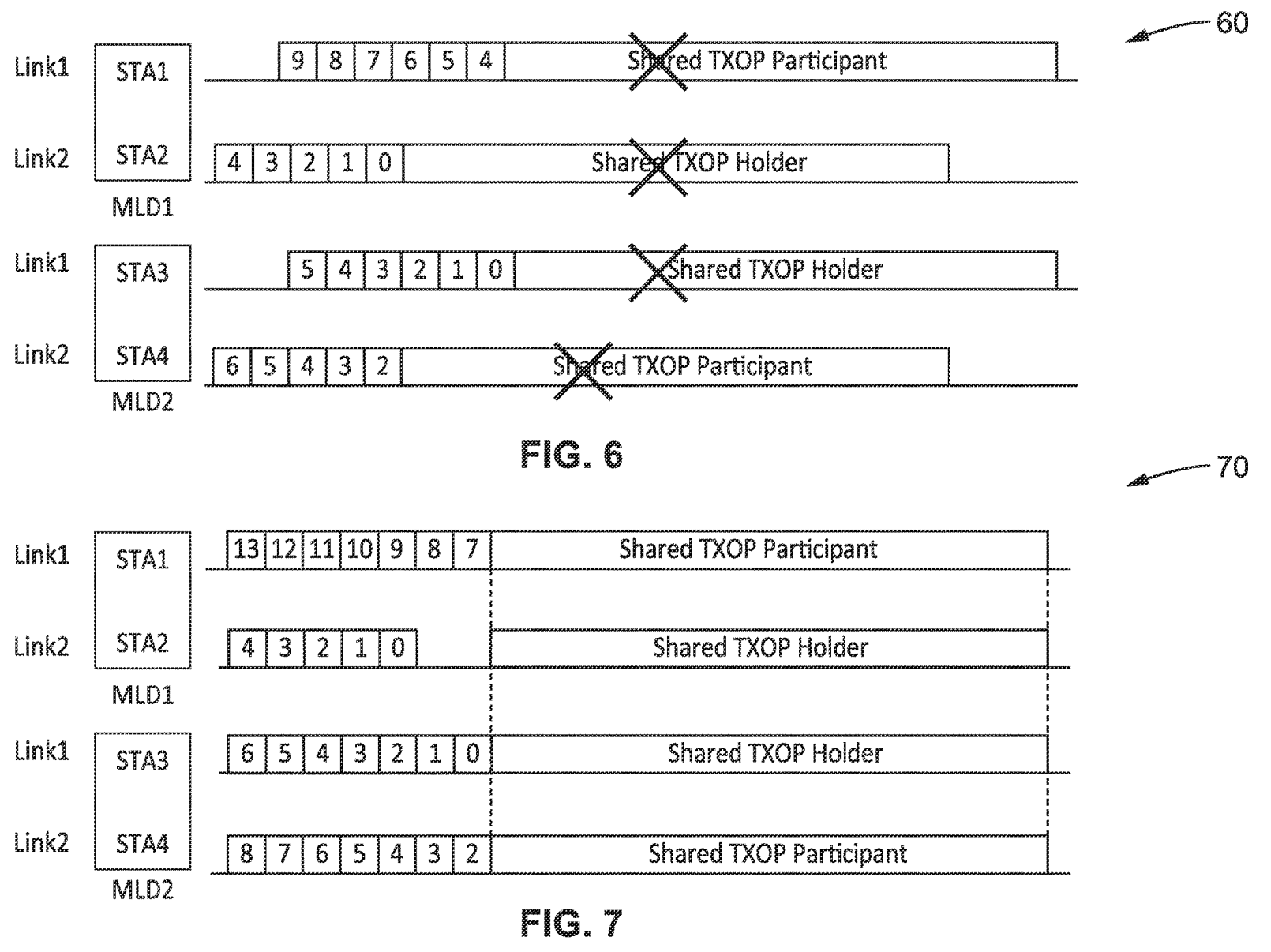

FIG. 6 illustrates an example 60 of unsynchronized channel access at the station level without aligning the start of the shared TXOP process. This figure depicts the same MLDs as shown in the previous figure. The ability to use unsynchronized channel access at the station level could avoid wasting of channel access opportunities; however without alignment of the starting of the shared TXOP over multi-link, failure of simultaneous TX and RX over multiple links can arise in the shared TXOP process due to IDC interference rendering this simple approach problematic.

FIG. 7 illustrates an example embodiment 70 of synchronized channel access at the station level which includes aligning the start of shared TXOP processes. The same MLDs are shown as in the previous figures.

Comparatively, the methodology of synchronized channel access at the station level, as obtained by stations not necessarily from the same NSTR MLD but while aligning the starting point of shared TXOPs (as in the figure) provides the possibility of implementing a shared TXOP at the MLD level which solves the IDC interference issue. Also, comparing this with the other methodology of synchronized channel access at MLD level (as shown in FIG. 5), this methodology supports faster channel access, which starts shared TXOP when both links of the NSTR link pair are obtained by stations that may not be affiliated with the same MLD.

However, two issues still exist based on this solution. (1) A first issue is the large time gap can be introduced which starts from one STA of the NSTR MLD that first grabs a link (e.g., L1) of the NSTR link pair to the start of the shared TXOP, when another STA of the same/different NSTR MLD on another link (e.g., L2) counts down to zero. The time gap duration can not be ignored when using large contention window (CW) sizes; otherwise a significant waste of channel access time arises. (2) A second issue is that synchronization of the shared TXOP scheduling is needed as the TXOP holder stations may be from different MLDs as is exemplified in FIG. 8.

Figure 8:
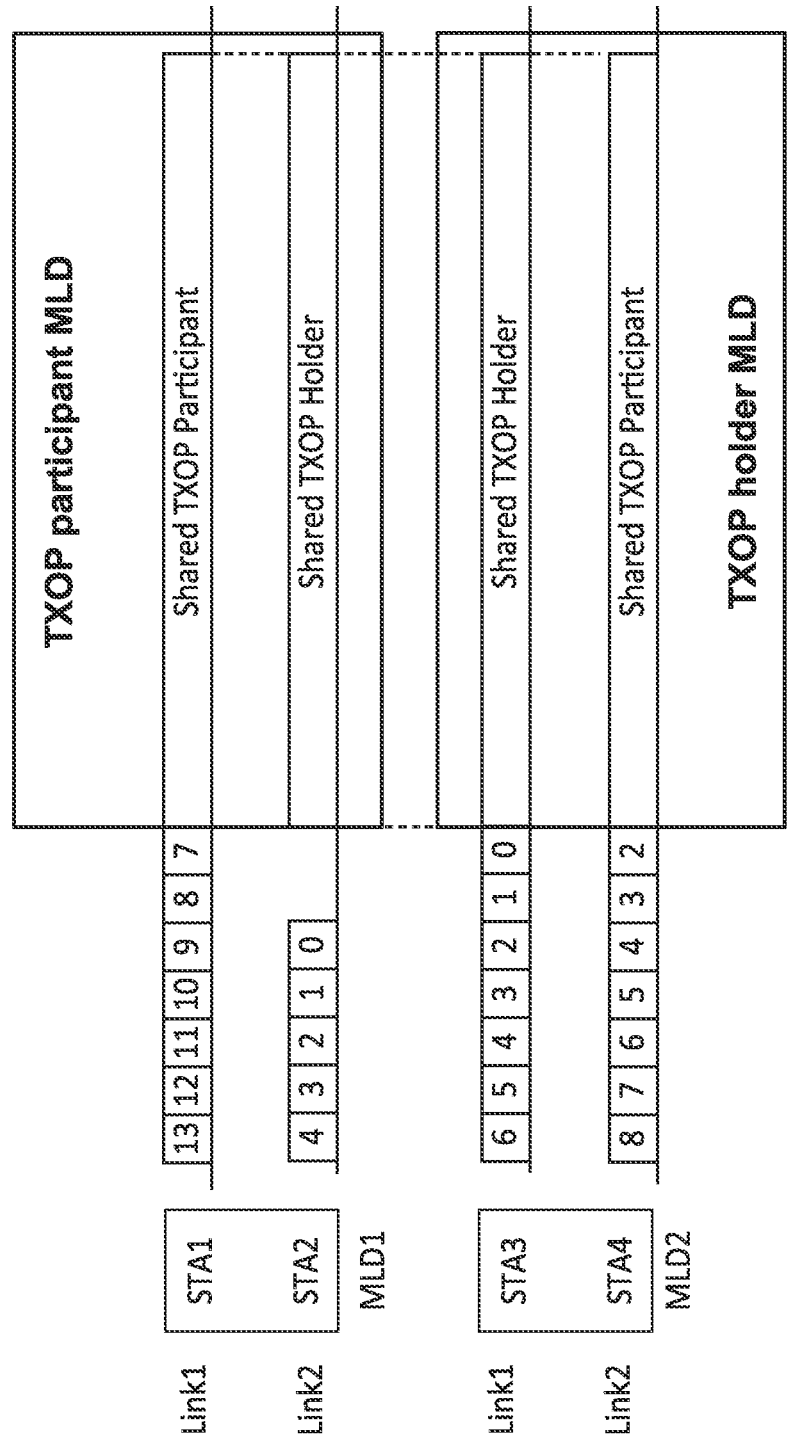
FIG. 8 is a communications diagram of synchronization among MLDs and determining the shared TXOP holder MLD.

FIG. 8 illustrates an example embodiment 90 showing synchronization among MLDs and determining the shared TXOP holder MLD. The same MLDs are shown as in the previous figures. The figure depicts performing the shared TXOP procedure by executing it at the MLD level, exemplified as a TXOP participant MLD. Thus, synchronization is needed amongst the MLDs to determine the shared TXOP holder MLD.

4. Contribution of the Present Disclosure

The present disclosure is a protocol for applying a shared TXOP in MLO systems among NSTR MLDs, so that the NSTR MLDs can cooperate with each other to share a portion of its TXOP with others or join the shared TXOP of others to reduce contention and competition for channel access by all cooperating NSTR MLDs. The application of a shared TXOP should reduce delays arising from channel contention and is especially beneficial for improving worst-case performance.

Because of the IDC interference issue in NSTR MLDs, the present disclosure operates the shared TXOP among NSTR MLDs at the MLD level. In this case, stations affiliated with the same NSTR MLD on different links of a NSTR link pair perform synchronized transmission and reception and thus are not subject to IDC interference in any NSTR MLD. Utilizing the shared TXOP at the MLD level makes the shared TXOP schedule simple and efficient; while requiring all links of a NSTR link pair to be idle for being accessed simultaneously by the shared TXOP holder MLD.

To achieve the synchronized channel access on different links of a NSTR link pair for shared TXOP holder MLD, instead of insisting on having all links of the NSTR link pair obtained by the stations affiliated with the same NSTR MLD (i.e., shared TXOP holder MLD), a methodology is utilized in which the shared TXOP holder can initiate a shared TXOP at the MLD level insofar as (as long as) all links of the NSTR link pair are gained by stations that need not be affiliated with the same NSTR MLD (i.e., shared TXOP holder MLD). Utilizing the disclosed TXOP sharing process can achieve faster channel access among MLDs.

In order to efficiently utilize the time gap between the time when one link of a NSTR link pair has been obtained until the time when all links of the NSTR link pair have been gained, several methodologies are described to improve channel access efficiency when using multiple NSTR links.

In addition, the disclosed method can determine the shared TXOP holder MLD if the links of the NSTR link pair are obtained by stations from different NSTR MLDs.

The disclosed methodologies are aimed at utilizing a shared TXOP in MLO systems toward improving channel utilization efficiency for NSTR MLDs over multiple links, which applies to applications that include, but are not limited to, traffic from high priority Access Classes (ACs). These methods improve overall throughput and low latency performance across a wide range, yet are especially beneficial for worst-case scenarios.

5. Hardware Embodiments

5.1. STA Hardware Setup

Figure 9:
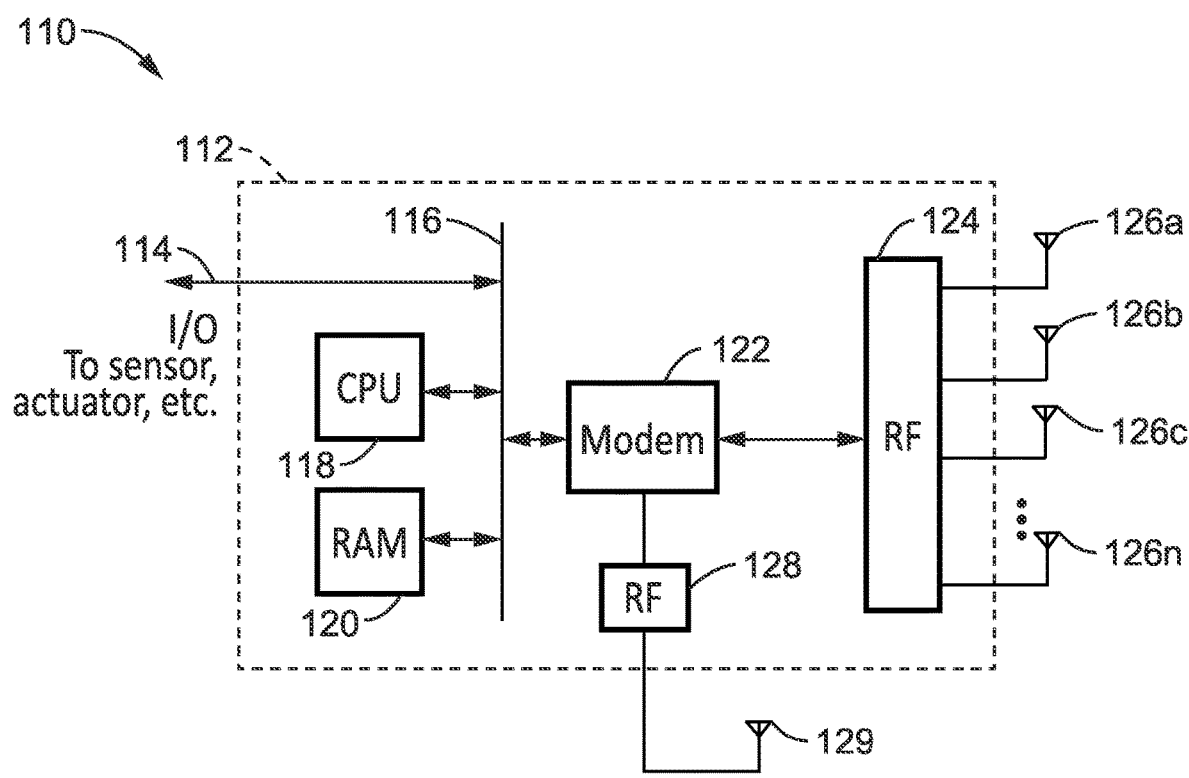
FIG. 9 is a hardware block diagram of wireless station hardware according to at least one embodiment of the present disclosure.

FIG. 9 illustrates an example embodiment 110 of STA hardware configured for executing the protocol of the present disclosure. An external I/O connection 114 preferably couples to an internal bus 116 upon which are connected a CPU (e.g., processor) 118 and memory (e.g., RAM) 120 for executing a program(s) which implement the communication protocol. The host machine accommodates at least one modem 122 to support communications coupled to at least one RF module 124, 128 each connected to one or multiple antennas 129, 126a, 126b, 126c through 126n. An RF module with multiple antennas (e.g., antenna array) allows for performing beamforming during transmission and reception. In this way, the STA can transmit signals using multiple sets of beam patterns.

Bus 114 allows connecting various devices to the CPU, such as to sensors, actuators and so forth. Instructions from memory 120 are executed on processor 118 to execute a program which implements the communication protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee and so forth), depending on what role it is performing in the current communication context. Thus, the STA HW is shown configured with at least one modem, and associated RF circuitry for providing communication on at least one band, such as the sub-6 GHz band, and/or a mmW band.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

5.2. NSTR MLD Device Hardware Setup

Figure 10:
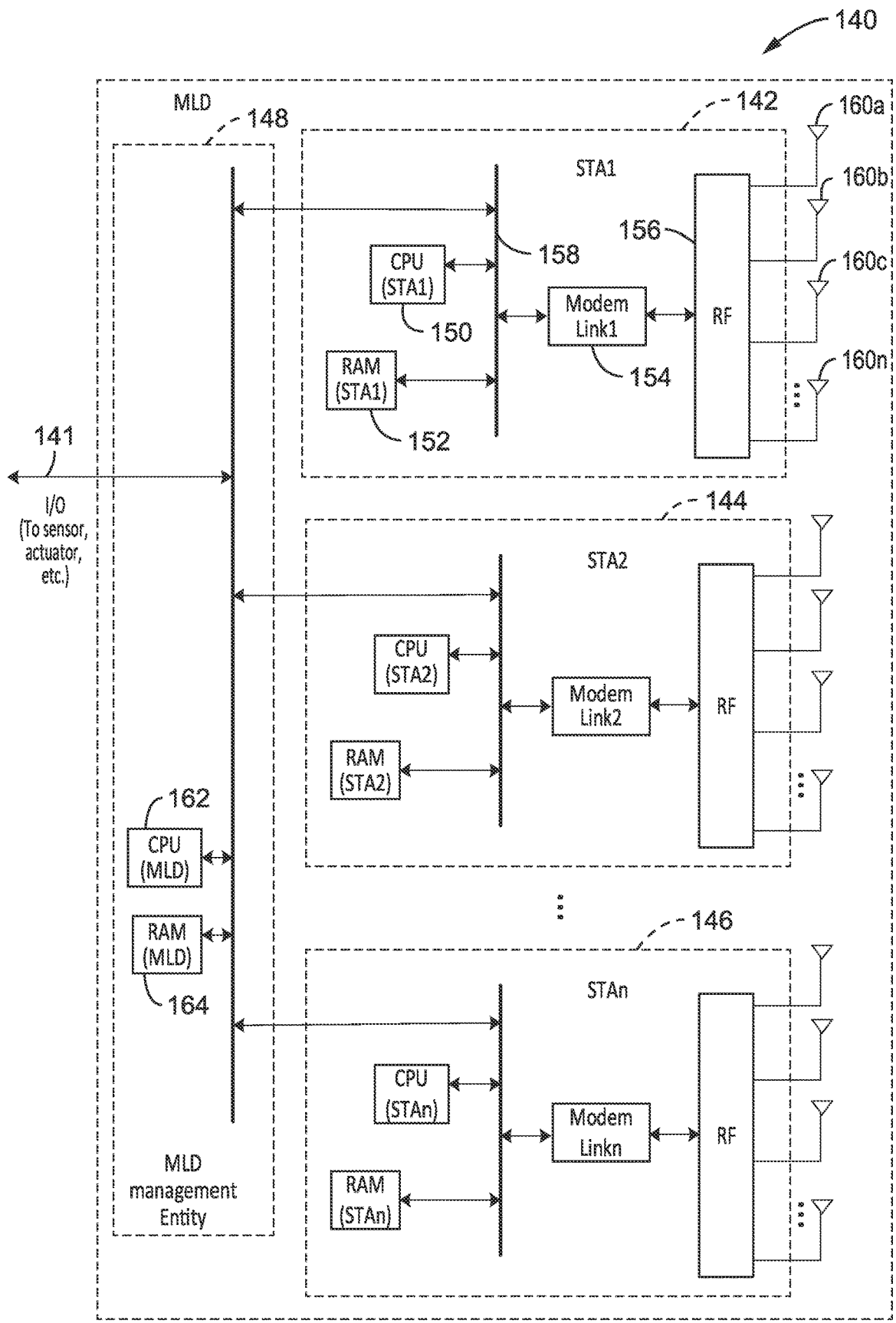
FIG. 10 is a hardware block diagram of a station configuration, such as contained in Multi-Link Device hardware, according to at least one embodiment of the present disclosure.

FIG. 10 illustrates an example embodiment 140 of a Multi-Link Device (MLD) hardware configuration. Multiple STAs are affiliated with an MLD, with each STA operating on a link of a different frequency. The MLD has external I/O 141 access to applications, this access connects to a MLD management entity 148 having a CPU (e.g., processor) 162 and memory (e.g., RAM) 164 to allow executing a program(s) that implement communication protocols at the MLD level. The MLD can distribute tasks to, and collect information from, each affiliated station to which it is connected STA1 142, STA2 144 through to STA_N 146 and share information between affiliated STAs.

In at least one embodiment, each STA of the MLD has its own CPU (e.g., processor) 150 and memory (RAM) 152, which are coupled through a bus 158 to at least one modem 154 which is connected to at least one RF circuit 156 which has one or more antennas 160a, 160b, 160c through 160n. The present disclosure is primarily interested in the sub-6 GHz band with omni-directional antenna(s). The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

6. Topology and Scenario Description

Figure 11:
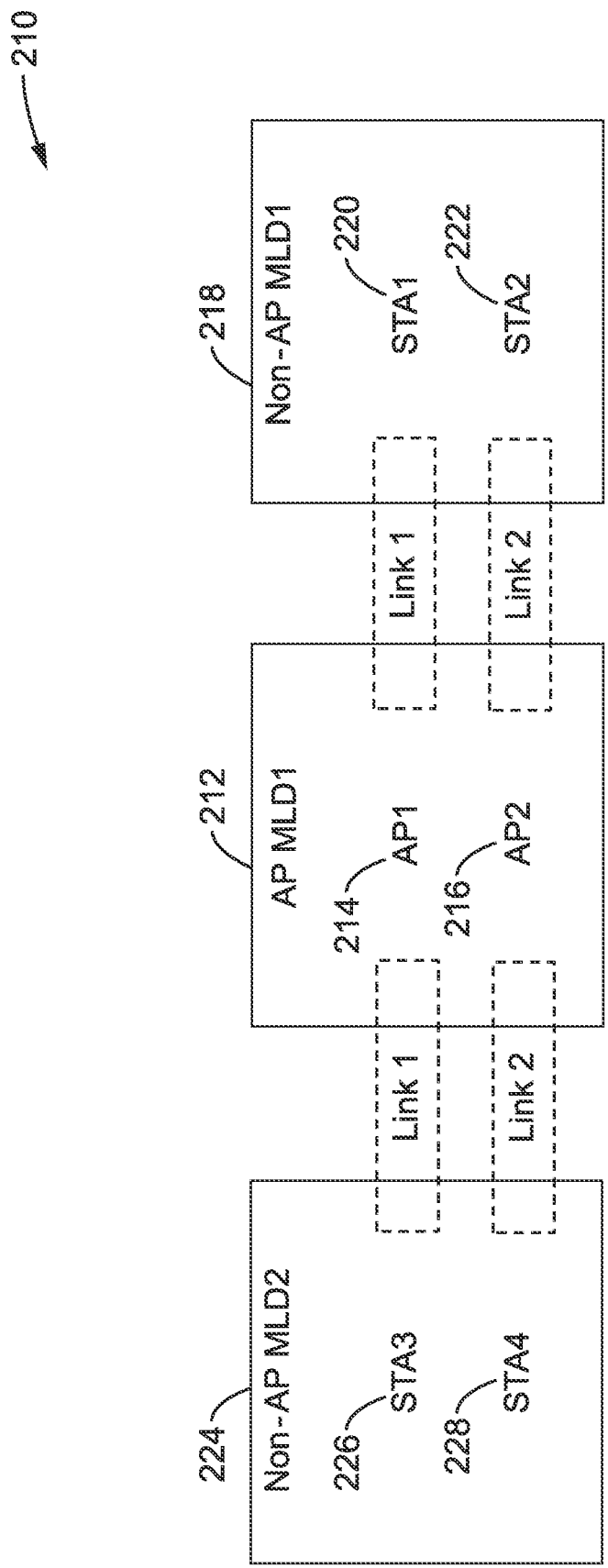
FIG. 11 is a topology of a WLAN having seven STAs, six of which are within three MLDs according to at least one example of the present disclosure.

A simplified station topology is shown as FIG. 11 to briefly describe the possible network topology. The wireless connection could be set up between AP MLD (AP MLD1 212) and non-AP MLD (non-AP MLD1 218 and non-AP MLD2 224) among at least one link pair (depicted as Link1 and Link2) which is possibly on 2.4 GHz, 5 GHz and 6 GHz). In this example, one link pair is considered, although of course the present disclosure can support multiple link pairs.

Assuming there are four STAs affiliated with 2 MLDs, among which STA1 220 and STA2 222 affiliate with non-AP MLD1 218, STA3 226 and STA4 228 affiliate with non-AP MLD2 224. AP1 214 and AP2 216 affiliate with AP MLD1 212. AP1 of AP MLD1 can communicate with STA1 of non-AP MLD1 and STA3 of non-AP MLD2 over Link1. AP2 of AP MLD1 can communicate with STA2 of non-AP MLD1 and STA4 of non-AP MLD2 over Link2.

The two links (Link1 and Link 2) that a MLD operates on consists of a link pair of that MLD. When the in-device coexistence interference is high between two links of the same MLD, such as two links of a NSTR link pair of that MLD. It will be noted that coexistence interference is interference due to the signal transmission on a link by a first STA of the MLD whose transmission might destroy or interfere with signal reception on another link by a second STA of that same MLD. The NSTR MLD should not transmit on a link of A NSTR link pair while receiving on the other link of the same NSTR link pair simultaneously.

A transmission from a MLD STA on a NSTR link can make the CCA busy on this link and pulses the backoff counter of other STAs of different MLD that are listening on the same NSTR link. At the same time, it can also pause the backoff counter of other STAs of the same MLD STA that are listening on other NSTR links due to the in-device coexistence interference.

If a STA of an NSTR MLD STA is receiving a signal over one link of a NSTR link pair, and another STA of the same NSTR MLD STA can either pause or continue counting down the backoff (BO) counter if it is undergoing a BO procedure. In this disclosure, the STA of a NSTR MLD STA is allowed to continue counting down the BO value if the other STA of the same NSTR MLD STA is receiving signals over another link of the same NSTR link pair. All stations (APs and STAs) use CSMA/CA for channel access on all links.

7. Protocol Design

A new protocol is proposed to initiate the shared TXOP among cooperative NSTR MLDs when all links of the NSTR link pair are obtained by stations that may not necessarily be from the same NSTR MLD.

7.0. Efficient Channel Access Before Initiating the Shared TXOP Among Cooperative NSTR MLDs.

Two additional issues are resolved by the disclosed protocol. (1) The first one is in utilizing the time gap which is described in the following sections regarding the AP STR MLD, the Soft AP NSTR MLD, and the alternate channel access methodology for high priority ACs. (2) The second one is for synchronizing the MLDs to determine the shared TXOP holder MLD, as is also described below.

Figure 12:
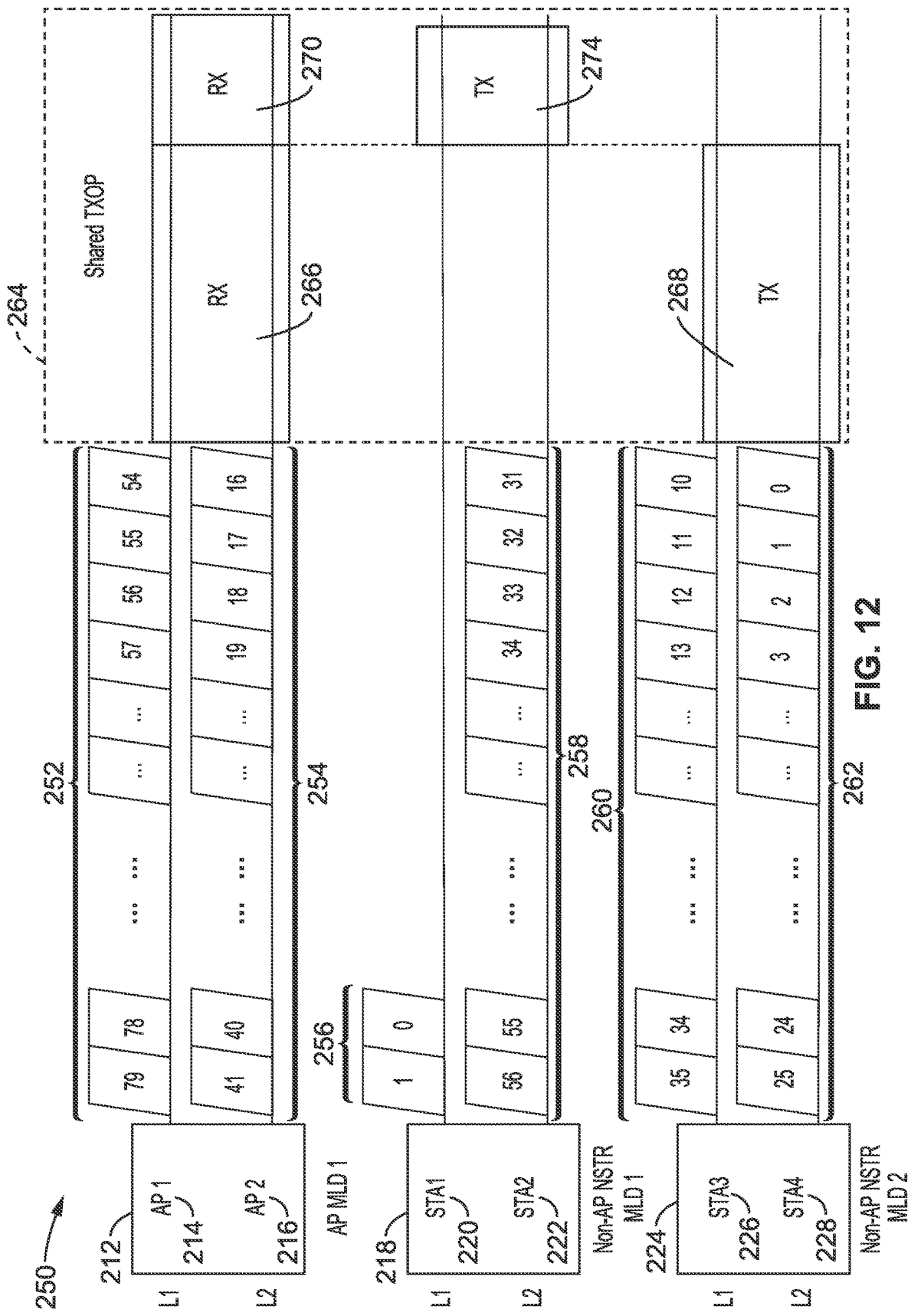
FIG. 12 is a communication diagram of channel access obtained by stations from different MLDs according to at least one embodiment of the present disclosure.

FIG. 12 is an example embodiment 250 of channel access obtained by stations from different MLDs. The network topology of this example is the same as that shown in FIG. 11, with AP MLD1 212, non-AP NSTR MLD1 218, and non-AP NSTR MLD2 224. At the beginning, the APs 214 and 216 in AP MLD1 and the non-AP STAs 220 and 222 in non-AP NSTR MLD1 and non-AP STAs 226, 228 in non-AP NSTR MLD2 are all assumed to be contending for channel access over multiple links of the NSTR link pair. The backoffs 252, 254, 256, 258, 260 and 262 are seen for each of these STAs and APs.

In this example STA1 220 of non-AP NSTR MLD1 218 has the shortest backoff 256 and is the first station to gain channel access, which in this case is over Link1 (L1). However, STA1 cannot immediately initiate the shared TXOP transmission at MLD level since STA2, another affiliated STA of the non-AP NSTR MLD1 is still performing back off counting 258.

STA4 of non-AP NSTR MLD2, with backoff 262, is the first station that gains channel access over Link2 (L2). Since both L1 and L2 of the NSTR link pair are obtained and are ready to access, the shared TXOP 264 can be initiated at this point in time.

Since STA1 and STA4 are from different MLDs, synchronization is utilized among the MLDs to determine which MLD shall operate in the role of shared TXOP holder MLD, and the remaining MLDs shall operate in the role of shared TXOP participant MLDs. In this example STA4 transmits 268 and AP2 216 receives 266, then STA2 transmits 274 and AP2 216 receives 270. The shared TXOP is to be executed at the MLD level.

Figure 13:
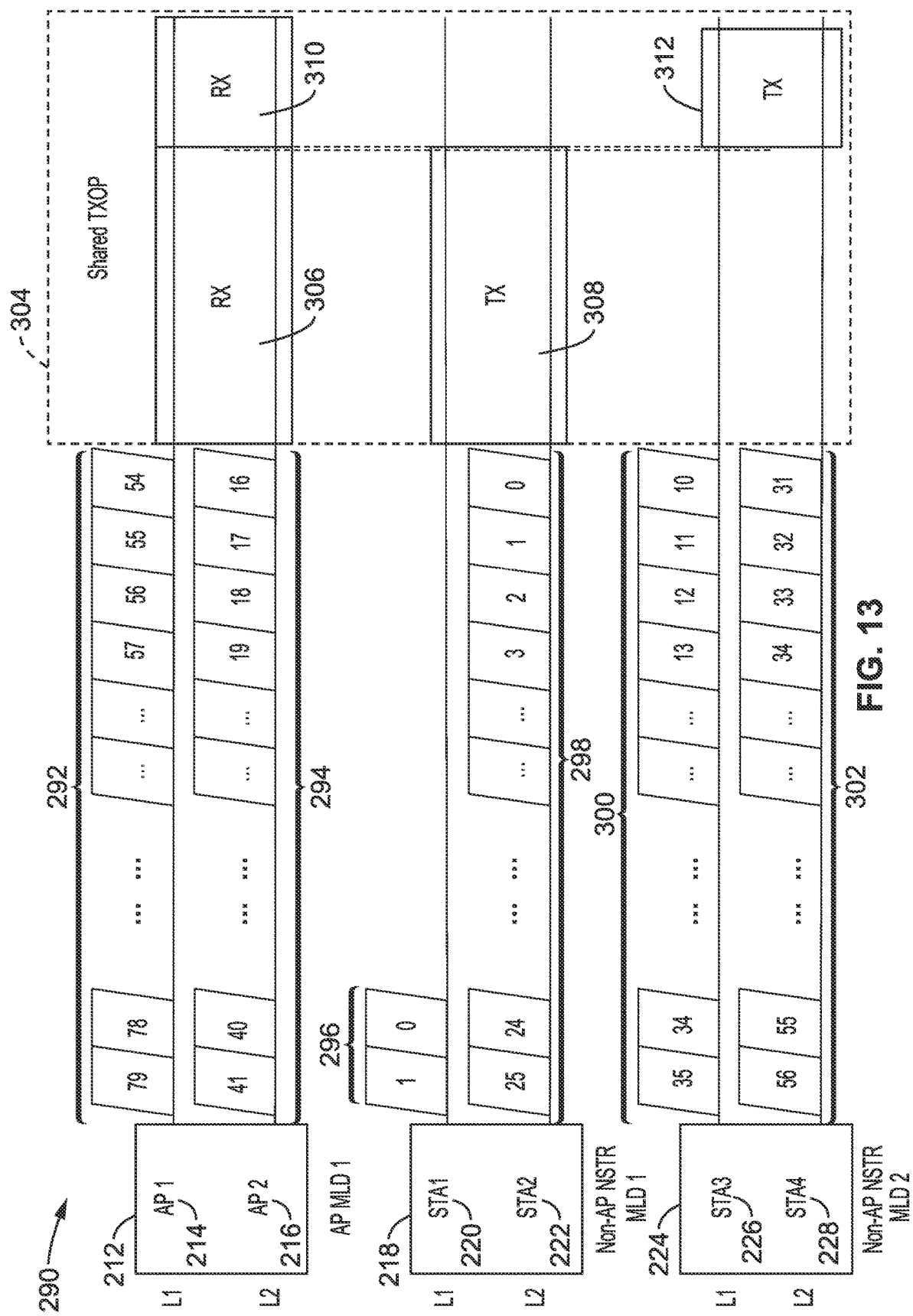
FIG. 13 is a communication diagram of channel access obtained by stations from the same MLD according to at least one embodiment of the present disclosure.

FIG. 13 illustrates an example embodiment 290 of channel access obtained by stations from the same MLD. The network topology, STAs and APs of the MLDs are the same as in the previous figure. Backoffs 292, 294, 296, 298, 300 and 302 are seen for each of these STAs and APs.

At the beginning, the APs in AP MLD1 and the non-AP STAs in non-AP NSTR MLD1 and non-AP STA MLD2 are all contending for channel access over multiple links of the NSTR link pair. STA1 220 of non-AP NSTR MLD1 218 completes its short backoff 296 and is the first station that gains channel access, which is over Link1 (L1). STA1 cannot immediately initiate the shared TXOP transmission at MLD level since STA2, another affiliated STA of the non-AP NSTR MLD1 is still performing back off counting.

STA2 of non-AP NSTR MLD1, completing its backoff 298, is the first station that gains the channel access over Link2 (L2). Since both L1 and L2 of the NSTR link pair are obtained and are ready to access, the shared TXOP can be initiated at this point.

Since STA1 and STA2 are from the same non-AP NSTR MLD 1, so non-AP NSTR MLD 1 assumes the role of the shared TXOP holder MLD, and the remaining MLDs operate in the role of shared TXOP participant MLDs. The example then shows operations in shared TXOP 304 with STA2 transmitting 308 and AP2 receiving 306, after which STA4 is seen transmitting 312 and AP2 receiving 310. The shared TXOP is executed at the MLD level.

7.1. Methodologies of Efficiently Utilizing the Time Gap

When stations from multiple MLDs contend for channel access. If one link (e.g., L1) of the NSTR link pair is obtained by a STA and the other link (e.g., L2) of the same NSTR link pair has not been gained by any other STAs; then the present disclosure is configured to assure that the STA having the smallest BO value on L2 should continue counting down without any interruption, toward minimizing time gap and thus increasing channel utilization. While other stations can utilize this period to transmit packets over L1 without interfering with counting down of the shortest BO counter on link2.

APs are involved in collecting BO information and determining which STA should continue counting and/or which STA or STAs should pause counting or pause transmissions, such as during a certain period and using a certain frequency band. The scheduling procedure is configure to operate based on scheduling over either the time domain or the frequency domain.

In this example all of the non-AP MLDs are considered to be non-AP NSTR MLD, and the AP MLD are considered to be either AP STR MLD or soft AP NSTR MLD; in which soft AP indicates the AP MLD is a NSTR MLD that cannot transmit and receive over multiple links at the same time. For both cases different methodologies are proposed and analyzed.

7.2. Simultaneous SYN Response Over the Frequency Domain (AP STR MLD)

Figure 14A:
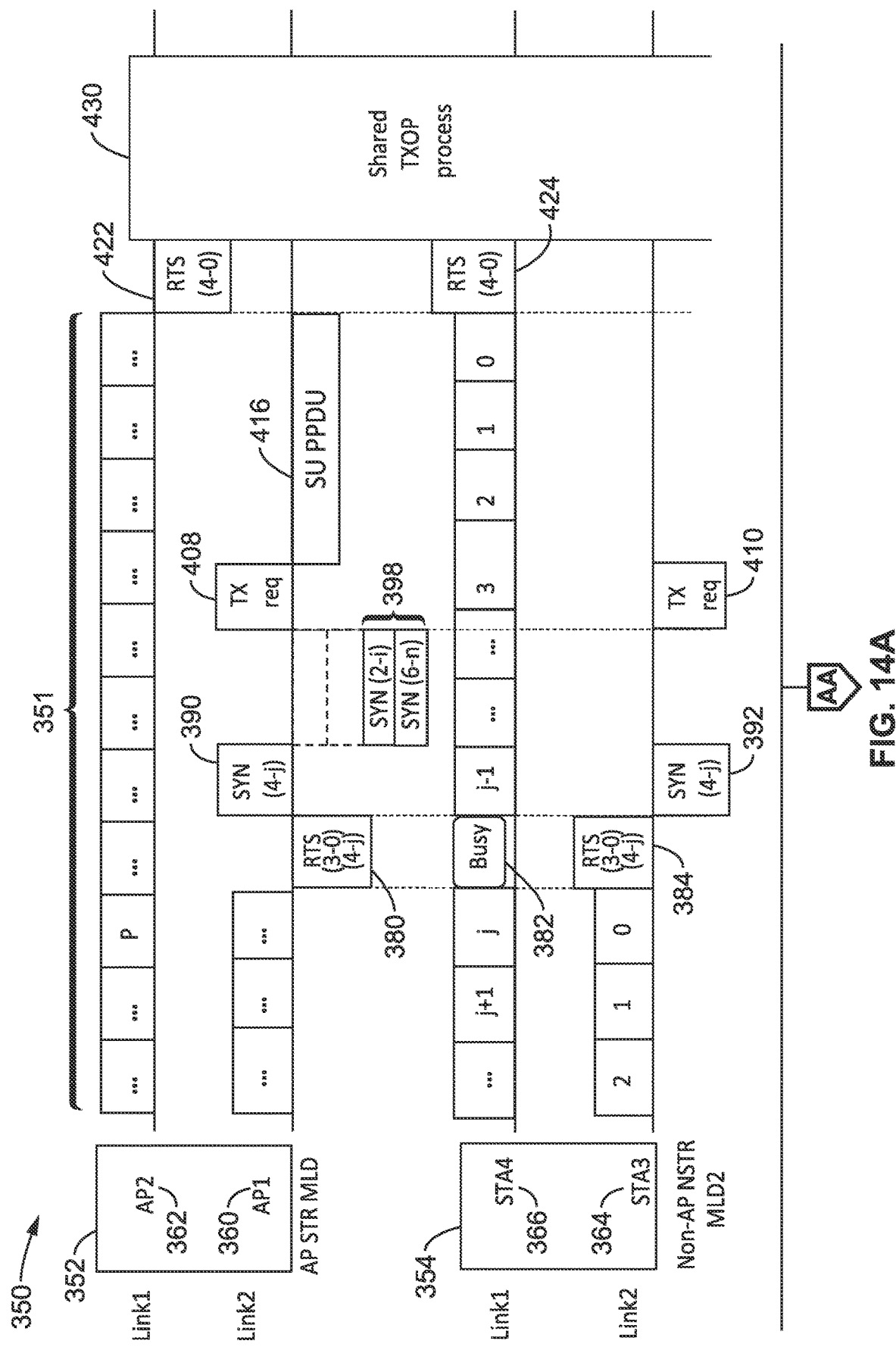
FIG. 14A and FIG. 14B is a communication diagram of simultaneous SYN response (of SYN) over the frequency domain with TX_req scheduling UL SU PPDU before shared TXOP (AP STR MLD) according to at least one embodiment of the present disclosure.
Figure 14B:
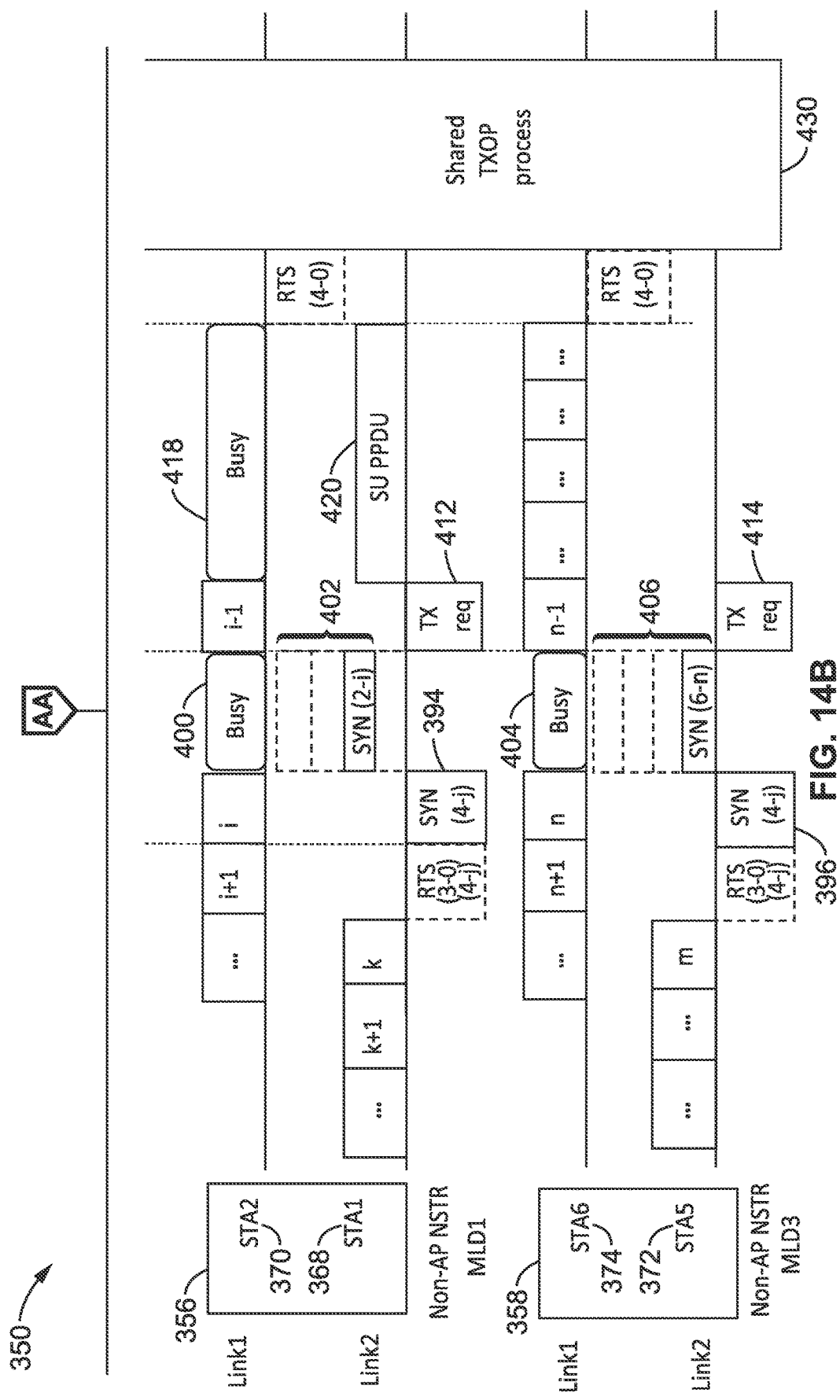

FIG. 14A and FIG. 14B illustrate an example embodiment 350 of simultaneous SYN response (of SYN) over the frequency domain with TX_req scheduling UL SU PPDU before shared TXOP (AP STR MLD). The network topology is a variation of FIG. 11 having an AP STR MLD 352 with AP1 360 and AP2 362, non-AP NSTR MLD2 354 with STA3 364 and STA4 366, non-AP NSTR MLD1 356 with STA1 368 and STA2 370 and non-AP NSTR MLD3 358 with STA5 372 and STA6 374. It will be noted that in this and other figures the transmissions for each link are above the line and receptions shown below the line.

The figure primarily is depicting the interval in which backoffs 351, shown as the sequential time slots, are being counted down on each link. If the backoff (BO) counter of one STA (e.g., STA3 in this example) of a NSTR MLD first counts down to zero, it obtains the access of one link (e.g., Link 2) of the NSTR link pair (consists of Link1 and Link 2). STA3 unicasts a modified RTS frame 384 for receipt 380 by AP1 of AP MLD that is also operating on Link2 to indicate the current BO value of itself (which is zero) and the current BO value of the other STA of the same NSTR MLD operating on Link1, which is STA4, whose BO value is j. It should be noted that the transmission of the modified RTS from STA3 on Link2 will make the BO counter of STA4 on Link1 sense busy 382 and stop counting until STA3 finishes the transmission, thus preventing IDC interference.

It should be noted that the boxes shown in dashed lines, in this example and the rest of the examples in this disclosure, indicate that this frame is received but not addressed to the receiver on this specific link. For example, the STA1 of non-AP NSTR MLD1 and the STA5 of non-AP NSTR MLD3 receive the RTS frames addressed to AP1 of AP STR MLD.

When other STAs receive the modified RTS frame, and determine that they are not the destination of the RTS over link2, they are configured according to the present disclosure for reserving Link2. When AP1 receives 380 this modified RTS frame with its BO values, in this example indicating STA3 at BO of zero and STA4 at BO of j, then AP1 compares the received BO value for STA4 of j with the BO value of AP2 whose backoff is determined to be greater than the BO value j.

AP1 then broadcasts a SYN frame 390, which is a new frame of this present disclosure, it indicates the smaller BO on Link1 (i.e., j). This SYN frame is received 392, 394 and 396 by Link2 STAs. Receiving the SYN with its BO value for Link1 triggers STAs from other MLDs, here shown as non-AP NSTR MLD 1 and non-AP NSTR MLD 3, to report their BO values 402, 406, over Link2 while their associated Link1 STAs are set to busy 400 and 404.

When STAs of the non-AP NSTR MLDs receive the SYN frame from AP1 over link2, if the STA just sent a modified RTS frame to AP1 (e.g., STA3), then that MLD does not need to reply to the SYN frame. Otherwise, the STA of the MLD which is associated with the Link should reply with a SYN frame over Link2 to report the concurrent BO value of other STAs of the same affiliated NSTR MLD on Link1. For example, STA1 of non-AP NSTR MLD1 should send back a SYN frame 402 to indicate the BO value of STA2 of non-AP NSTR MLD1, which is i; STA5 of non-AP NSTR MLD3 should send back a SYN frame 406 to indicate the BO value of STA6 of non-AP NSTR MLD3, which is n.

The SYN frames can be simultaneously sent back to AP1 among different frequency slots that were preconfigured to different MLDs or specifically assigned by the AP through the broadcasted SYN frame.

AP1 is shown receiving 398 the SYN frames from which it determines the STA or AP having the smallest BO value which should continue counting down. If more than one STA is indicating the same BO value which is the smallest one, then still only one STA can keep counting down, other STAs having the same BO value should pause BO counting to avoid future packet collision.

AP1 then broadcasts a TX_req frame 408, which is new to the present disclosure, to indicate which STA should keep or pause BO counting down and which STA or AP should transmit a SU PPDU/MU PPDU in a certain time period or in certain frequency slot(s) and for a certain time period. This TX-req frame is shown being received 410, 412, and 414. For example, the AP determines in this example case to schedule an UL SU PPDU transmission 420 from STA1 of non-AP NSTR MLD1 to AP1 of AP STR MLD to fill in the time gap before the shared TXOP process starts. The transmission time duration is calculated as the time for the determined STA with the smallest BO value to finish BO counting. AP1 is shown receiving 416 the SU PPDU, and STA2 of the same MLD1 is shown set to a busy 418 condition.

When the STA having the shortest BO value (STA4 in this example) on Link1 counts down to zero, it unicasts 424 a modified RTS frame to AP2 over link1, indicating its BO value is 0.

AP2 receives 422 this modified RTS on Link1 and from the information contained therein is made aware that both Link1 and Link2 are idle now, and thus the shared TXOP process 430 can be started.

It should be noted that the duration of the RTS, SYN and TX_req frames may be substantially larger than a BO slot duration; accordingly the BO information contained in the RTS, SYN and TX_req frames should be updated in consideration of the time consumed for transmitting these frames.

7.3. SYN Frame Response After IFS (AP STR MLD)

This section describes two examples of this SYN frame response after IFS scheduling method. The first two steps of this methodology are the same as that shown in FIG. 14A and FIG. 14B and described in Section 7.2 with some variations, such as BO values, transmitter ID and receiver ID adapted as per the figures of this section.

Figure 15A:
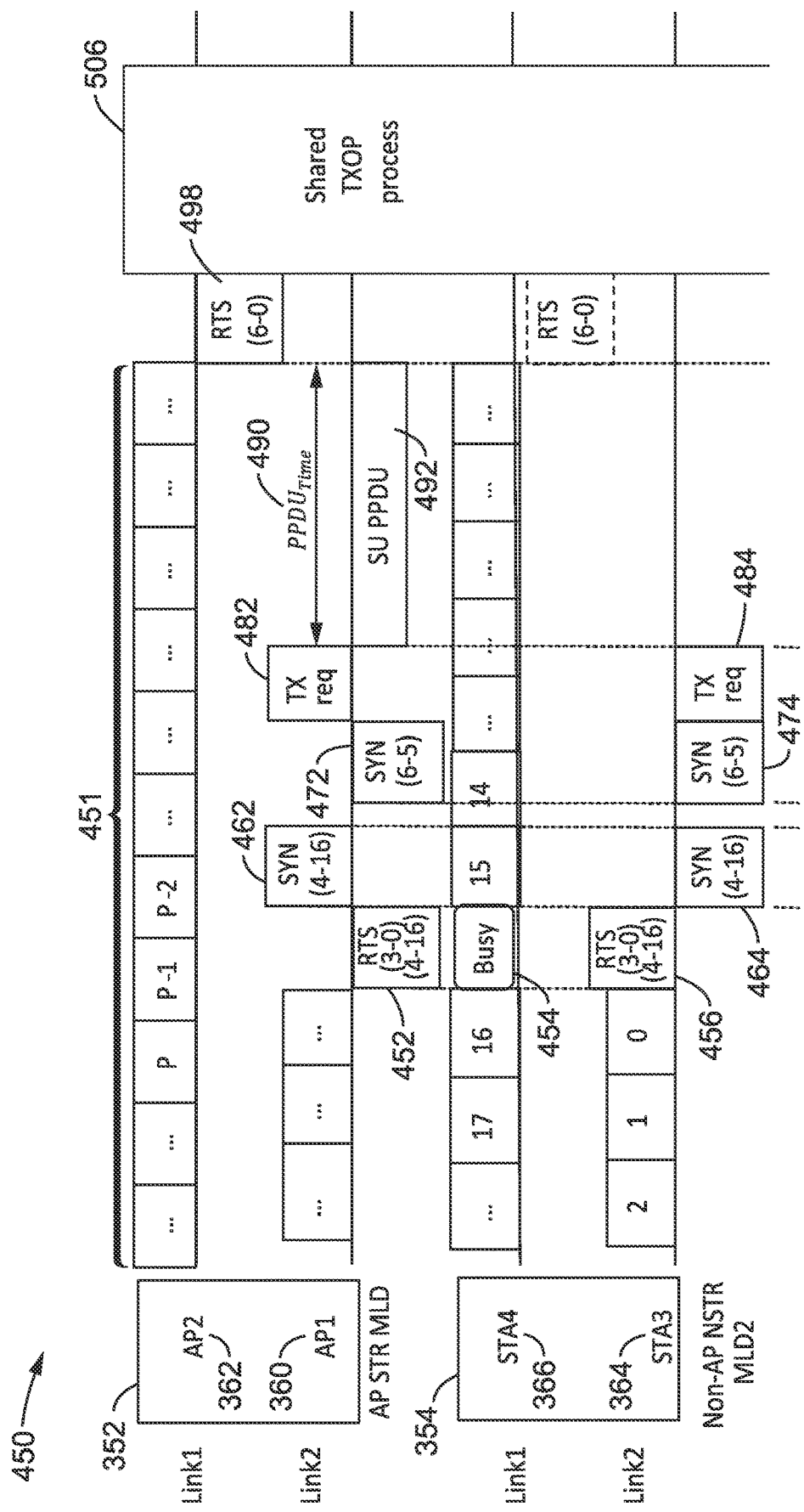
FIG. 15A and FIG. 15B is a communication diagram of a SYN frame response (of SYN) after IFS with TX_req scheduling UL SU PPDU before shared TXOP(AP STR MLD) according to at least one embodiment of the present disclosure.
Figure 15B:
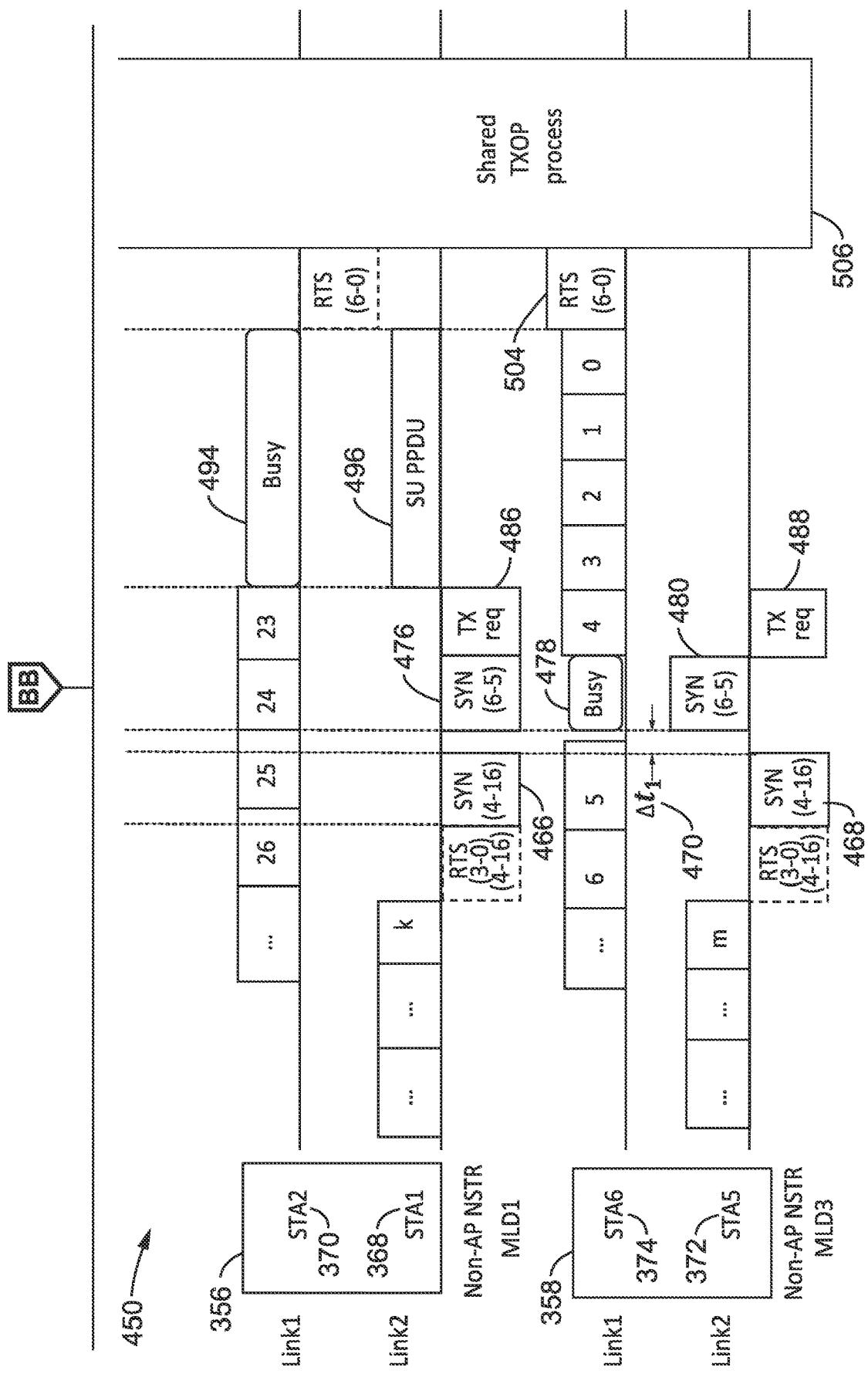

FIG. 15A and FIG. 15B illustrate an example embodiment 450 of a SYN frame response (of SYN) after IFS with TX_req scheduling UL SU PPDU before shared TXOP(AP STR MLD). The example topology as well as the example MLDs, APs and STAs are the same as in FIG. 14A and FIG. 14B.

In FIG. 15A and FIG. 15B, what is primarily being shown are interactions during backoff intervals 451, shown as the sequential time slots being counted down on each link. As in the prior example, STA3 has completed its counting, however STA4 is still counting. Thus, STA3 generates an RTS 456 on Link2 which incorporates information about the backoff state for both STAs in its MLD (exemplified as non-AP NSTR MLD2 354). This RTS is received 452 by AP1, and causes STA4 to enter a busy state 454, and this modified RTS is received by the other STAs operating on Link2.

In response to the RTS, AP1 transmits a SYN frame 462 which is received 464, 466 and 468. When STAs of the non-AP NSTR MLDs receive the SYN frame from AP1 over Link 2, if the STA has just recently sent the modified RTS frame to AP1, then it need not reply; other stations however, reply with a SYN frame 480 over Link2 to report the concurrent BO value of the other STA in same affiliated NSTR MLD, this SYN frame is shown being received 472, 474 and 476.

In order to prevent collision of simultaneous SYN frames, different IFS are determined (e.g., calculated) before different STAs response SYN frames over Link2. In at least one embodiment, the IFS time is determined as proportional to the concurrent BO value of the STA of the same NSTR MLD STA on Link1. For example, STA5 receives 468 the SYN frame from AP1 indicating the current BO value of STA4 is 16 on link 1. The BO value of STA6, which is affiliated with the same non-AP NSTR MLD3 as STA5, has a BO value of 5, which is the smallest BO value on Link1, whereby STA5 responds with SYN 480, after IFS time $\Delta t_1$ 470, which is faster than other responders. The other STA (e.g., STA1) on Link2 receives this SYN with BO value 5 as a benchmark BO. If another STA (e.g., STA2) on Link1 has a larger BO (23 in this case) than the benchmark BO value (5), then that STA doesn't need to respond with a SYN to AP1 on Link2.

AP1 determines which STA or AP has the smallest BO value, and thus which should continue counting down. AP1 broadcasts a TX_req frame 482 to indicate which STA should keep or pause BO counting on Link1 and which STA or AP should transmit a PPDU(s) on Link2, exemplified herein as a SU PPDU, but which may be a MU PPDU, in a certain time period or in certain frequency slots and for a certain time period. The transmission time duration is calculated as the time for the STA determined with the smallest BO value to finish BO counting down, this is shown in the figure as $PPDU_{time}$ 490. In the figure an UL SU PPDU is scheduled to be transmitted 496 from STA1 of non-AP NSTR MLD1 to AP1 of AP STR MLD to fill in the time gap before the shared TXOP process 506 starts. The SU PPDU is received 492, while STA2 on Link1 is held in a busy state 494.

When the STA having the smallest BO value on Link1, which is STA6 in this example, counts down to zero, it unicasts 504 a modified RTS frame to AP2 over Link1, indicating its BO value is 0, which is received 498 by the AP and available on this link to the other STAs.

After AP2 and other stations on Link1 receive this modified RTS frame, they are thus made aware (can detect) that both Link1 and Link2 are idle, and thus the shared TXOP process 506 is commenced.

It should be noted that the duration of the RTS, SYN and TX_req frames can be significantly longer than each single BO slot duration; accordingly the BO information contained in these frames should be updated in consideration of the time required for transmitting them.

Figure 16A:
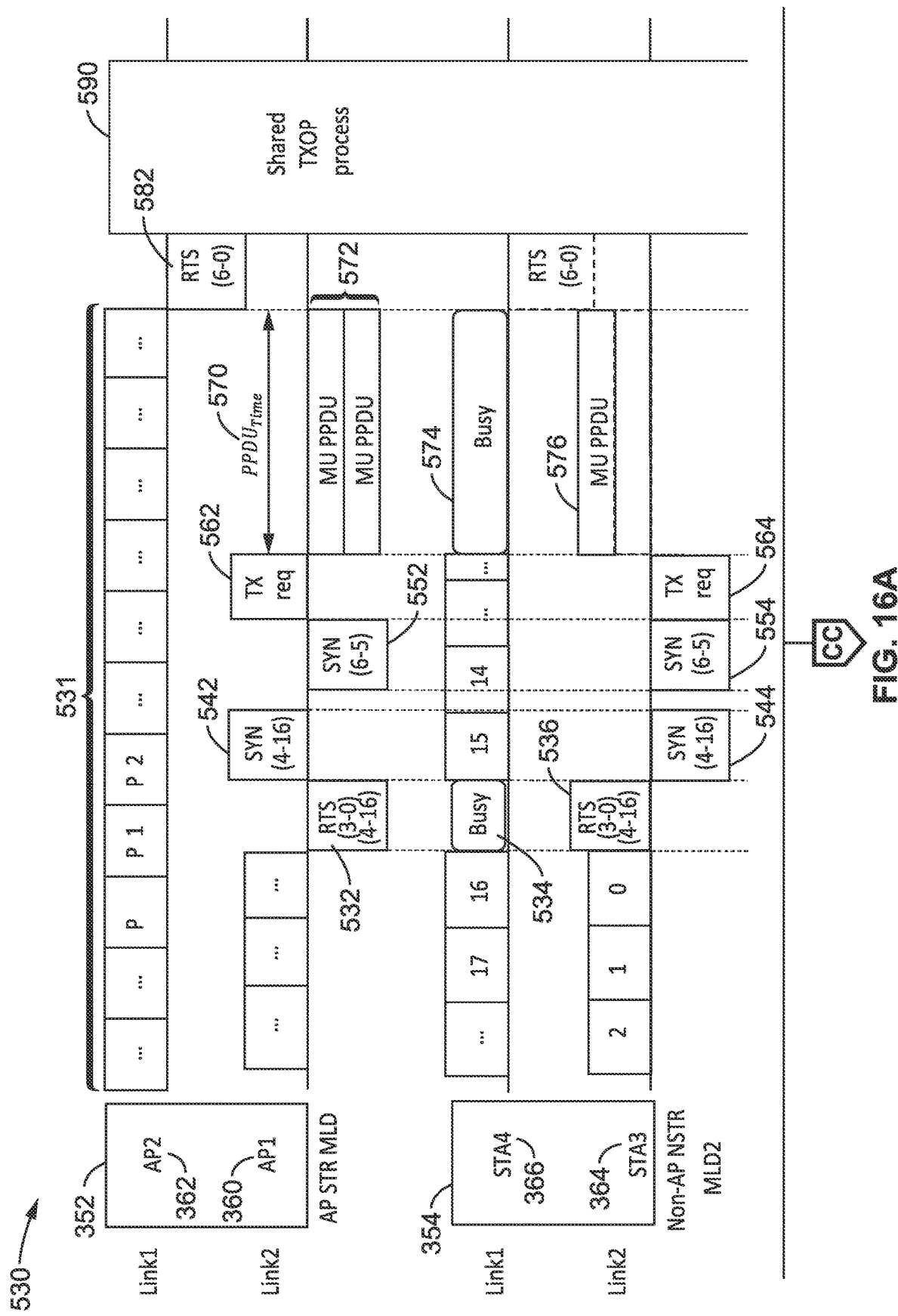
FIG. 16A and FIG. 16B is a communication diagram of a SYN frame response (of SYN) after IFS with TX_req scheduling UL MU PPDU over frequency domain before shared TXOP (AP STR MLD) according to at least one embodiment of the present disclosure.
Figure 16B:
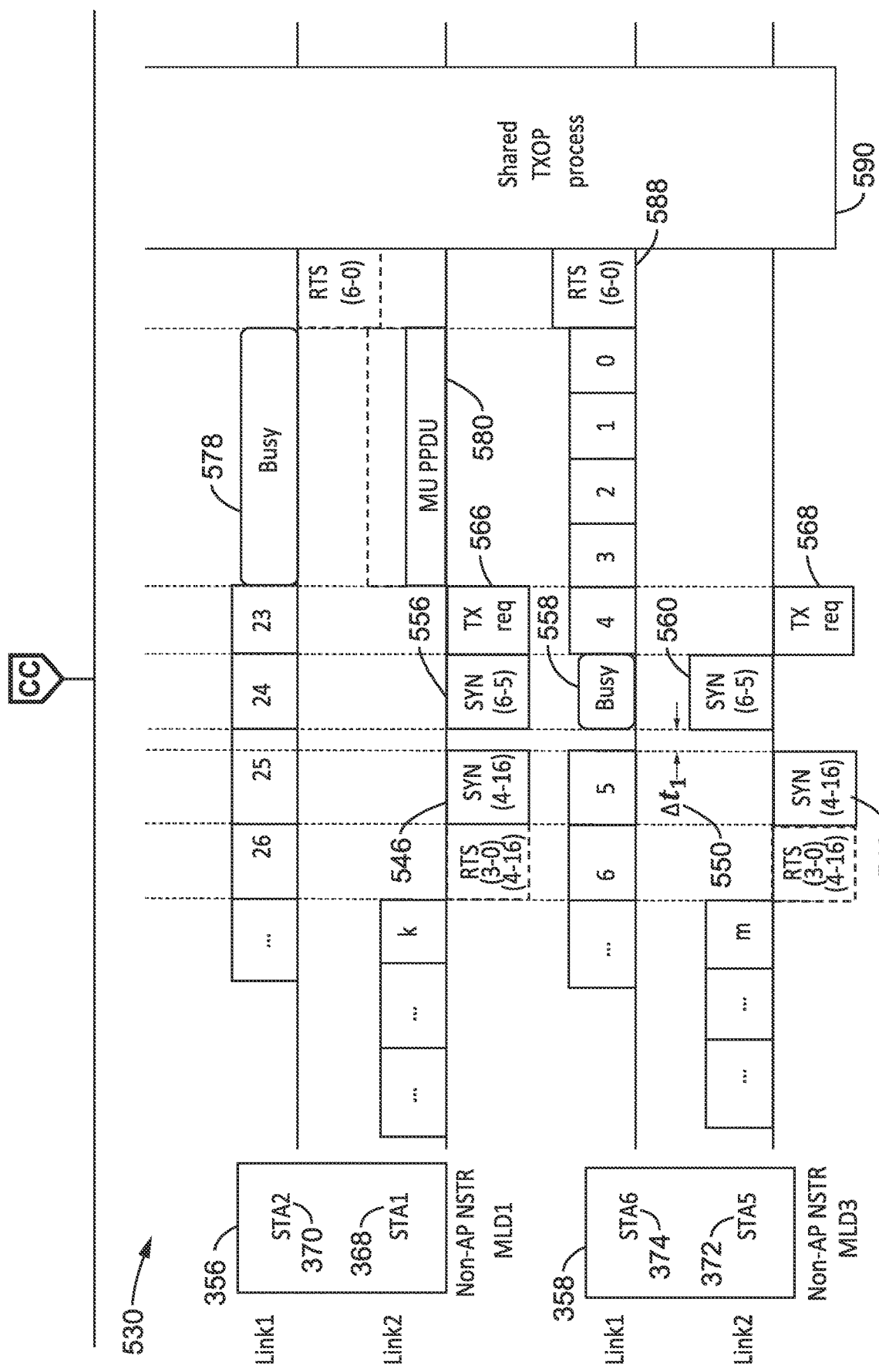

FIG. 16A and FIG. 16B illustrate an example embodiment 530 of a SYN frame response (of SYN) after IFS with TX_req scheduling UL MU PPDU over frequency domain before shared TXOP (AP STR MLD). This figure is almost the same as described in the previous figure, aside from a MU PPDU instead of a SU PPDU.

As in the prior example, STA3 has completed its counting down, yet STA4 is still counting. Thus STA3 generates an RTS 536 on Link2 which incorporates information about the backoff state for both STAs in its MLD (exemplified as non-AP NSTR MLD2 354). This RTS is received 532 by AP1, and is available to STAs on Link2.

In response to the RTS, AP1 transmits a SYN frame 542 which is received 544, 546 and 548. When STAs of the non-AP NSTR MLDs receive the SYN frame from AP1 over Link2, if the STA has just sent the modified RTS frame to AP1, then it need not reply; other stations however, reply with a SYN frame 560 over Link2 to report the concurrent BO value of the other STA in the same affiliated NSTR MLD, this SYN frame is shown being received 552, 554 and 556.

In order to prevent collision of simultaneous SYN frames, different IFS are determined (e.g., calculated) before different STAs response SYN frames over Link2. In at least one embodiment, the IFS time is determined as proportional to the concurrent BO value of the STA of the same NSTR MLD STA on Link1. For example, STA5 receives the SYN frame from AP1 indicating the current BO value of STA4 is 16 on Link1. Since the BO value of STA6, which affiliates with the same non-AP NSTR MLD3 as STA5, has a BO value of 5 which is the smallest BO value on Link 1, then STA5 responds 560 with a SYN. After IFS time $\Delta t_1$ 550, STA5 broadcasts 560 the SYN frame as the response, indicating the smallest BO value of STA6 on Link1 is 5. The other STA (e.g., STA1) on Link2 receives 556 this SYN with BO value 5 as a benchmark BO. If another STA (e.g., STA2) on Link1 has a larger BO (23 in this case) than the benchmark BO (5), then that STA need not respond with a SYN to AP1 on Link2.

AP1 determines which STA or AP has the smallest BO value, and thus which should continue counting down. AP1 broadcasts a TX_req frame 562 to indicate which STA should keep or pause BO counting down on Link1 and which STA or AP should transmit a PPDU(s) on Link2, exemplified herein as a MU PPDU, but which may be a SU PPDU, in a certain time period or in certain frequency slots and for a certain time period. The transmission time duration is calculated as the time for the determined STA with the smallest BO value to finish BO counting down, this is shown in the figure as $PPDU_{time}$ 570. In the figure UL MU PPDUs 576 and 580 are scheduled to be transmitted, respectively, from STA3 of non-AP NSTR MLD2 and STA1 of non-AP NSTR MLD1 to AP1 of AP STR MLD among different frequency bands to fill in the time gap before the start of shared TXOP process 590, which occurs when the smallest BO value has finished counting down. It will be noted that STA4 and STA2 on Link1 are held in a busy state 574, 578.

When the STA having the smallest BO value on Link1, which is STA6 in this example, counts down to zero, it unicasts a modified RTS frame 588 to be received 582 by AP2 over Link1; the frame includes an indication that its BO value is 0.

AP2 receives 582 this modified RTS frame, as do the other stations on Link1, and are thus made aware (can detect) that both Link1 and Link2 are idle so that the shared TXOP process 590 can be commenced.

It should be noted that the duration of the RTS, SYN and TX_req frames can be significantly longer than each single BO slot duration; accordingly the BO information contained in these frames should be updated based on the time required for transmitting them.

FIG. 17A through FIG. 17D illustrate an example embodiment 630 of a channel access process at the non-AP MLD level, which applies to the scenario in which the AP only initially obtains one of the MLD links.

In block 632 it is determined if the non-AP NSTR MLD has initially obtained (grabbed) the channel on one link of the MLD (if it did not, then this means it did not obtain any link initially). If it has obtained the channel on one link, then at block 634 a decision is made on whether this non-AP NSTR MLD should be a TXOP holder STA, or should be a TXOP participant station and thus not the TXOP holder STA.

Figure 17A:
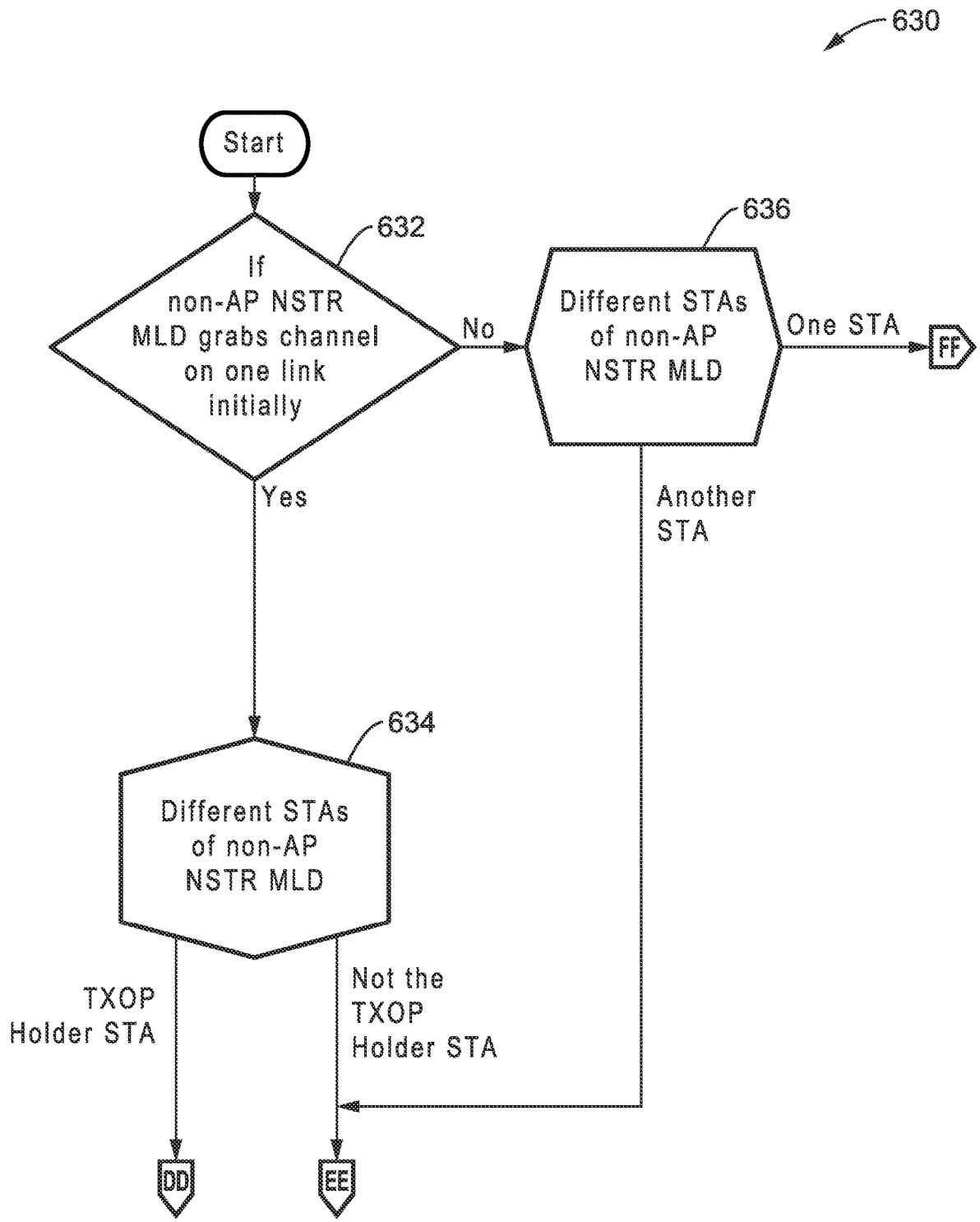
FIG. 17A through FIG. 17D is a flow diagram of a channel access process at the non-AP MLD level, which applies to the scenario in which the AP only initially obtains one of the MLD links according to at least one embodiment of the present disclosure.
Figure 17B:
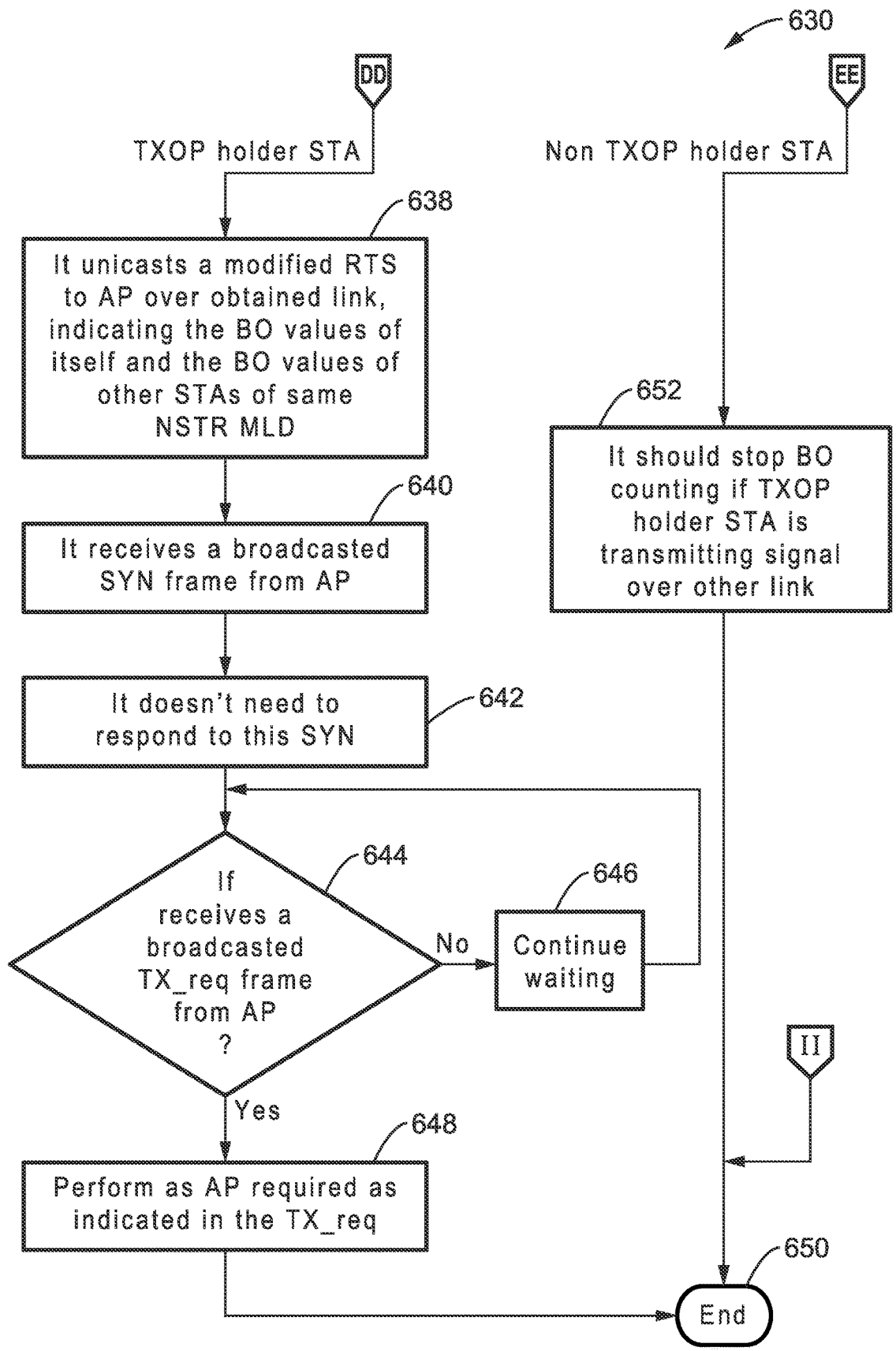

In the case of it being a TXOP holder station, then execution reaches block 638 of FIG. 17B with the STA unicasting a modified RTS to the AP over the obtained link. The modified RTS includes information on the BO values of itself and the STAs of the same NSTR MLD. In response to the RTS, the STA receives 640 a broadcast SYN frame from the AP and determines 642 that is does not need to respond, since it was the station that sent the original RTS to the AP. A check is then performed to determine if a TX_req frame has been received from the AP. If it has not been received, then the STA continues waiting 646 (subject to timeout considerations) and checking 644.

Otherwise, if TX_req has been received, then at block 648 the station follows the instructions as indicated by the AP in the TX_req and the process ends 650.

Returning to consider block 634 in FIG. 17A in the case when the station is considered not to be the TXOP holder station, then execution moves to block 652 in FIG. 17B in which the station stops its BO counting if the TXOP holder STA is transmitting a signal over the other link of the MLD, and then processing ends 650.

Returning now to consider the alternate path for block 632 in FIG. 17A in the case when the non-AP NSTR MLD has not initially obtained (grabbed) the channel on any link of the MLD; and execution moves to block 636 which determines whether the STA is the STA on the same link with the TXOP holder STA (One STA) or is another STA on the other links of the same non-AP NSTR MLD. If it is found to be another STA, then execution moves to FIG. 17B at block 652 which has already been described.

Figure 17C:
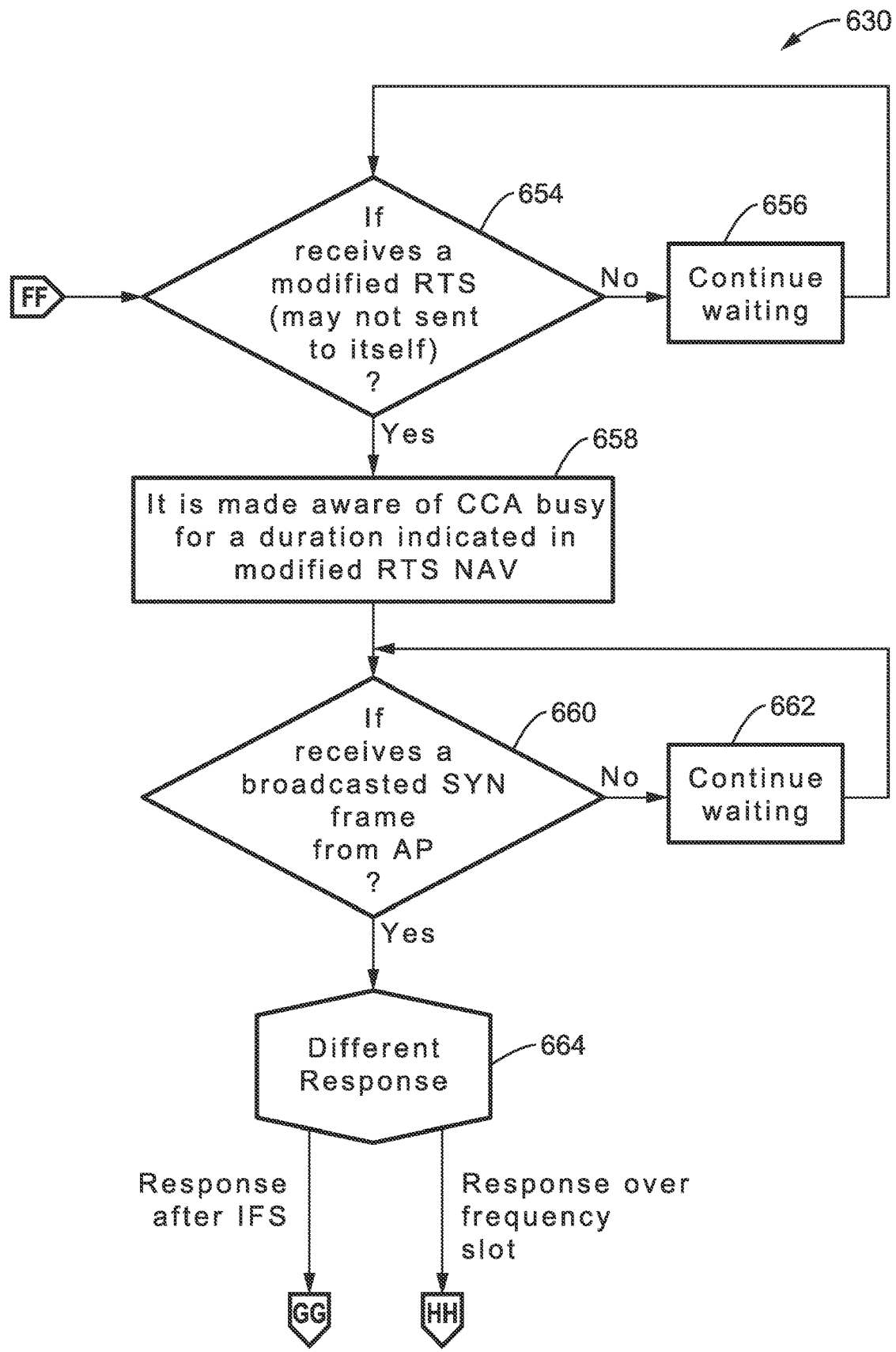

Otherwise, if at block 636 it is determined to be one STA (on the same link as the TXOP holder), then execution reaches block 654 in FIG. 17C which checks if a modified RTS has been received (which it did not send). If it has not received this RTS then it continues waiting 656 (subject to timeout considerations) and returning to block 654. Once the RTS is received, then at block 658 it is made aware 658 of CCA busy for the duration indicated in a modified RTS NAV. A check is made at block 660 to determine if the station has received a broadcast SYN frame from the AP. If it has not received the SYN then it continues waiting 662 (subject to timeout considerations) and returning to block 660. Upon receiving the SYN frame it determines at block 664 which type of response to perform, such as whether to respond after IFS, or to respond over a frequency slot.

Figure 17D:
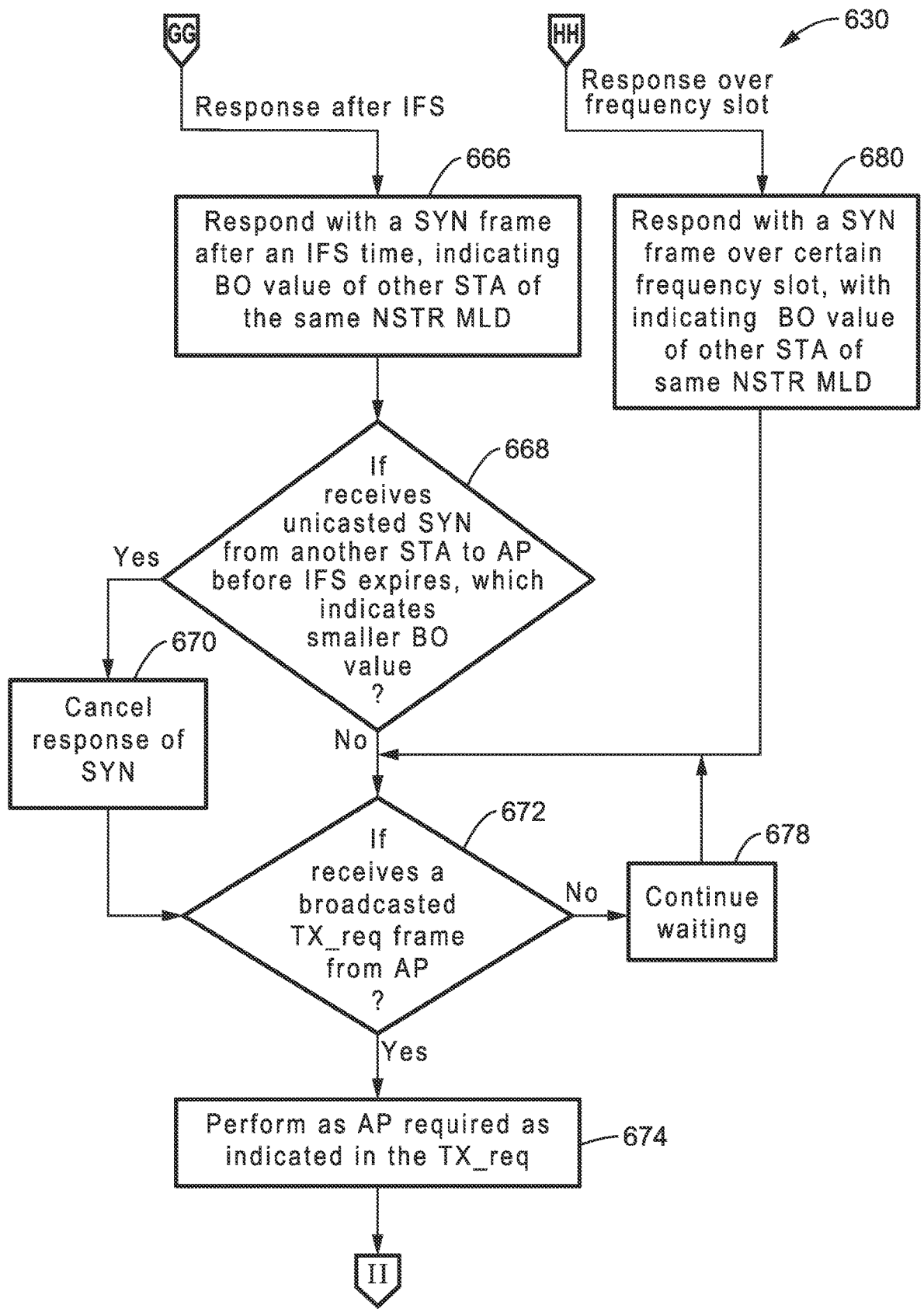

If it is determined in block 664 that it is to respond after IFS time, then execution moves to block 666 in FIG. 17D in which after the IFS time it responds by sending a SYN frame indicating the BO value of the other STA of the same NSTR MLD.

A check 668 then determines if it has received a unicasted SYN from another STA to the AP (as sent before the IFS expired), which indicates a smaller (shorter) BO value. If it did not receive this SYN frame, then execution reaches decision block 672. Otherwise, if it did receive this SYN frame, then the STA cancels 670 its SYN response, and execution reaches decision block 672.

At decision block 672 it is determined if the STA received a broadcasted TX_req frame from the AP. If it did not receive the frame then its continues waiting 678 (subject to timeout considerations) and making returns to block 672. Otherwise, upon receiving the TX_req frame the STA performing the actions 674 as indicated by the AP in the TX_req frame and the process ends 650 in FIG. 17B.

Returning to block 664 in FIG. 17C, if it is determined that the response is to be over a frequency slot, then execution reaches block 680 in FIG. 17D, in which the STA responds with a SYN frame on a certain frequency slot and indicates the BO value of the other STA of the same NSTR MLD, then reaches block 672 which has already been described.

Figure 18A:
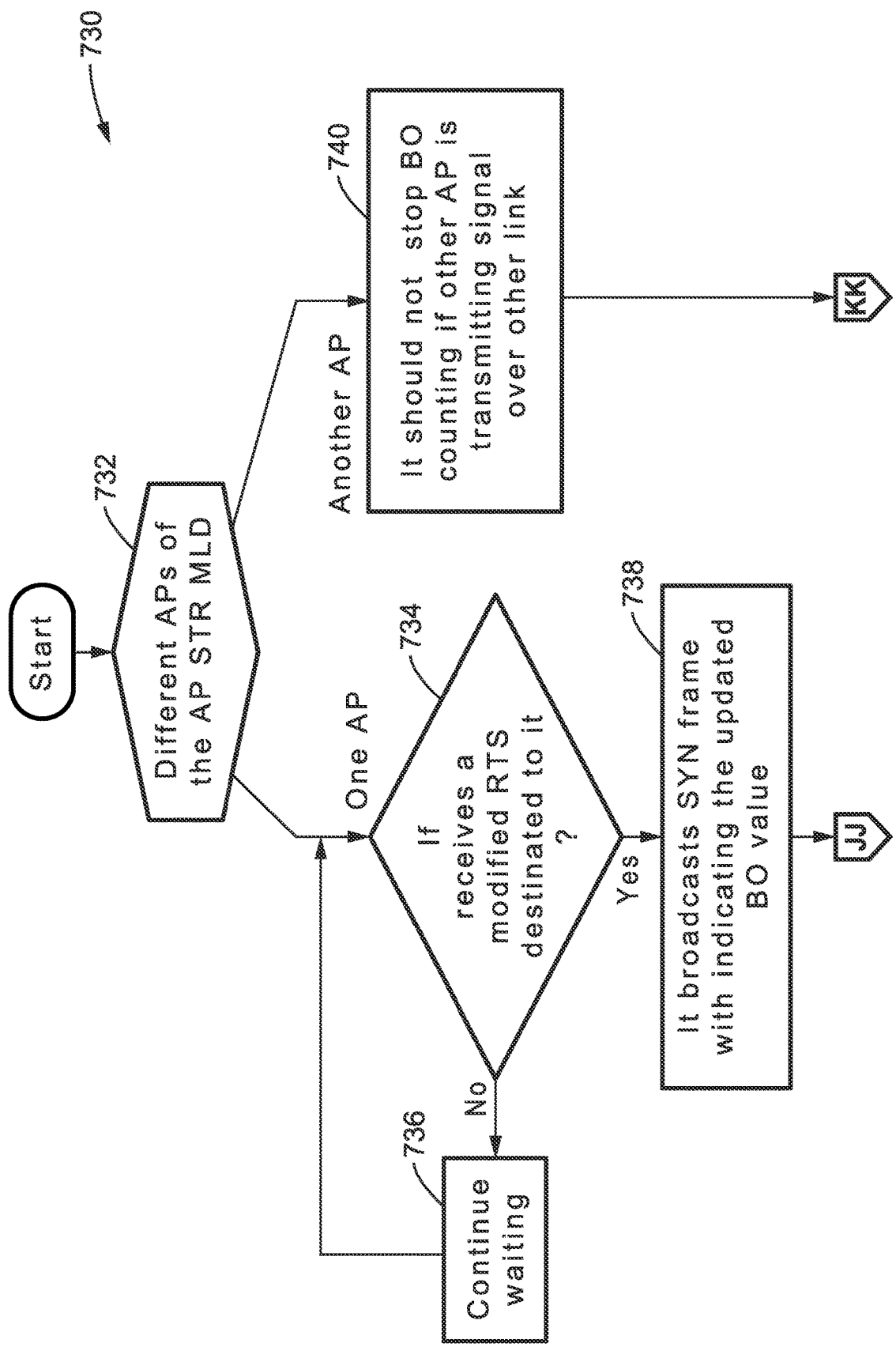
FIG. 18A and FIG. 18B is a flow diagram of a channel access process at the AP MLD level, which applies to the scenario in which the AP MLD doesn't initially obtain one link according to at least one embodiment of the present disclosure.
Figure 18B:
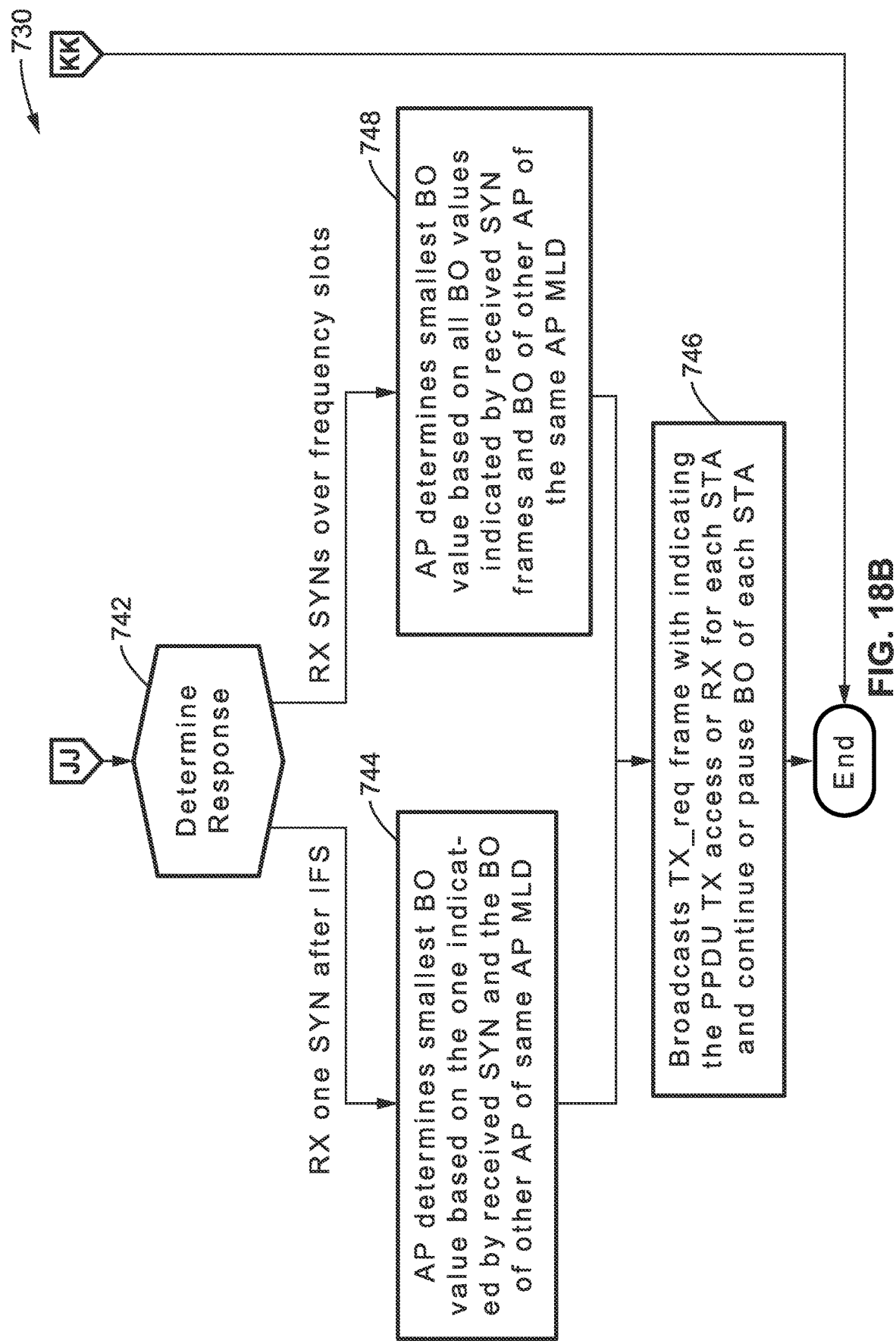

FIG. 18A and FIG. 18B illustrate an example embodiment 730 of a channel access process at the AP MLD level, which applies to the scenario in which the AP MLD doesn't initially obtain any link. Decision block 732 determines between different APs of the AP STR MLD. If it is determined that the AP is another AP, which is the AP of the AP MLD that is operating on a different link than the link obtained by the non-AP TXOP holder STA, then execution reaches block 740, wherein the AP does not stop backoff counting if the other AP is transmitting a signal over that link since the AP MLD is not a soft AP, after which the process ends.

Otherwise, the AP is one AP of the AP MLD that is operating on the same link as the link obtained (grabbed) by the non-AP TXOP holder STA, then execution reaches decision block 734 which determines if it has received modified RTS for which it is the destination. If it has not received the RTS, then it continues waiting 736 looping back to block 734 (subject to timeout considerations).

If it has received a modified RTS for which it is the destination, then at block 738 it broadcasts a SYN frame. Execution moves to decision block 742 in FIG. 18B which determines which response to generate. In this example embodiment, the response is either to receive one SYN after IFS, or to receive multiple SYNs within frequency slots.

If it received one SYN after IFS, then in block 744 the AP determines the smallest BO value based on the one indicated in the received SYN and the BO of the other AP of the same AP MLD.

Otherwise, if it was determined at decision block 742 to receive multiple SYNs within frequency slots, then in block 748 the AP determines the smallest BO value based on all the BO values indicated in the received SYN frames and BO of the other AP from the same AP MLD.

In either case, execution reaches block 746 which broadcasts a TX_req frame including an indication of PPDU TX access or RX access for each STA, and either continuing or pausing BO of each STA, after which the process ends.

7.4. Simultaneous SYN Frame Response (of RTS) Over Frequency Domain (AP STR MLD)

Two different examples of this scheduling method are described. The major difference between this scheduling method and the one described in Section 7.2 is with the simultaneous SYN frame response (of SYN) over the frequency domain is that: AP1 is the first one that obtains Link2 and unicasts a modified RTS to STA3. AP1 doesn't need to broadcast a SYN frame.

Figure 19A:
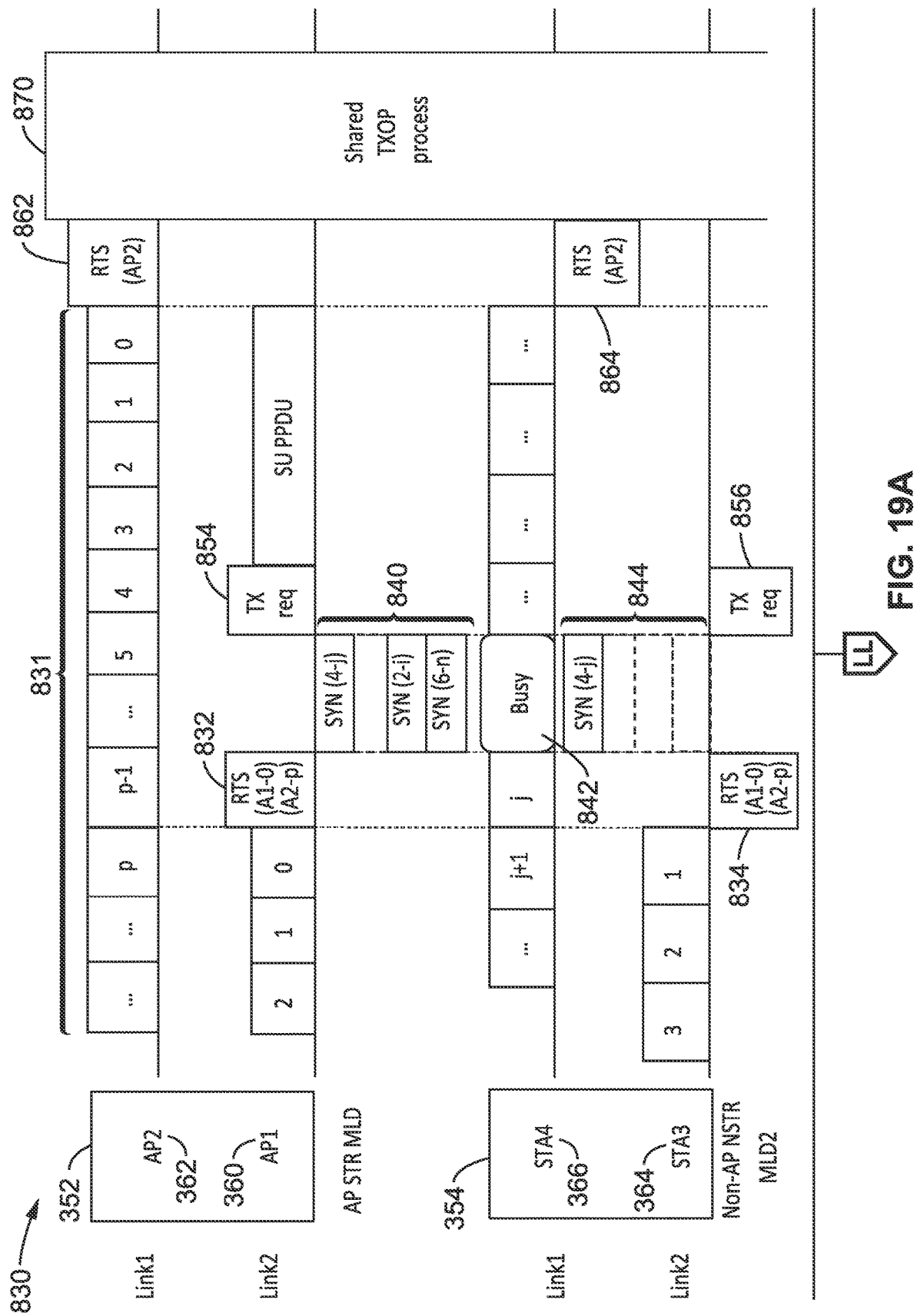
FIG. 19A and FIG. 19B is a communication diagram of a simultaneous SYN frame response (of RTS) over the frequency domain with TX_req scheduling DL SU PPDU before shared TXOP (AP STR MLD) according to at least one embodiment of the present disclosure.
Figure 19B:
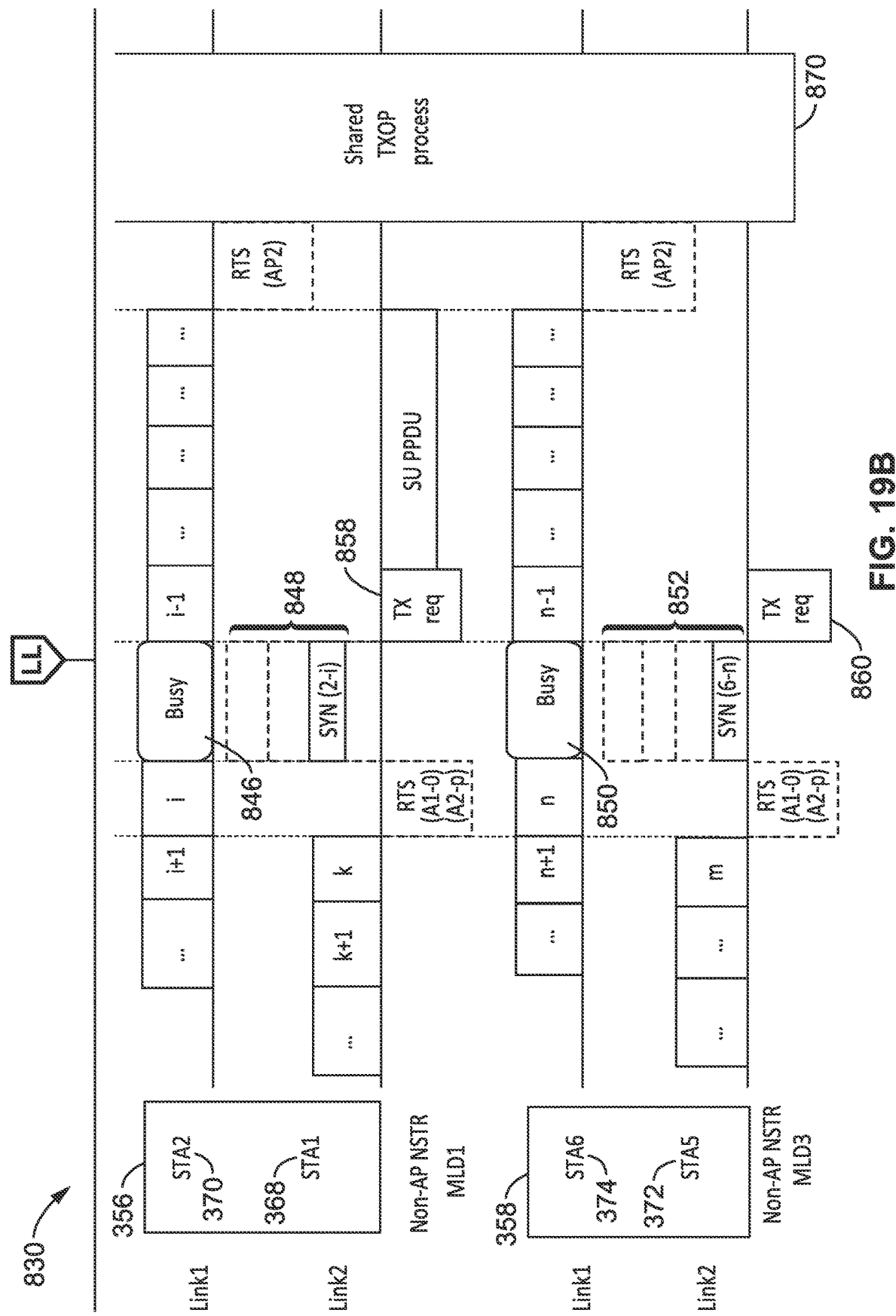

FIG. 19A and FIG. 19B illustrate an example embodiment 830 of a simultaneous SYN frame response (of RTS) over the frequency domain with TX_req scheduling DL SU PPDU before shared TXOP (AP STR MLD). The same topology and APs, STAs and MLDs are shown as in the previous examples, with interactions primarily being shown during backoff intervals 831 as sequential time slots being counted down on each link.

AP1 has completed its counting down, although AP2 is still counting down. Thus, AP1 generates a modified RTS 832 on Link2 which incorporates information about the backoff state for both APs in its MLD, which is received 834 by STA3 and is also available to other STAs on Link2.

Once a STA on Link2 receives this modified RTS, regardless of whether or not it is the destination of this RTS or not, the STA should reply with a SYN frame 844, 848 and 852 over Link2 in different frequency slots to report the concurrent BO value of its other STA on the same affiliated NSTR MLD to AP1 which receives 840 this SYN information.

AP1 collect the BO information from these simultaneous SYN frames among different frequency slots on Link2 and determines the duration of TX/RX of SU/MU PPDU and schedules the transmission with a specified duration.

In at least one embodiment, the SYN frames can be simultaneously sent back to AP1 among different frequency slots that were predetermined for the different MLDs; while other mechanisms can be utilized for selecting the frequency slots without departing from the teachings of the present disclosure. It will be noted that STA2, STA4 and STA6 on Link1 are held in a busy state 846, 842 and 850.

AP1 determines which STA or AP has the smallest BO value (e.g., AP2 of the AP STR MLD has the smallest BO value in this case), and thus which should continue counting down on Link1, and broadcasts a TX_req frame 854 to indicate which STA should keep or pause BO counting down on Link1 and which STA or AP should transmit a PPDU(s) on Link2, exemplified herein as a SU PPDU, but which may be a MU PPDU, in a certain time period or in certain frequency slots and for a certain time period. The transmission time duration in this example is determined by calculating the time for the determined STA with the smallest BO value to finish BO counting down. In the figure a UL SU PPDU is scheduled to be transmitted from AP1 of AP STR MLD to STA1 of non-AP NSTR MLD1 to fill in the time gap before the shared TXOP process 870 starts. The TX_req frame is seen being received 856, 858 and 860.

When AP2 BO reaches zero, a modified RTS is transmitted 862 by AP2 and received 864 by STA4 and is also available to other STAs on Link1. Then the shared TXOP 870 is commenced.

Figure 20A:
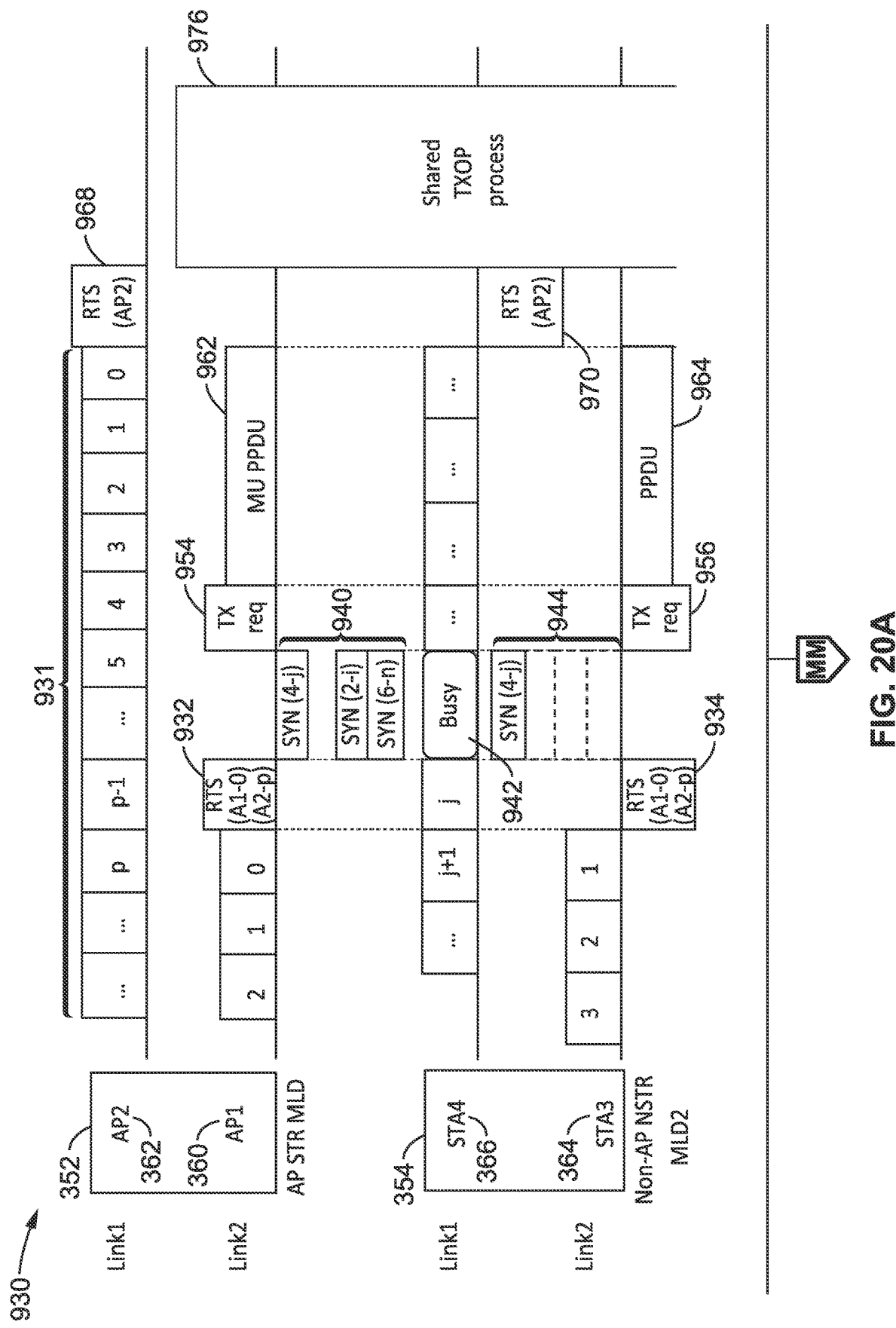
FIG. 20A and FIG. 20B is a communication diagram of a simultaneous SYN frame response (of RTS) over the frequency domain with TX_req scheduling DL MU PPDU over the time domain before a shared TXOP (AP STR MLD) is performed according to at least one embodiment of the present disclosure.
Figure 20B:
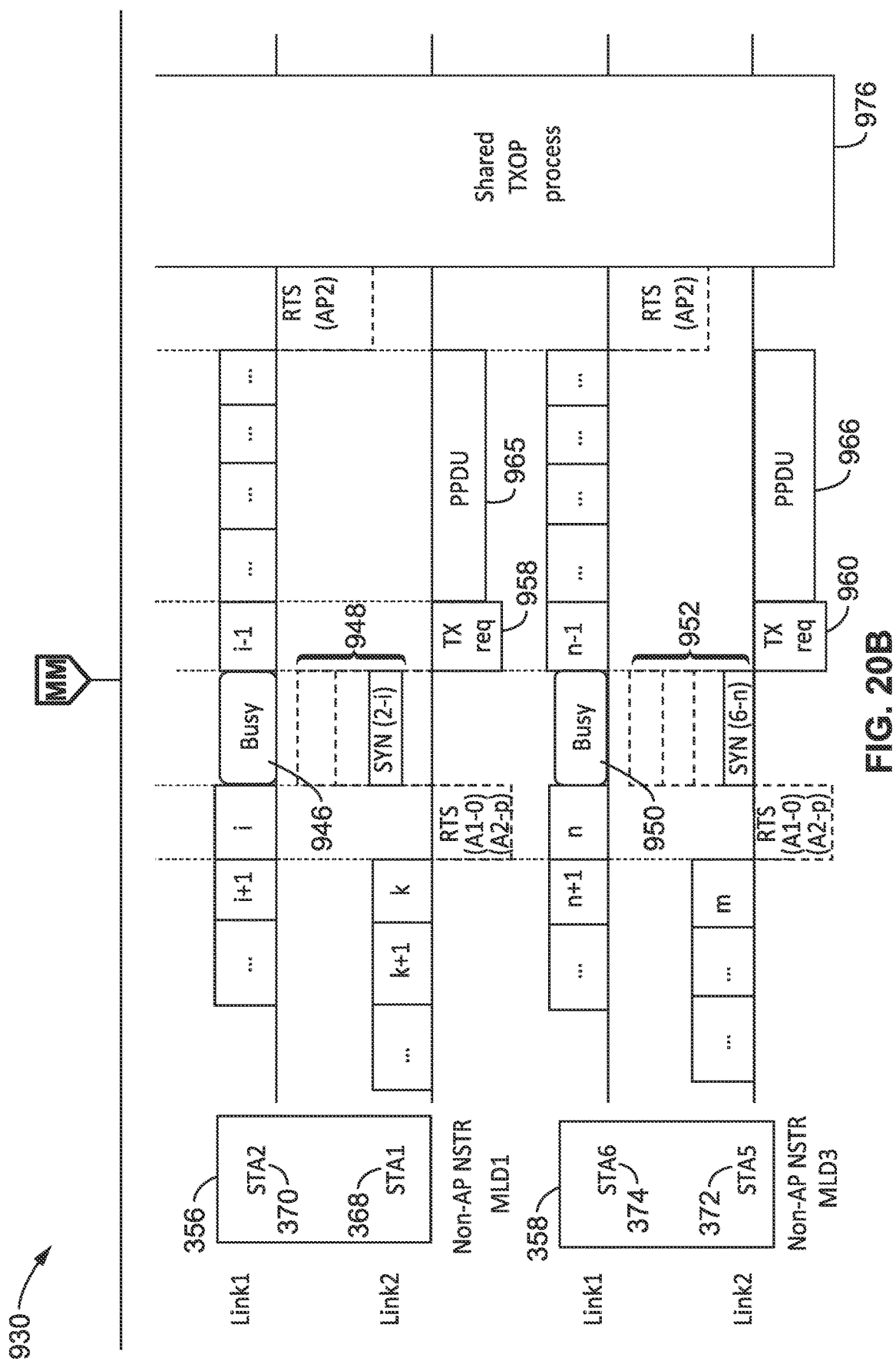

FIG. 20A and FIG. 20B illustrate an example embodiment 930 of a simultaneous SYN frame response (of RTS) over the frequency domain with TX_req scheduling DL MU PPDU over the time domain before a shared TXOP (AP STR MLD) is performed.

This sequence is almost identical to that of FIG. 19A and FIG. 19B. AP1 has completed its counting down, however AP2 is still counting. Thus AP1 generates a modified RTS 932 on Link2 which incorporates information about the backoff state for both APs in its MLD. The RTS is received 934 by STA 3 and is also available to other STAs on Link2.

Once a STA on Link2 receives this modified RTS, regardless of whether or not it is the destination of this RTS, the STA should reply with a SYN frame 944, 948 and 952 over Link2 to report the concurrent BO value of its other STA on the same affiliated NSTR MLD to AP1 which receives 940 this SYN information.

AP1 collects the BO information from these simultaneous SYN frames among different frequency slots on Link2 and determines the duration of TX/RX of SU/MU PPDU and schedules the transmission with a specified duration.

In at least one embodiment, the SYN frames can be simultaneously sent back to AP1 among different frequency slots that were predetermined for the different MLDs; while other mechanisms can be utilized for selecting the frequency slots without departing from the teachings of the present disclosure. It will be noted that STA2, STA4 and STA6 on Link1 are held in a busy state 946, 942 and 950.

AP1 determines which STA or AP has the smallest BO value, e.g., in this example AP2 of AP STR MLD has the smallest BO value, and thus which should continue counting down, and broadcasts a TX_req frame 954 to indicate which STA should keep or pause BO counting down on Link1 and which STA or AP should transmit a PPDU(s) on Link2, exemplified herein as an MU PPDU 962 in a certain time period or in certain frequency slots and for a certain time period. The transmission time duration in this example is determined as previously described.

In the figure a MU PPDU 962 is transmitted by AP2 and received at the multiple stations as PPDUs 964, 965 and 966 to fill in the time gap before the shared TXOP process 976 starts.

When AP2 BO reaches zero, a modified RTS 968 is transmitted by AP2 and is received 970 by STA4 and is available to other STAs on Link1. Then the shared TXOP 976 is commenced.

7.5. SYN Frame Response (of RTS) After IFS (AP STR MLD)

Figure 21A:
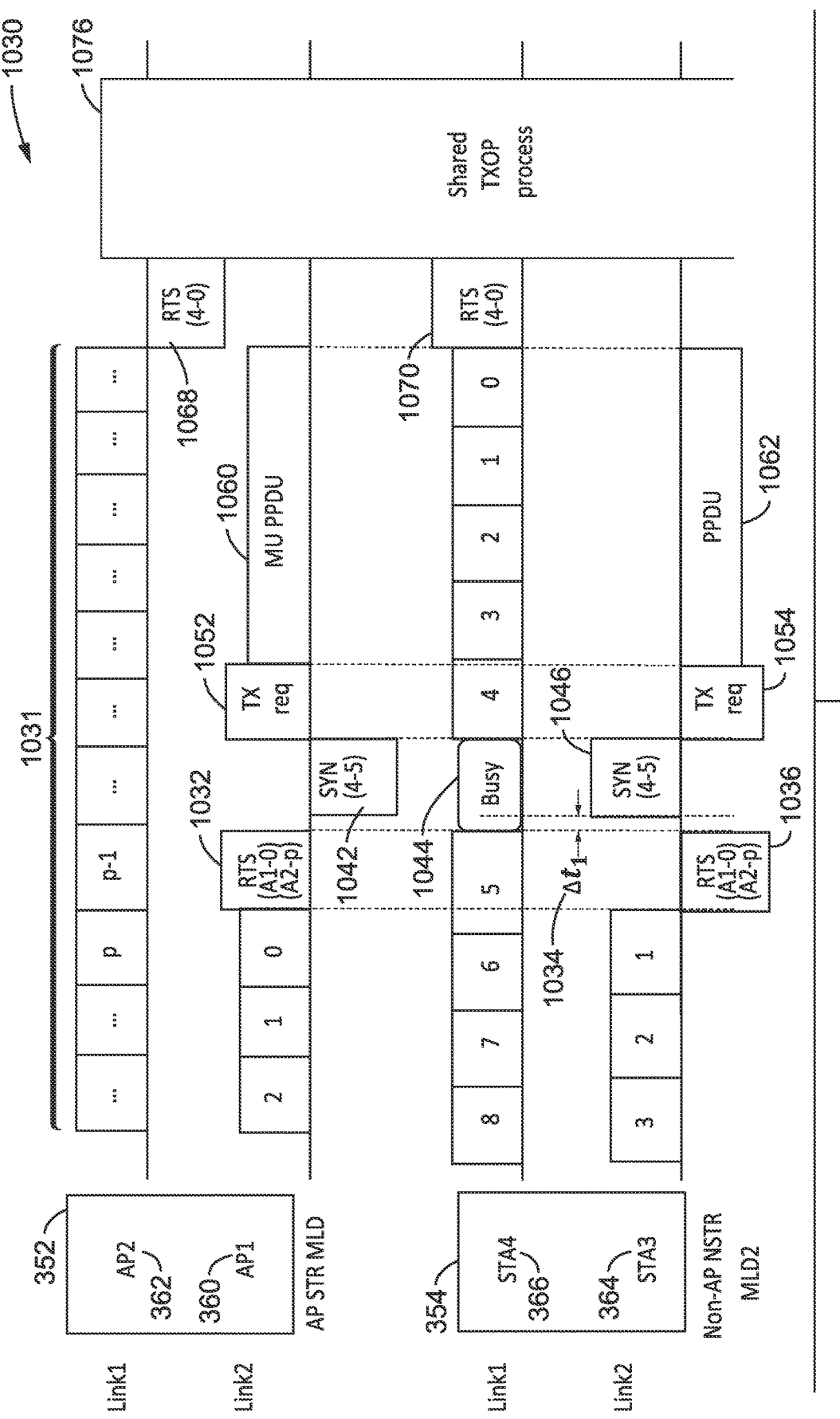
FIG. 21A and FIG. 21B is a communication diagram of a SYN frame response (of RTS) after IFS with TX_req scheduling DL MU PPDU over time domain before shared TXOP (AP STR MLD) according to at least one embodiment of the present disclosure.
Figure 21B:
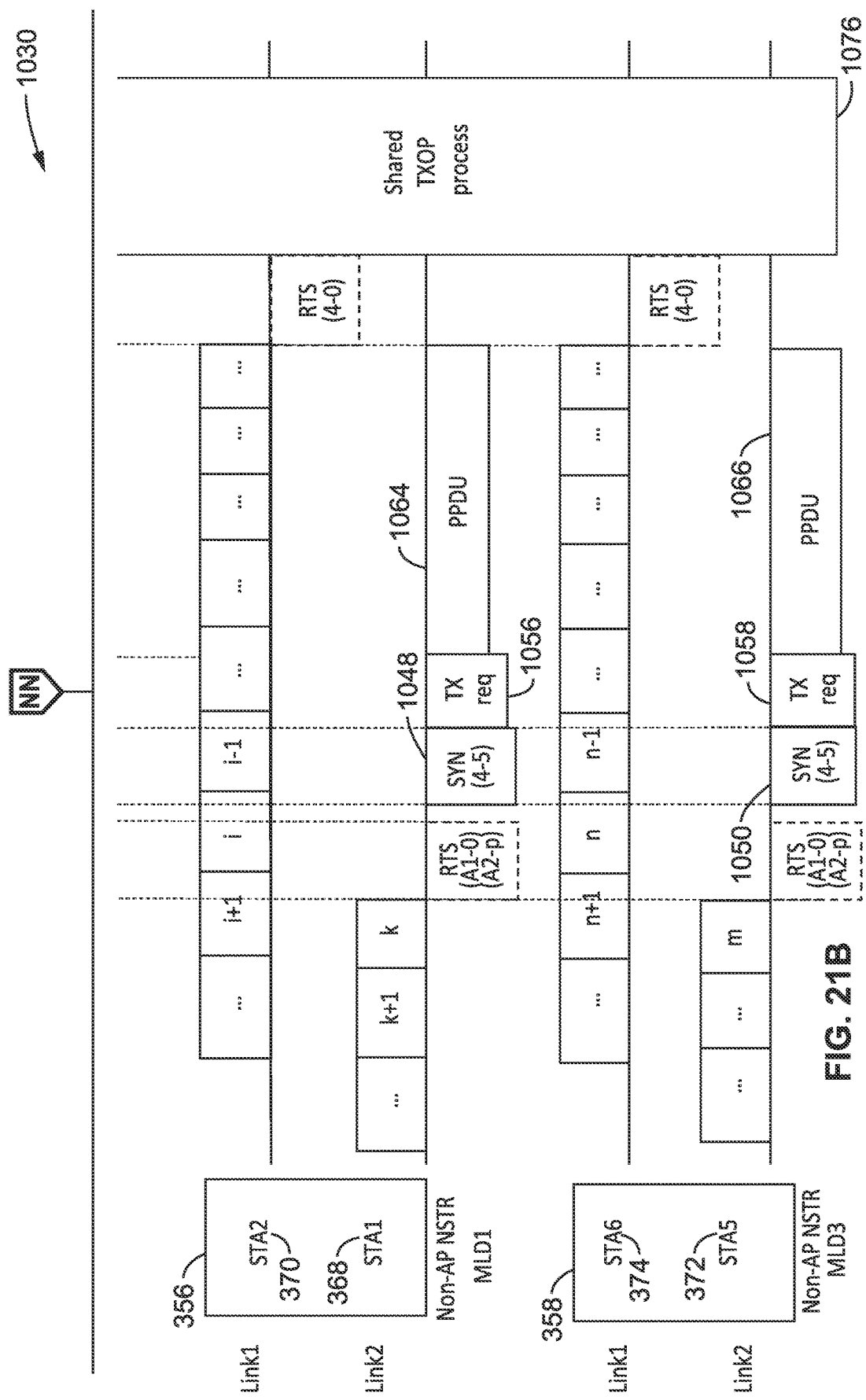

FIG. 21A and FIG. 21B illustrate an example embodiment 1030 of a SYN frame response (of RTS) after IFS with TX_req scheduling DL MU PPDU over the time domain before a shared TXOP (AP STR MLD).

The same topology and APs, STAs and MLDs are shown as in the previous examples, with interactions primarily being shown during backoff intervals 1031 as sequential time slots being counted down on each link.

The major difference between this scheduling method and those of Section 7.3 is with SYN frame response (of SYN) after IFS in which AP1 is the first one that obtains Link2 and unicasts a modified RTS to STA3, and that AP1 doesn't need to broadcast a SYN frame.

AP1 has completed its BO counting, although AP2 is still counting. Thus, AP1 generates a modified RTS 1032 on Link2 which incorporates information about the backoff state for both APs in its MLD. The RTS is received 1036 by STA3 and is also available to other STAs on Link2.

Once a STA on Link2 receives this modified RTS, regardless of whether or not the STA is the destination of the RTS, the STA should reply a SYN frame over Link2 to report the concurrent BO value of the other STA on the same affiliated NSTR MLD.

The major difference between this scheduling method and that of Section 7.4 is in regard to the simultaneous SYN frame response (of RTS) over the frequency domain is that the STAs respond with SYN frames using the full bandwidth, in order to prevent collision of simultaneous SYN frames, different IFS are calculated before different STAs respond with SYN frames over Link2. The IFS time is determined, such as in one embodiment to be proportional to the concurrent BO value of the STA of the same NSTR MLD STA on link1, while other mechanisms can be utilized without departing from the teachings of the present disclosure.

In response to the RTS from AP1, STA3 sends SYN frame 1046 which is received 1042, 1048 and 1050 by AP1 and the other Link2 STAs. It will be noted that STA4 on Link1 is held in a busy state 1044.

Upon receiving this SYN input, AP1 determines which STA or AP has the smallest BO value, and thus which STA or AP should continue counting down on Link1, and broadcasts a TX_req frame 1052 to indicate which STA should keep or pause BO counting down on Link1 and which STA or AP should transmit a PPDU(s) on Link2. The transmission time duration in this example is determined as previously described. The STAs receive 1054, 1056 and 1058 this TX_req. In response to which the STAs perform the transmission as indicated by the AP. In the Example shown, the AP transmits an MU PPDU 1060, which is received at the multiple stations as PPDUs 1062, 1064 and 1066.

Upon STA4 completing it BO count down it sets a modified RTS 1070 indicating the BO counts. This RTS is received 1068 by AP2 1068 and is also available to other STAs on Link1. In response to this RTS it is known that Link1 and Link2 are idle and the shared TXOP 1078 commences.

Figure 22A:
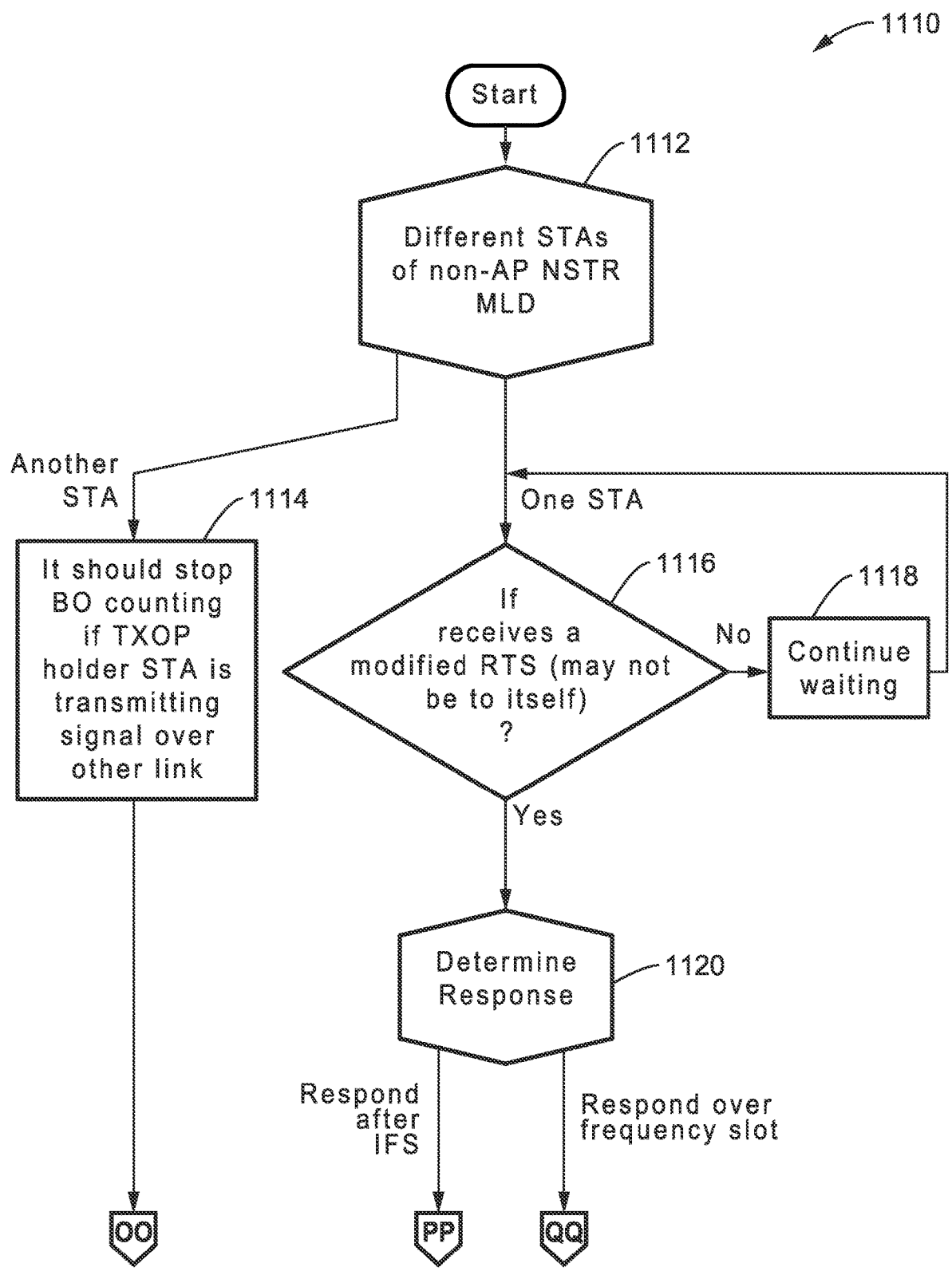
FIG. 22A and FIG. 22B is a flow diagram of a channel access process at the non-AP MLD level, which applies to the scenario that AP gains one link at the first place according to at least one embodiment of the present disclosure.
Figure 22B:
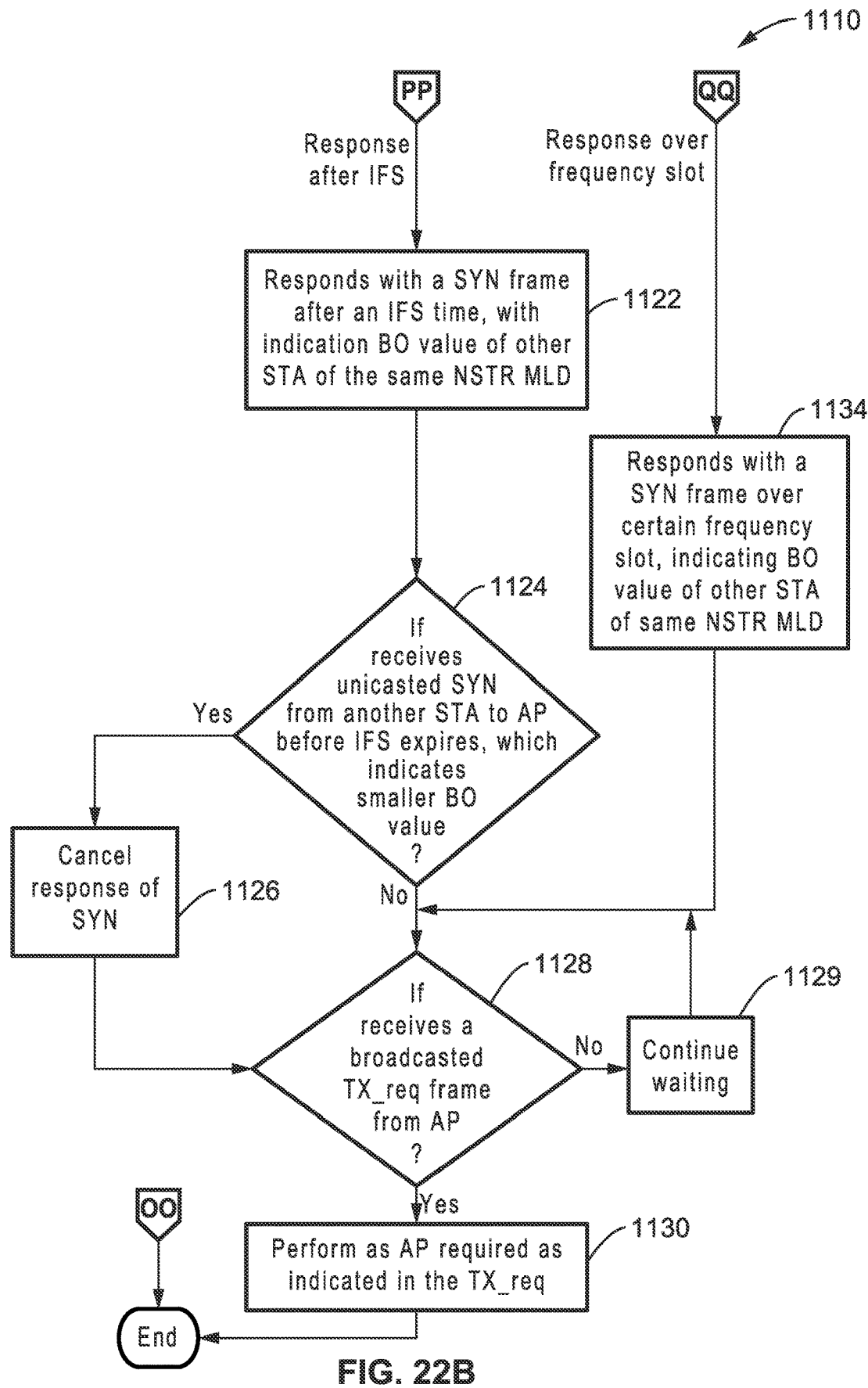

FIG. 22A and FIG. 22B illustrate an example embodiment 1110 of a channel access process at the non-AP MLD level, which applies to the scenario that the AP initially gains one link. At block 1112 a decision block determines between different stations of the non-AP NSTR MLD. If it is found to be another STA, that is operating on a different link than the one obtained (grabbed) by the TXOP holder STA/AP, then at block 1114 the STA should stop counting down its BO if the TXOP STA is transmitting a signal over the other link after which the process ends.

Otherwise, if at block 1112 it is determined that its one STA, which is operating on the same link as the one grabbed by the TXOP holder STA/AP, then check 1116 determines if it has received a modified RTS, which may or may not be directed to this STA. If it has not been received then it continues waiting 1118 looping back to block 1116 (subject to timeout considerations).

Upon receiving the RTS, then at decision block 1120 it determines the response to be performed. In this example the decision is to either respond after IFS, or to respond over frequency slot(s).

If it is determined to respond after IFS, then block 1122 of FIG. 22B is reached which responds with transmitting a SYN frame indicating the BO value of the other STA of the same MLD. A decision block 1124 determines if the STA has received, before IFS expiration, a unicasted SYN from another STA to the AP. If it has received another SYN that indicates a smaller BO value, then at block 1126 this STA cancels its own SYN, and execution reaches decision block 1128.

Otherwise, if the STA does not received the unicasted SYN from another STA to the AP before IFS expiration and indicates a smaller BO value, then execution moves directly to decision block 1128, which determines if a TX-req frame has been received from the AP. If it has not received the TX_req then it continues waiting 1129 and loops back to block 1128 (subject to timeout considerations). Upon receiving the TX_req, execution reaches block 1130 and the STA performs the functions indicated by the AP within the TX_req frame, after which this processing ends.

Returning to decision block 1120 in FIG. 22A, if the STA is to respond over a frequency slot, then execution moves to block 1134 of FIG. 22B which responds with a SYN frame over a certain frequency slot including an indication of the BO value of the other STA of the same NSTR MLD. Then execution reaches decision block 1128 which has already been described.

Figure 23:
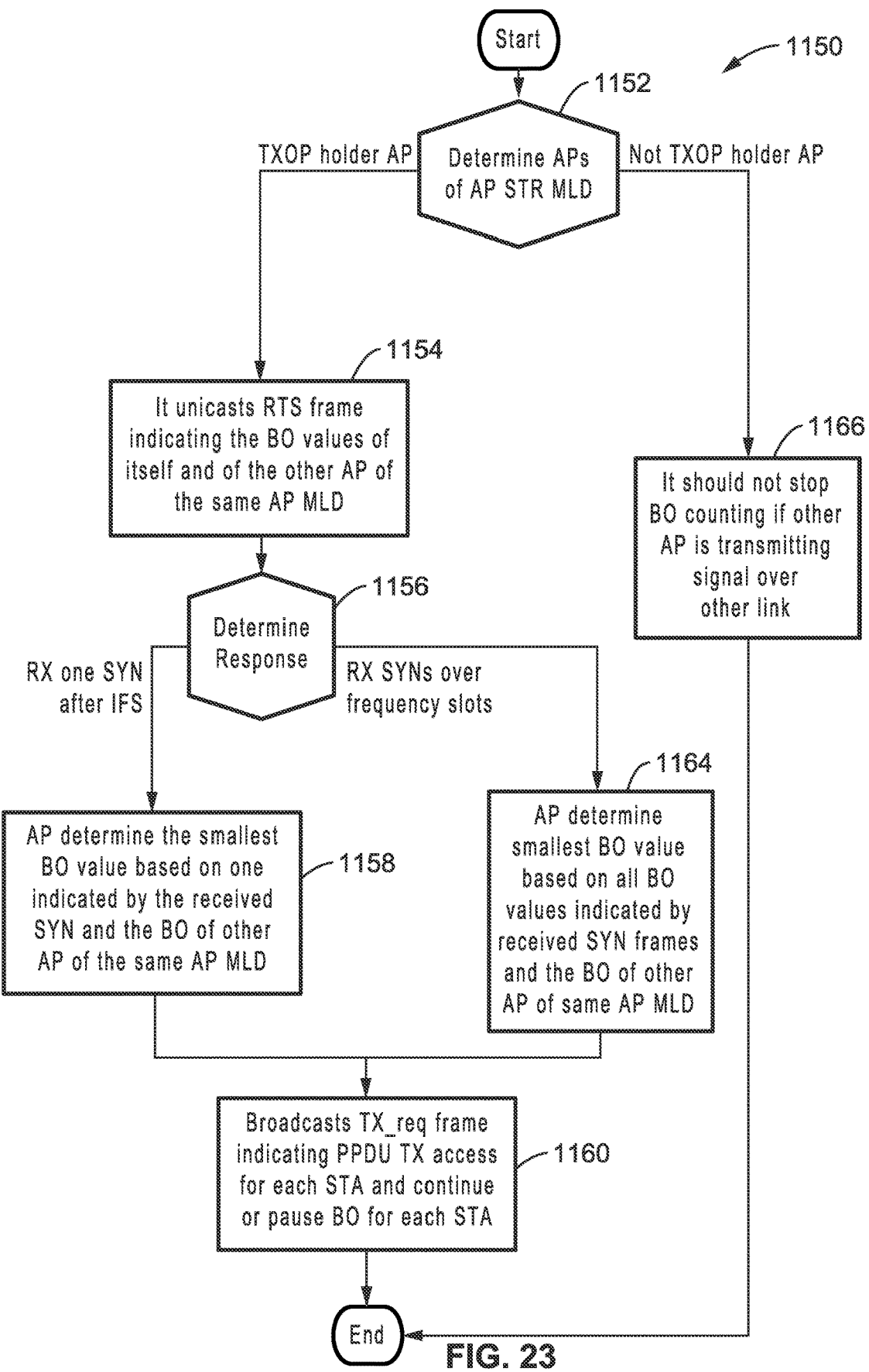
FIG. 23 is a flow diagram of channel access at the AP MLD level, which applies to the scenario that AP MLD gains one link at the first place according to at least one embodiment of the present disclosure.

FIG. 23 illustrates an example embodiment 1150 of channel access at the AP MLD level, which applies to the scenario that the AP MLD gains one link at the first place.

At decision block 1152 it is determined whether the AP station is the TXOP holder, or is not the TXOP holder. If it is not the TXOP holder, then at block 1166, the AP should continue BO counting if the other AP is transmitting a signal over the other link since AP MLD in this case is not soft AP, after which execution ends.

Otherwise, if the AP is the TXOP holder, then at block 1154 the AP unicasts an RTS frame which indicates the BO values of itself and the other AP of the same AP MLD.

After this a decision block 1156 determines what response to take. If it is determined that the AP should receive one SYN after the IFS, then at block 1158 the AP determines which is the smallest BO value based on the one indicated by the received SYN and the BO of the other AP of the same AP MLD.

Otherwise, if decision block 1156 determines that it is to receive SYNs over frequency slots, then at block 1164 the AP determines the smallest BO value based on all BO values indicated by the received SYN frames and the BO of the other AP of the same AP MLD.

In either case above, block 1160 is then reached in which the AP broadcasts a TX_req frame indicating to perform PPDU TX access for each STA and whether to continue or pause BO counting for each STA, and then the process ends.

7.6. Channel Access without SYN and TX_Req (AP STR MLD)

Figure 24A:
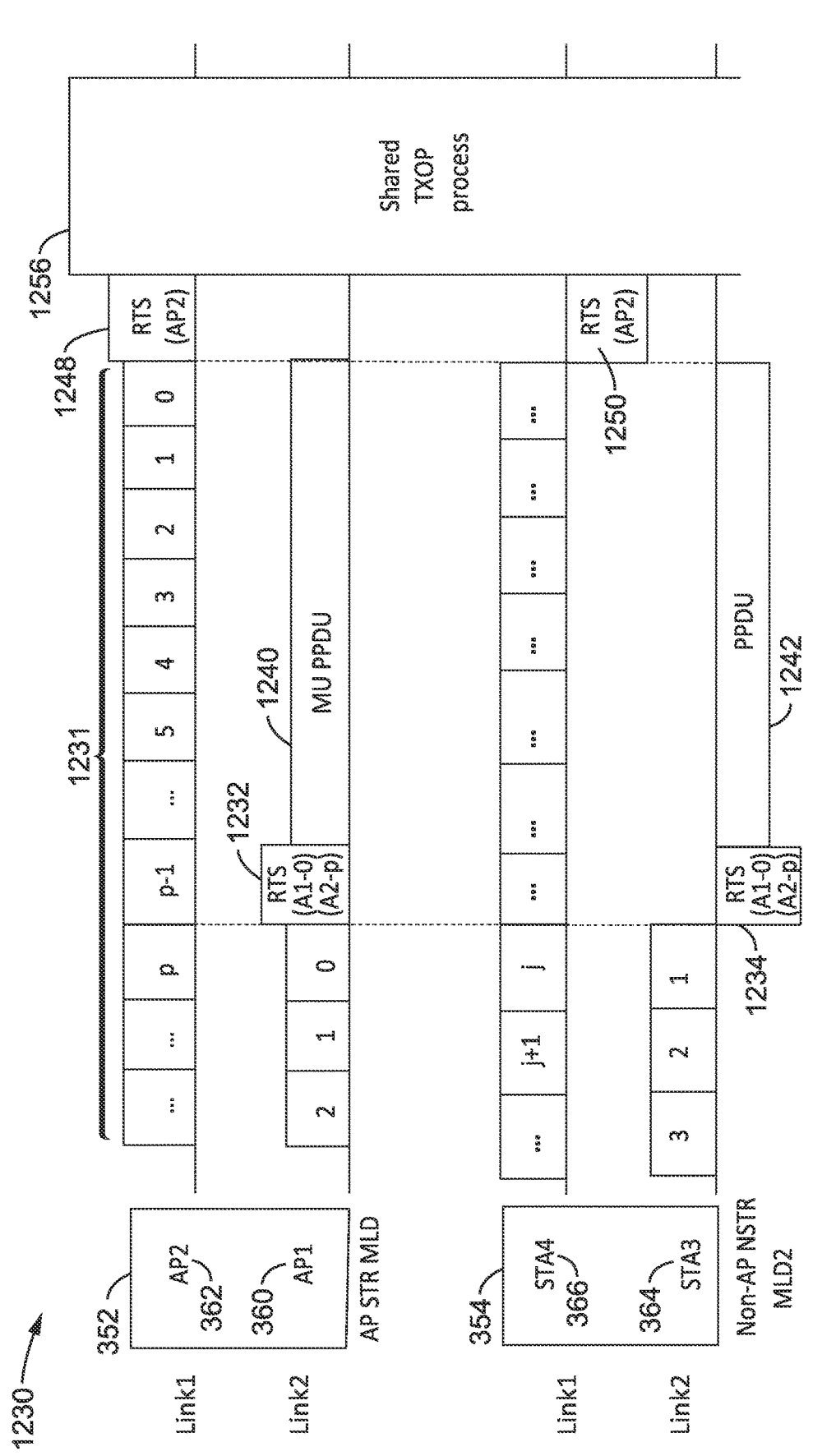
FIG. 24A and FIG. 24B is a communication diagram of channel access without SYN and TX_Req (AP STR MLD) channel scheduling method according to at least one embodiment of the present disclosure.
Figure 24B:
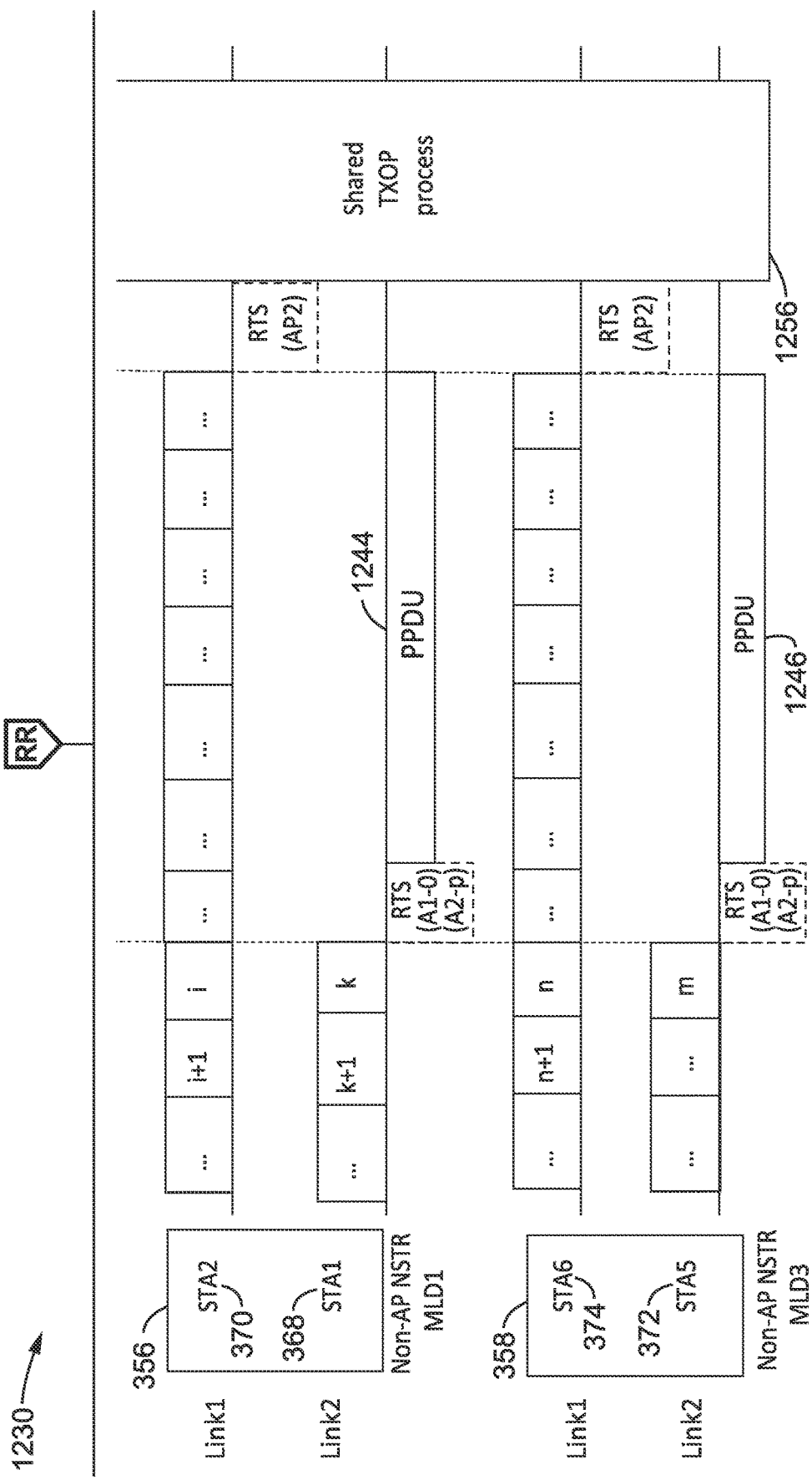

FIG. 24A and FIG. 24B illustrate an example embodiment 1230 of channel access without SYN and TX_Req (AP STR MLD) channel scheduling method.

The same topology, APs, STAs and MLDs are shown as in the previous examples, with interactions primarily being shown during backoff intervals 1231 as sequential time slots being counted down on each link.

The major difference of this scheduling method with others (e.g., Sections 7.2 through 7.5) is that after AP1 first obtains (grabs) Link2, AP1 directly starts the DL PPDU TX until AP2 of the same AP MLD obtains Link1. The transmission (TX) of DL PPDU can support different forms, including both SU PPDU or MU PPDU over different time/frequency periods.

Specifically the figure shows AP1 having completed its BO counting while AP2 is still counting. AP1 generates a modified RTS 1232 on Link2 which incorporates information about the backoff state for both APs in its MLD. The RTS is received 1234 by STA3 and is also available to other STAs on Link2.

Data transmission is performed in the gap time, exemplified as the AP immediately commencing a MU PPDU 1240 with the STAs receiving PPDUs 1242, 1244 and 1246.

AP2 completes its count down and sends a modified RTS 1248 which is received 1250 by STA4 and is also available to other STAs on Link2. The shared TXOP process 1256 then commences.

Figure 25:
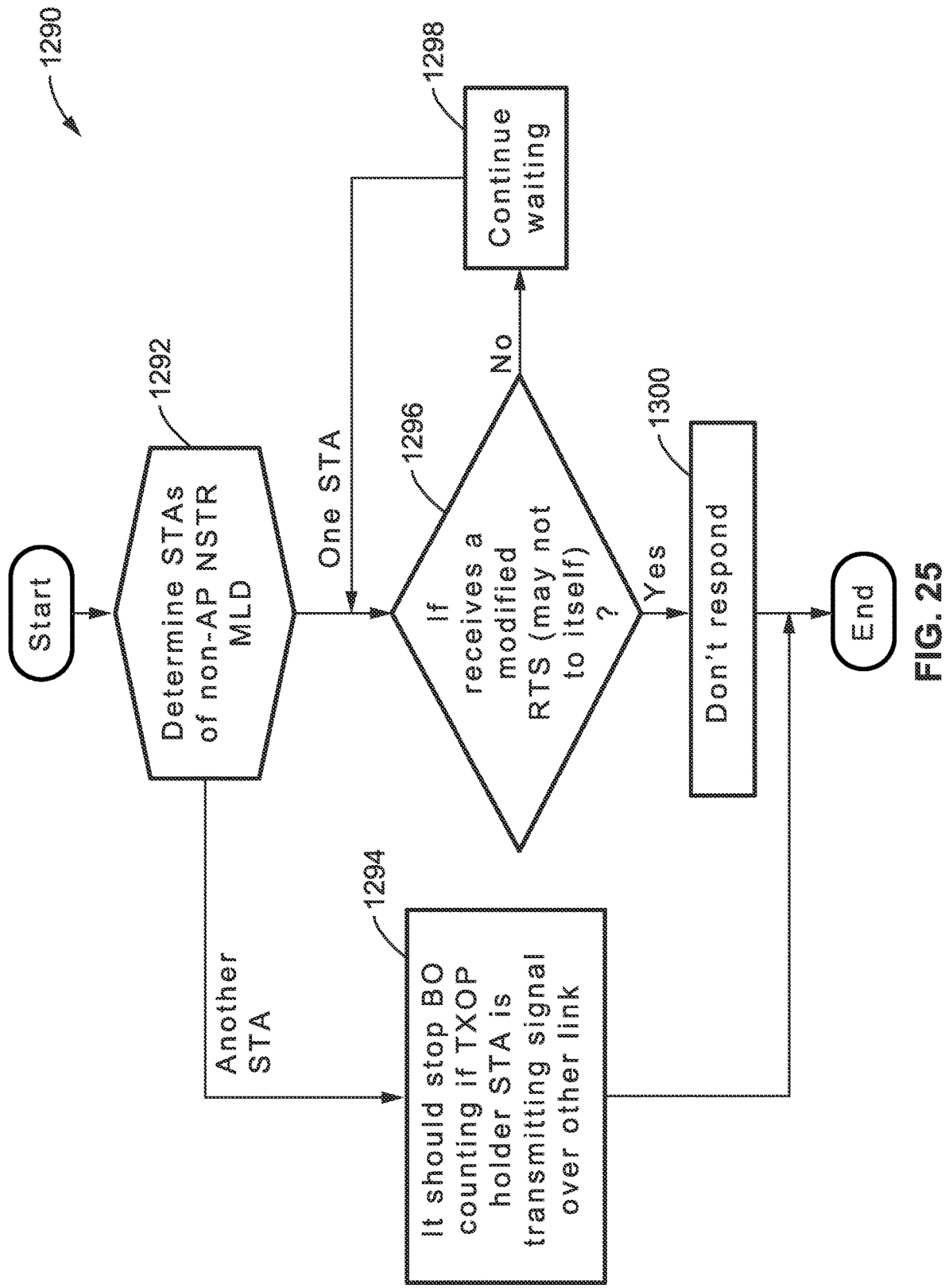
FIG. 25 is a flow diagram of channel access process (without utilizing the time gap) at the non-AP MLD level, which applies to the scenario that AP gains one link at the first place according to at least one embodiment of the present disclosure.

FIG. 25 illustrates an example embodiment 1290 of channel access process (without utilizing the time gap) at the non-AP MLD level, which applies to the scenario in which the AP gains an one link initially.

In block 1292 it is determined what type of STA is desiring to perform channel access. If it is another STA which is not operating on the same link as that obtained by the TXOP holder STA/AP, then block 1294 stops BO counting if the TXOP holder STA is transmitting a signal over the other link, then processing ends.

Otherwise, if the STA is the "one STA", which is operating on the same link as the one obtained by the TXOP holder STA/AP, then decision block 1296 checks if a modified RTS has been received, even if this RTS was not directed to this STA. If the RTS was not received, then the STA continues waiting 1298 looping to block 1296 (subject to timeout considerations). Upon receiving the RTS, then there is no response 1300 necessary in this embodiment before processing ends.

Figure 26:
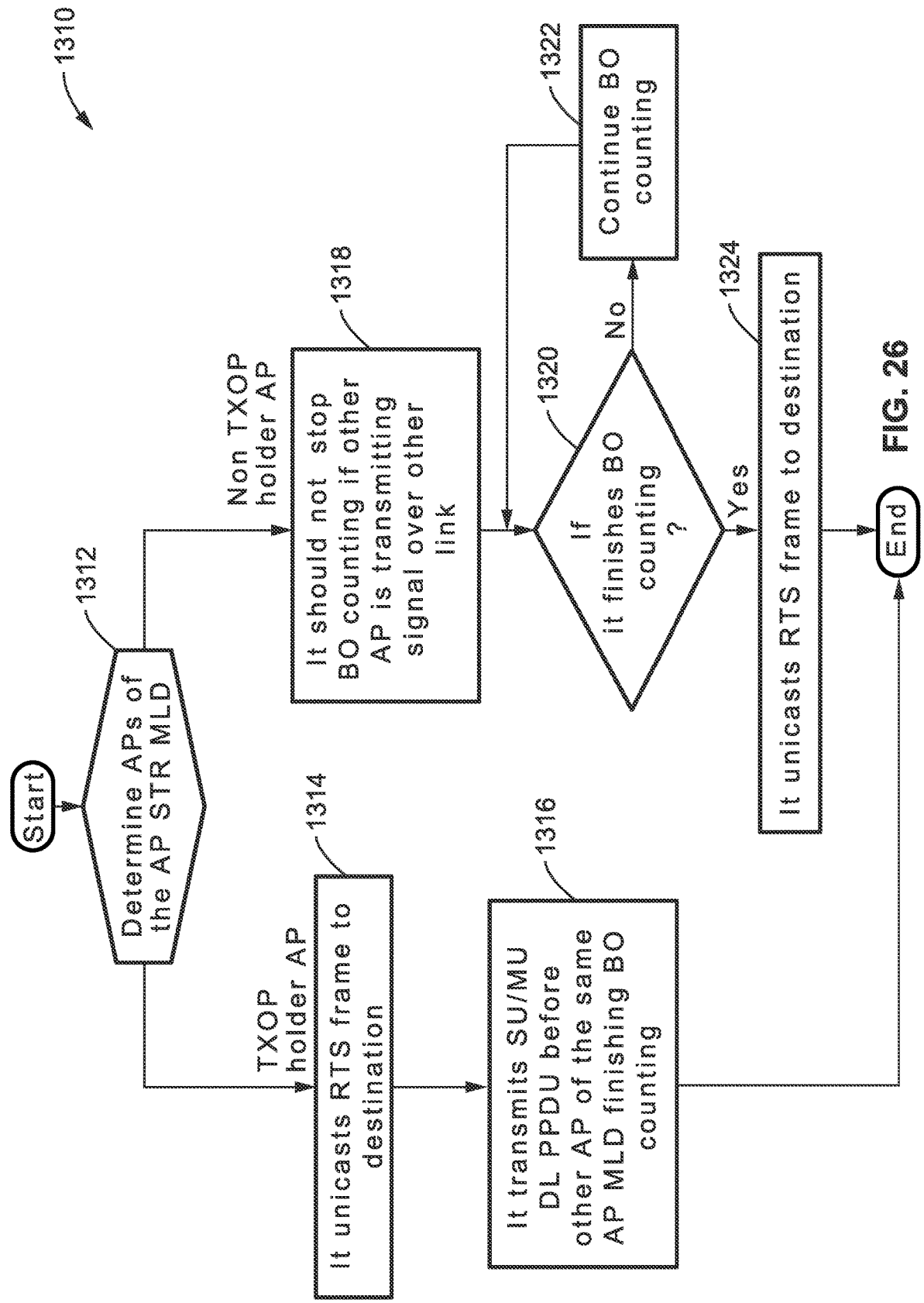
FIG. 26 is a flow diagram of a channel access process (without utilizing the time gap) at the AP MLD level, which applies to the scenario in which the AP gains one link initially according to at least one embodiment of the present disclosure.

FIG. 26 illustrates an example embodiment 1310 of a channel access process (without utilizing the time gap) at the AP MLD level, which applies to the scenario in which the AP initially gains one link.

At block 1312 a determination is made of the type of AP. If it is determined to be the TXOP holder AP, then at block 1314 the AP unicasts an RTS frame to a destination, followed by transmitting 1316 a SU or MU DL PPDU before the other AP of the same AP MLD finishes BO counting, and processing ends.

Otherwise, if it is not the TXOP holder AP, but an AP that is a non-holder of the TXOP (but affiliated with the same AP MLD as the TXOP holder), then at block 1318 the AP should continue BO counting (not stopping) if the other AP is transmitting a signal over the other link, since the AP MLD in this case is not a soft AP MLD. Then at decision block 1320 it is determined if the AP has finished BO counting. If counting has not been completed then it continues BO counting 1322, looping back to block 1320. When BO counting is completed, then at block 1324 the AP unicasts an RTS frame to a destination, before this process ends.

7.7. Simultaneous SYN Response Over the Frequency Domain (Soft AP NSTR MLD)

This section provides two examples of a simultaneous SYN response scheduling process over the Frequency Domain (soft AP NSTR MLD).

The procedure of this scheduling method is almost the same as the other one (Section 7.2) with the difference that the APs in this case are affiliated with a soft AP NSTR MLD. Thus, due to the in-device coexistence interference, one AP of the soft AP NSTR MLD could not receive over one link of the NSTR link pair when another AP of the same soft AP NSTR MLD simultaneously transmits over another link of the NSTR link pair. If one AP of the soft NSTR MLD is transmitting over one link of the NSTR link pair, the other AP of the same soft NSTR MLD should pause any BO counting it is performing.

Figure 27A:
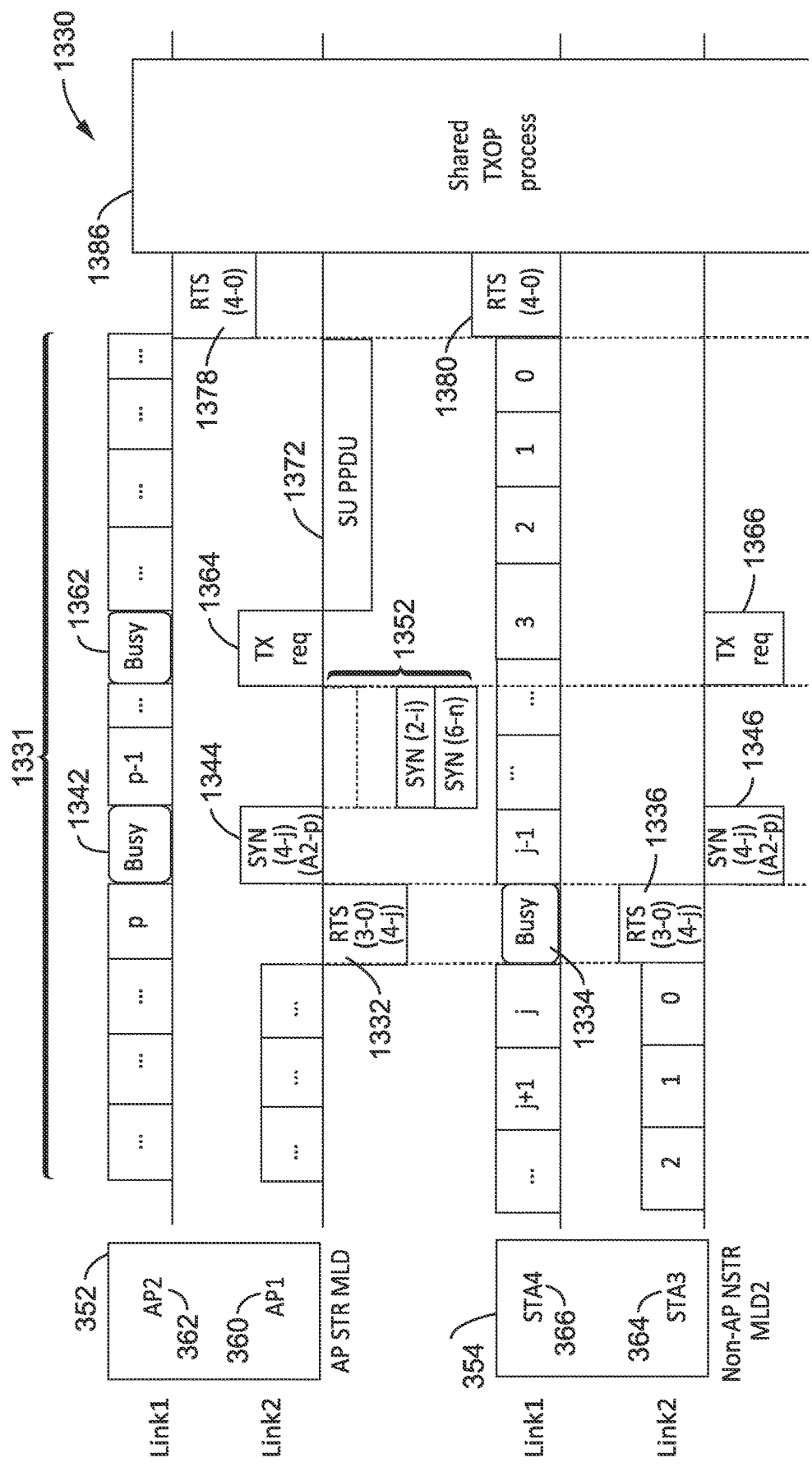
FIG. 27A and FIG. 27B is a communication diagram of a case in which AP1 of AP NSTR MLD transmits SYN or TX_req frames over link2, in response to which the BO counter of AP2 affiliating with the AP NSTR MLD will be paused during AP1 transmission according to at least one embodiment of the present disclosure.
Figure 27B:
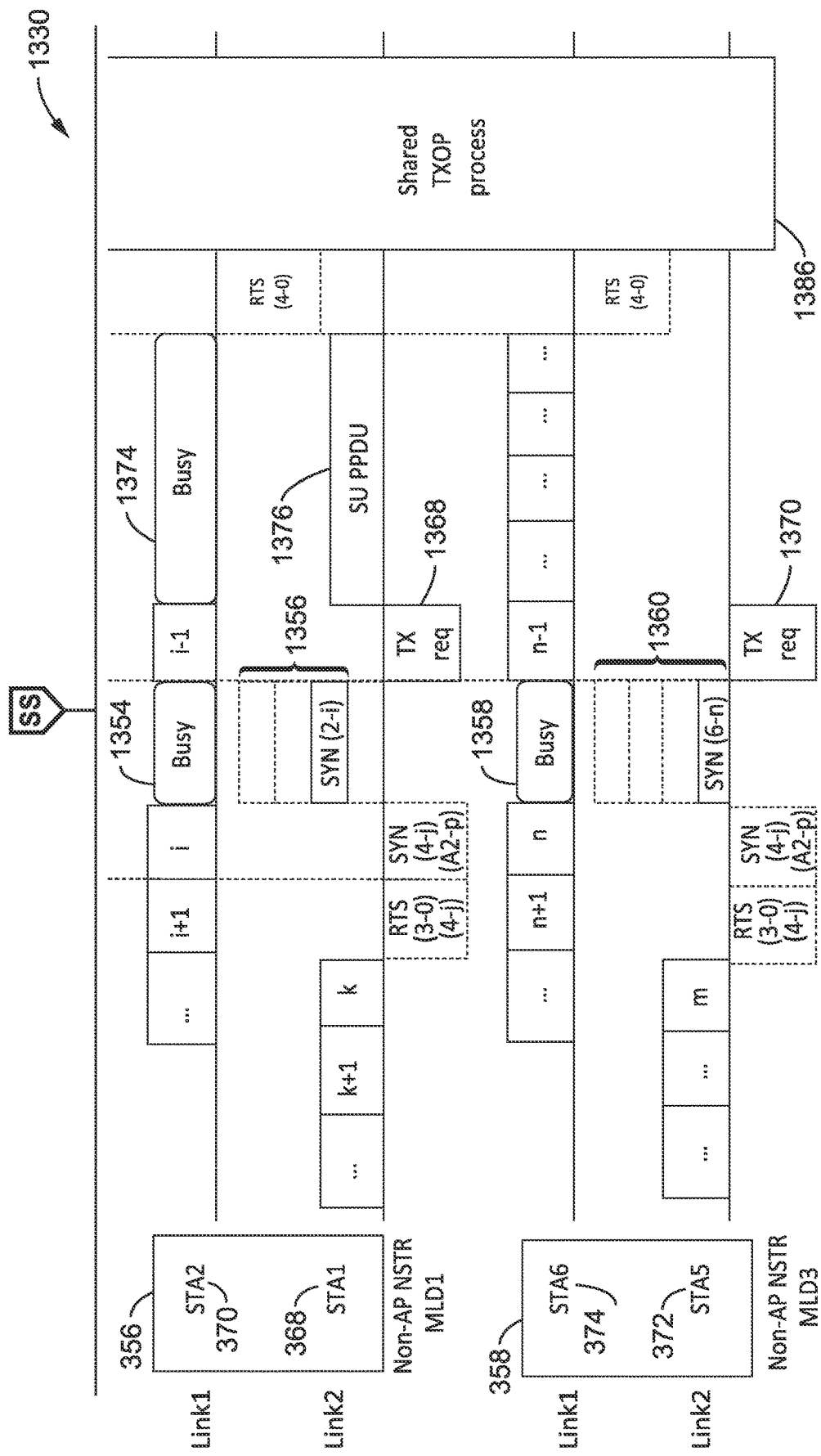

FIG. 27A and FIG. 27B illustrate an example embodiment 1330, of a case in which AP1 of AP NSTR MLD transmits SYN or TX_req frames over Link2, in response to which the BO counter of AP2 affiliating with the AP NSTR MLD will be paused during AP1 transmission.

The figure primarily is depicting the interval in which backoffs 1331, shown as the sequential time slots, are being counted down on each link. If the backoff (BO) counter of one STA (e.g., STA3 in this example) of a non-AP NSTR MLD first counts down to zero, then it obtains access of one link (ready link) (e.g., Link2) of the NSTR link pair having multiple links here exemplified as Link1 and Link2. STA3 unicasts a modified RTS frame 1336, which indicates current BO value for itself (zero) and the current BO value of the other STA (referred to as another link or non-ready link)

(e.g., STA4 in this example) of the same NSTR MLD, which is received 1332 by AP1 of AP STR MLD that is also operating on Link2.

When other STAs receive the modified RTS frame, if they determine that they are not the destination of the RTS over Link2, then they are configured according to the present disclosure to reserve Link2. AP1 processes the BO values from the modified RTS frame 1336 and determines the smaller BO value between STA4 as indicated in the RTS frame and its AP MLD pair AP2.

AP1 then broadcasts a SYN frame 1344 indicating selection of the smaller BO on Link1 (i.e., BO is j). This SYN frame is received 1346 by STA3 and the other stations. STA1 and STA5 generate SYN frames 1356 and 1360, while STA2 and STA6 are held busy 1354 and 1358. AP1 receives 1352 SYN frame responses with their BO values for Link1, in response to its SYN transmission.

AP1 then sends a TX_req 1364 to the other STAs, shown receiving it 1366, 1368 and 1370, while AP2 are marked busy 1362.

Then STA1 is seen transmitting an SU PPDU 1376, which is received 1372 by AP during the time gap, with STA2 held busy 1374. As STA4 counts down to zero on Link1 it sends a modified RTS 1380, which is received 1378 by AP2 and other Link1 stations. After this the shared TXOP process 1386 is commenced.

Figure 28A:
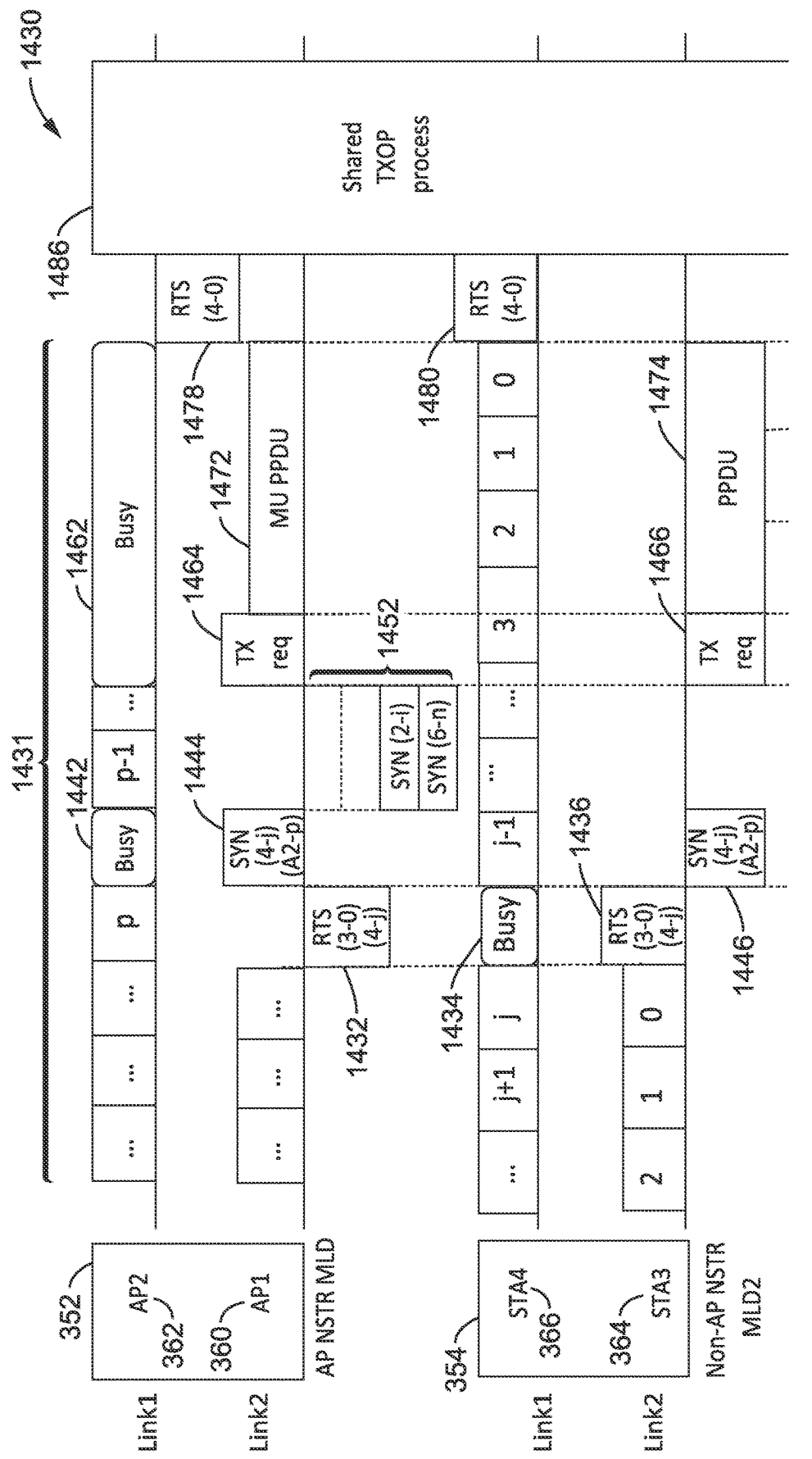
FIG. 28A and FIG. 28B is a communication diagram of a case in which AP1 of AP NSTR MLD transmits a DL MU PPDU over link2, in response to which BO counter of AP2 would be paused during this AP1 transmission according to at least one embodiment of the present disclosure.
Figure 28B:
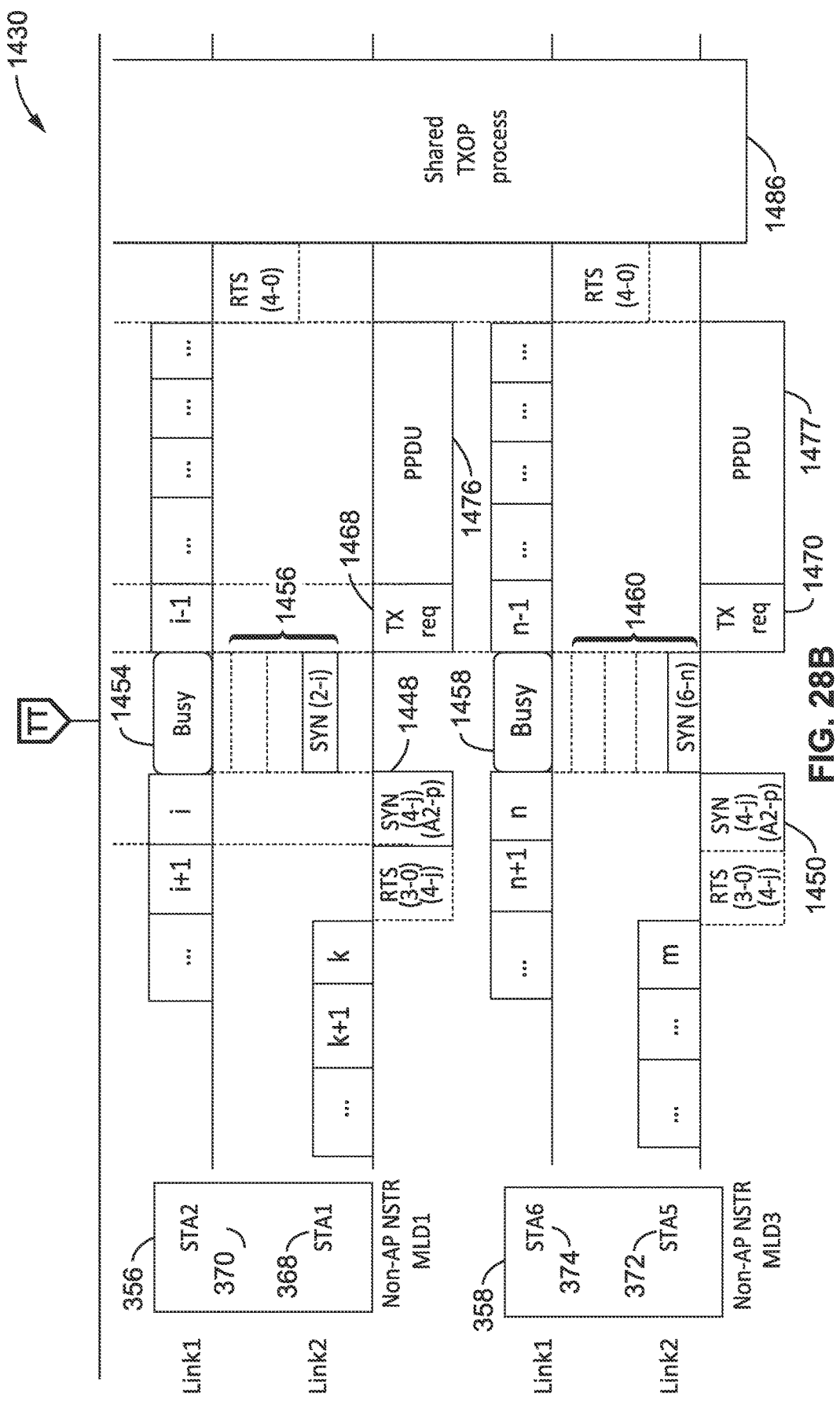

FIG. 28A and FIG. 28B illustrate an example embodiment 1430, of a case in which AP1 of AP NSTR MLD transmits a DL MU PPDU over Link2, in response to which the BO counter of AP2 is paused during this AP1 transmission.

The figure is very similar to previous examples, and depicts the interval in which backoffs 1431, shown as the sequential time slots, are being counted down on each link. If the backoff (BO) counter of one STA (e.g., STA3 in this example) of a non-AP NSTR MLD first counts down to zero, then it obtains access to one link (ready link) (e.g., Link 2) of the NSTR link pair having multiple links here exemplified as Link1 and Link2. STA3 unicasts a modified RTS frame 1436, which indicates a current BO value for itself (zero) and the current BO value of the other STA (referred to as another link or non-ready link) (e.g., STA4 in this example) of the same NSTR MLD, to AP1 of AP STR MLD that is also operating on Link2. The modified RTS is received 1432 by AP1 and other STA on Link2, in response to the RTS, STA4 is set to busy 1434.

When other STAs receive the modified RTS frame, if they determine that they are not the destination of the RTS over Link2, then they are configured according to the present disclosure to reserve Link2. AP1 processes the BO values from the received 1432 RTS frame and determines the shortest BO value on Link1 from STA4 as indicated in the RTS frame and its AP MLD node pair AP2.

AP1 then broadcasts a SYN frame 1444 indicating selection of the smaller BO on Link1 (i.e., BO is j). This SYN frame is received 1446, 1448 and 1450 by the other stations. STA1 and STA5 send SYN frames 1456, 1460 which are received 1452 by AP1 with its BO value for Link1, in response to its SYN transmission.

AP1 then sends a TX_req 1464 to the other STAs, shown receiving it 1466, 1468 and 1470, while AP2 is marked busy 1462 for the duration of this request and the associated transmission. AP1 then transmits a MU PPDU 1472 which is received by the STAs as PPDU 1474, 1476 and 1477 during the time gap. As STA4 counts down to zero on Link1 it sends a modified RTS 1480, which is received 1478 by AP2 and is also available to other STAs on Link1. After this the shared TXOP process 1488 commences.

Figure 29A:
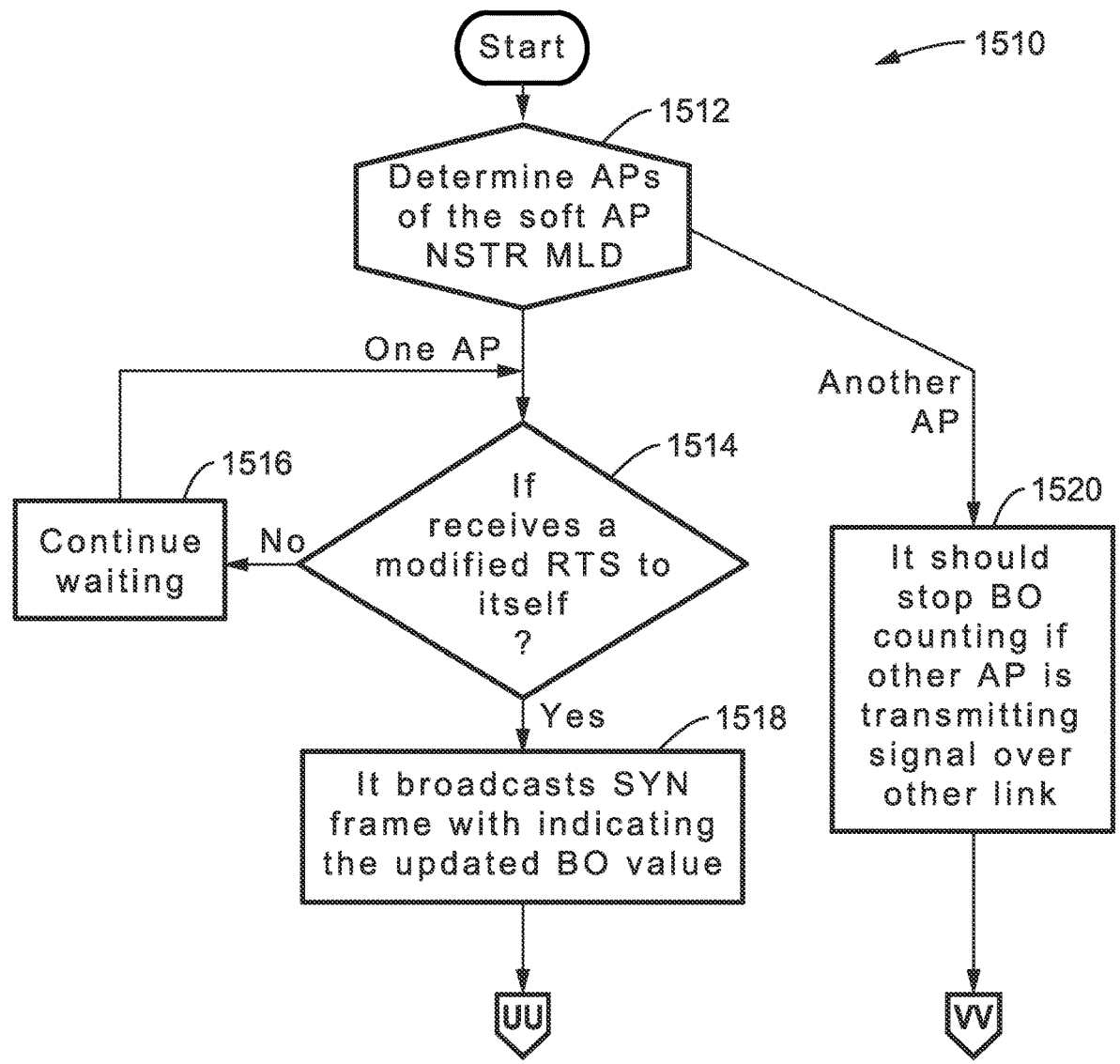
FIG. 29A and FIG. 29B is a flow diagram of a the channel access process at the AP MLD level, which applies to the scenario in which the AP MLD doesn't initially gain one of the links according to at least one embodiment of the present disclosure.
Figure 29B:
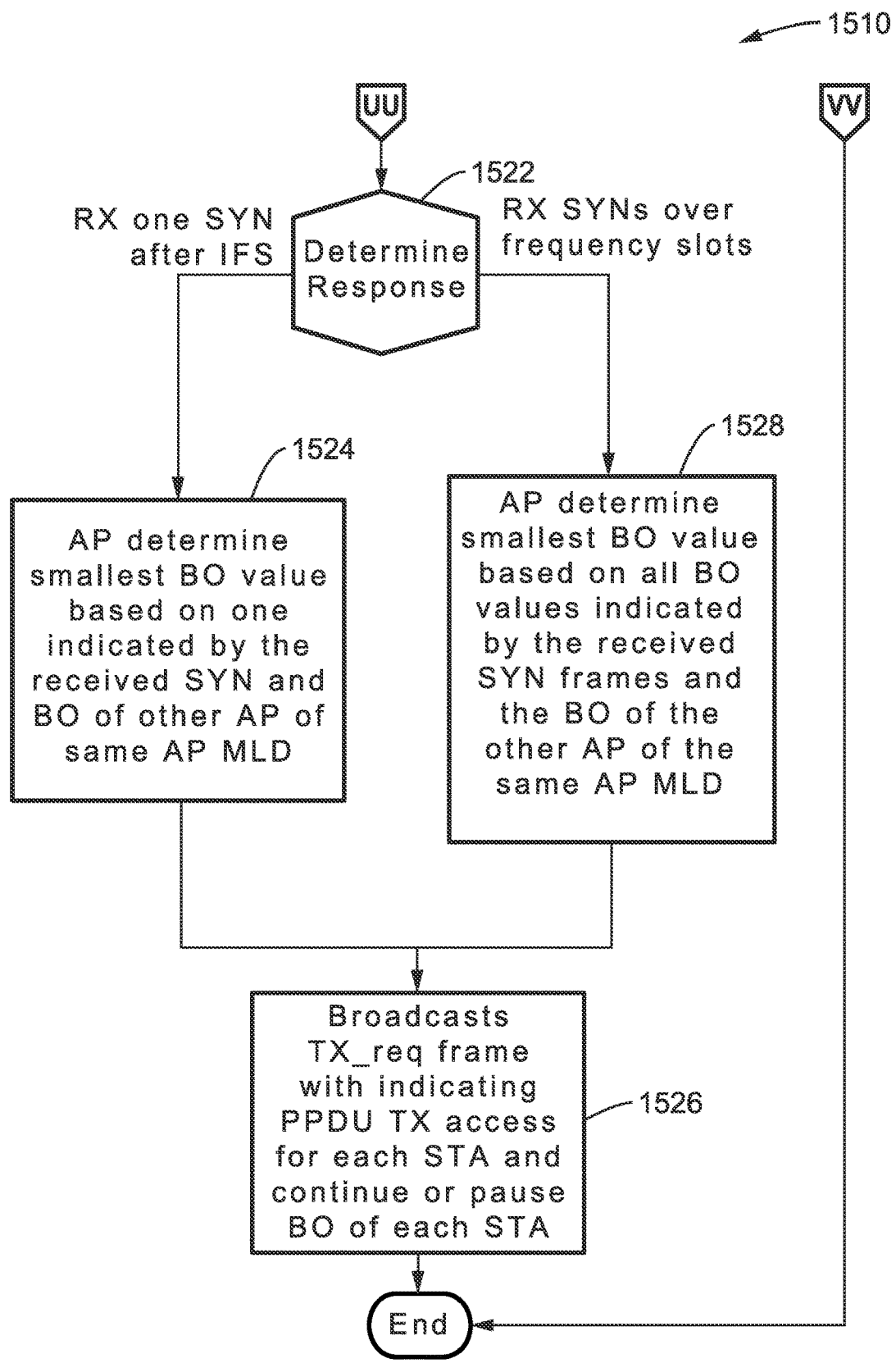

FIG. 29A and FIG. 29B illustrate an example embodiment 1510 of the channel access process at the soft AP MLD level, which applies to the scenario in which the AP MLD doesn't initially gain any one of the links and is similar to that of FIG. 18A and FIG. 18B.

At block 1512 it is determined which AP is executing the process, whether it is the AP that operates on the same link as the one obtained by the non-AP TXOP holder STA, or is it another AP, which is the operating on the other link of the same NSTR AP MLD. If it is another AP, then at block 1520 the AP stops its BO counting if the other AP of the MLD is transmitting a signal over the other link, and the process ends.

Otherwise, if the AP is the one that is operating on the same link that was obtained by the non-AP TXOP holder STAs, then at decision block 1514 a check determines if the AP has received a modified RTS, which was directed to itself. If it has not received the RTS, then it waits 1516 while looping to 1514 (subject to timeout considerations). When the RTS is received, then at block 1518 the AP broadcasts a SYN frame which includes the updated BO values, with execution moving to block 1522 in FIG. 29B.

At block 1522 in FIG. 29B a determination is made as to the response, with the present scenario given by way of example and not limitation providing two different choices. If it is determined to respond by receiving one SYN after IFS, then at block 1524 the AP determines the smallest BO value based on the received BO information carried by SYN frames and BO of the other AP of the same AP MLD, then execution moves to block 1526.

Otherwise, if at block 1522 it is determined to respond with receiving SYNs over frequency slots, then execution reaches block 1528 in which the AP determines smallest BO value based on all the BO values received as well as the BO value of the other AP of the same MLD, then execution moves to block 1526.

In either case execution reaches block 1526 in which the AP broadcasts a TX_req frame including specifying PPDU access and whether each STA should continue or pause its BO counting, after which the process ends.

7.8. Simultaneous SYN Frame Response (of RTS) Over the Frequency Domain (Soft AP NSTR MLD)

Figure 30A:
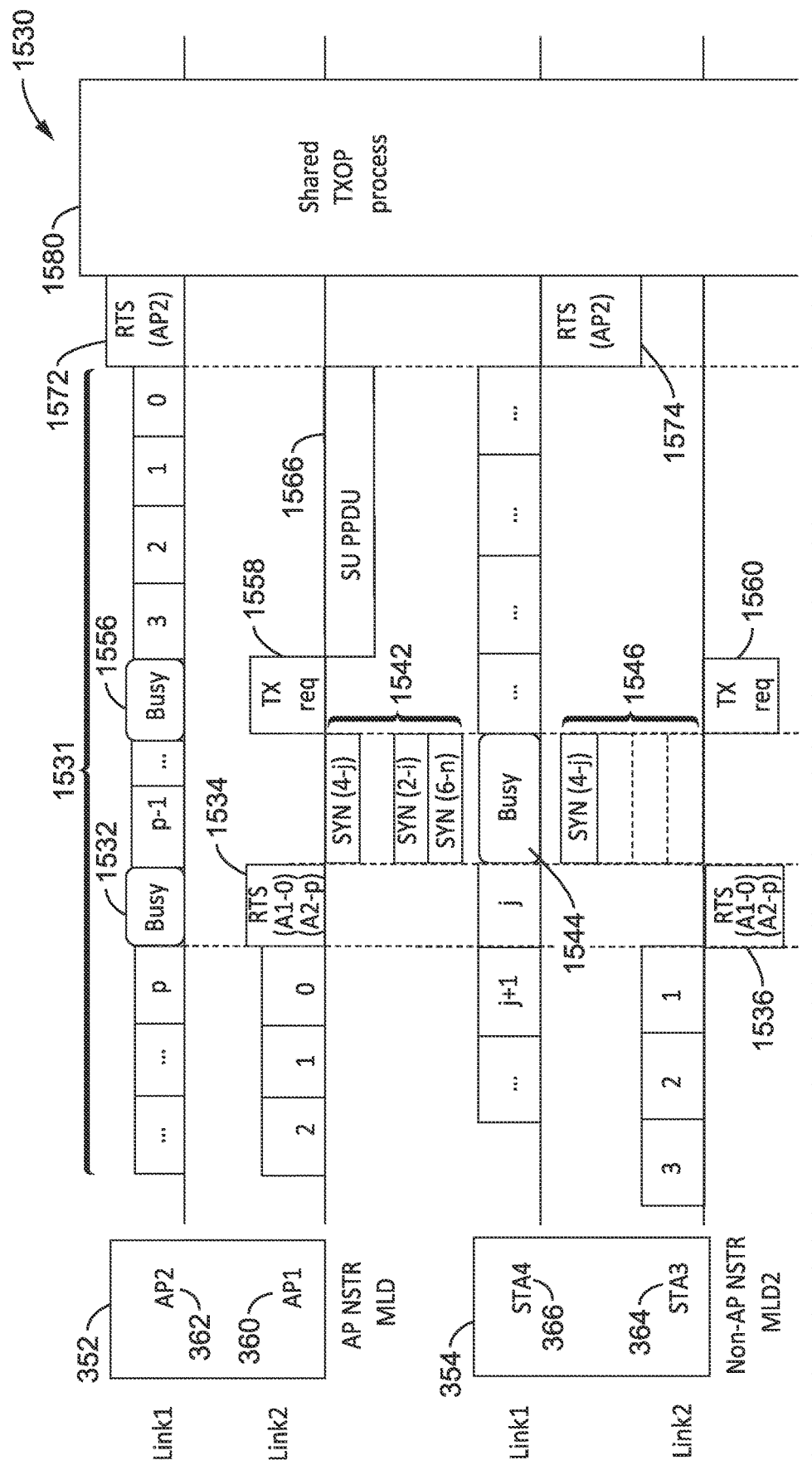
FIG. 30A and FIG. 30B is a communication diagram of a simultaneous SYN frame response over the frequency domain (soft AP NSTR MLD) scenario according to at least one embodiment of the present disclosure.
Figure 30B:
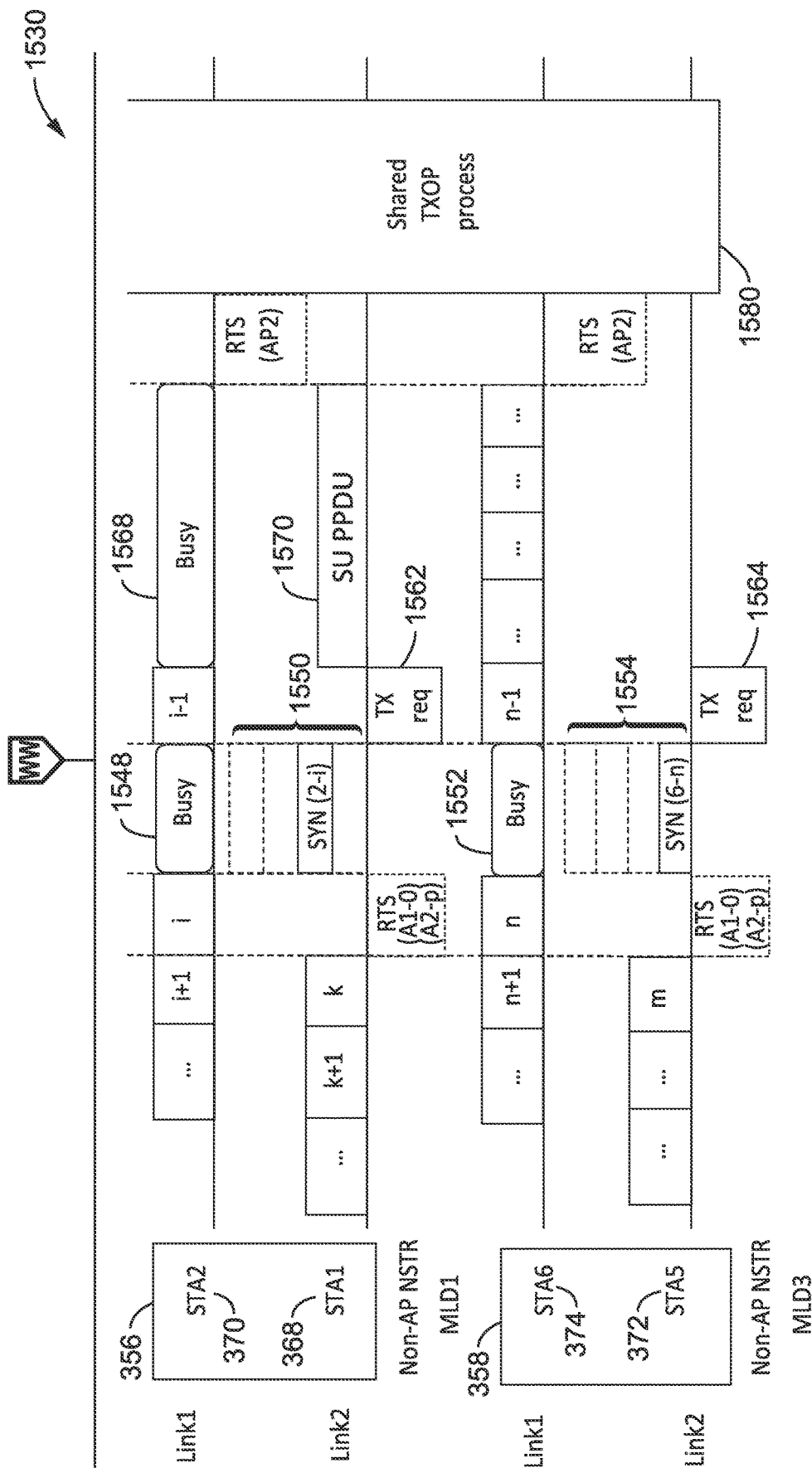

FIG. 30A and FIG. 30B illustrate an example embodiment 1530 of a simultaneous SYN frame response over the frequency domain (soft AP NSTR MLD) scenario. This scheduling method is almost the same as the one described previously (e.g., Section 7.4) with the difference being that the APs in this case are affiliated with a soft AP NSTR MLD. The properties of soft AP NSTR MLD are described in (Section 7.7). There are also some changes of that the transmitter and receiver, as well as the UL/DL and SU/MU PPDU transmissions need to make to adapt as per this figure.

The same topology and APs, STAs and MLDs are shown as in the previous examples, with interactions primarily being shown during backoff intervals 1531 as sequential time slots being counted down on each link.

AP1 has completed its counting down, however AP2 is still counting. Thus AP1 generates a modified RTS 1534 on Link2 which incorporates information about the backoff state for both APs in its MLD. During the RTS AP2 is set to busy 1532. The RTS is received 1536 by STA3 and is also available to other STAs on Link2.

Once a STA on Link2 receives this modified RTS, regardless of whether or not it is the destination of this RTS or not, the STA replies with SYN frames over different frequency slots 1546, 1550 and 1554 over Link2 to report the concurrent BO value of its other STA on the same affiliated NSTR MLD to AP1 which receives 1542 this SYN information.

AP1 collects the BO information from these simultaneous SYN frames among different frequency slots on Link2 and determines the duration of TX/RX of SU/MU PPDU and schedules the transmission with a specified duration.

AP1 determines which STA or AP has the smallest BO value, and thus which should continue counting down, and broadcasts a TX_req frame 1558 to indicate which STAs should continue or pause BO counting on Link1 and which STA or AP should transmit a PPDU(s) on Link2, which is received 1560, 1562 and 1564. The transmission of the TX_req frame on Link2 causes the CCA busy for AP2 on Link1.

In response to the information in the TX_req, STA1 transmits an SU PPDU 1570 which is received 1566 by AP1. It will be noted that during the SU PPDU, STA2 of the non-AP NSTR MLD1, which is the same MLD as STA1 is CCA busy. Thus the transmission from the non-AP NSTR MLD1 fills in the time gap before the shared TXOP.

When AP2 BO reaches zero, a modified RTS 1572 is transmitted indicating that counting is completed, and is received 1574 by STA4 and is also available to other STAs on Link1, after which the shared TXOP 1580 commences.

7.9. SYN Frame Response (of SYN) After IFS (soft AP NSTR MLD)

Figure 31A:
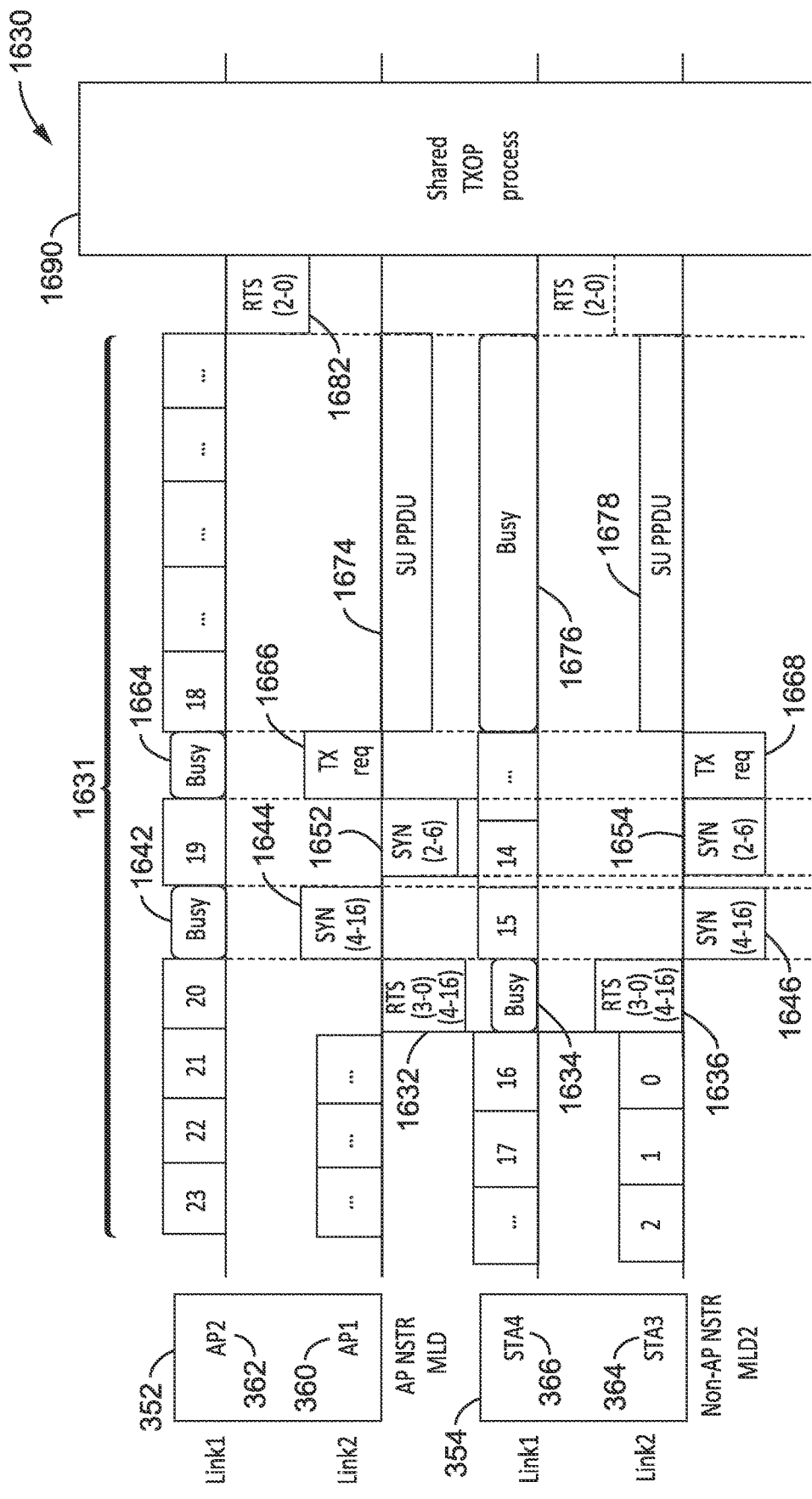
FIG. 31A and FIG. 31B is a communication diagram of a SYN frame response (of SYN) after IFS with TX_req of UL SU PPDU before a shared TXOP (soft AP NSTR MLD) according to at least one embodiment of the present disclosure.
Figure 31B:
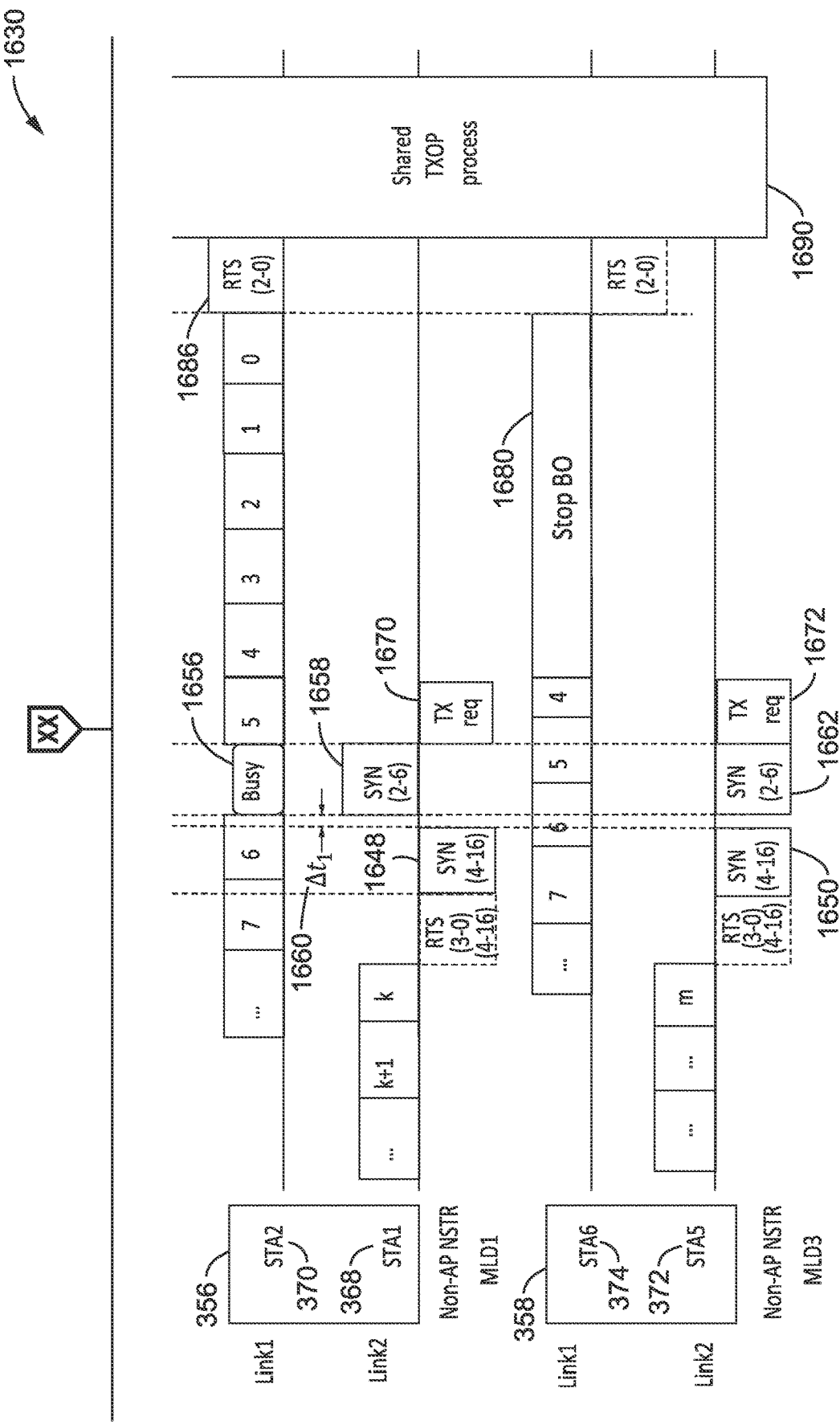

FIG. 31A and FIG. 31B illustrate an example embodiment 1630 of a SYN frame response (of SYN) after IFS with TX_req of UL SU PPDU before a shared TXOP (soft AP NSTR MLD).

The procedure for this scheduling method is almost the same as the one described in Section 7.3 with the difference that the APs in this case are affiliated with a soft AP NSTR MLD. The properties of soft AP NSTR MLD are described in Section 7.7. There are also some changes of transmitter and receiver, UL/DL and SU/MU PPDU transmission which need to be adapted according to the figure; such as considering the PPDU transmission portion of the figure.

RTS collision prevention is depicted in the figure in which a UL SU PPDU is scheduled to transmit from STA3 364 of non-AP NSTR MLD2 354 to AP1 360 of AP NSTR MLD 352 to fill in the time gap before shared TXOP starts. STA2 370 of non-AP NSTR MLD1 356 is scheduled to continue counting down since it has the smallest BO value over Link1. However, some other STAs, such as STA6 374 of non-AP NSTR MLD3 358, may have a BO that is very close to the smallest BO value. The BO counting of other STAs on Link1 need to be stopped to avoid potential collision of the following TX of modified RTS frame from STA2 and STA6.

The example topology as well as the example MLDs, APs and STAs are the same as in the previous figures, and the figure is still primarily showing interactions during backoff intervals 1651, shown as sequential time slots being counted down on each link. It will be noted that not all the BO intervals are aligned in this example.

As in the prior example, STA3 has completed its counting down, however, STA4 is still counting. For Link2 STA3 generates an RTS 1636 which incorporates information about the backoff state for both STAs in its MLD. This RTS is received 1632 by AP1, and is also available to other STAs on Link2. It will be noted that in STA4 Link1 enters a busy state 1634 during the RTS and pauses counting.

In response to the RTS, AP1 transmits a SYN frame 1644 which is received 1646, 1648, and 1650. It will be noted that AP2 Link1 enters a busy state 1642 and the AP pauses counting during the SYN transmission. When STAs of the non-AP NSTR MLDs receive the SYN frame from AP1 over Link2, if the STA has just sent the modified RTS frame to AP1, it doesn't need to reply; other stations however may reply with a SYN frame.

In order to prevent collision of simultaneous SYN frames, different IFS are determined (e.g., calculated) before different STAs respond with SYN frames over Link2. A delay $\Delta t_1$ 1660 corresponding to the BO value of STA2 is used as the backoff before STA1 respond a SYN frame to AP1.

The figure depicts STA1 over Link2 sending a SYN frame 1658 to report the concurrent BO value of the other STA (STA2) in the same affiliated NSTR MLD, this SYN frame is shown being received 1652, 1654, and 1662.

AP1 determines if STA2 or AP2 has the smallest BO value on Link1, and thus which should continue counting down. AP1 broadcasts a TX_req frame 1666 to indicate which STA should keep or pause BO counting down on Link1 and which STA or AP should transmit a PPDU(s) on Link2. In response to the TX_req from AP1, STA3 transmits a SU PPDU 1678 which is received 1674 by AP1 over Link2. During this time Link1 of STA4 is held busy 1676, and STA6 Link1 has stopped its BO counting, since it is very close to also reaching a terminal count.

STA2 on Link1 completes its counting and generates RTS 1686, which is received 1682 by AP2 and is also available to other STAs on Link1. After this the shared TXOP process 1690 can commence since both links are available.

7.10 SYN Frame Response (of RTS) After IFS (Soft AP NSTR MLD)

Figure 32A:
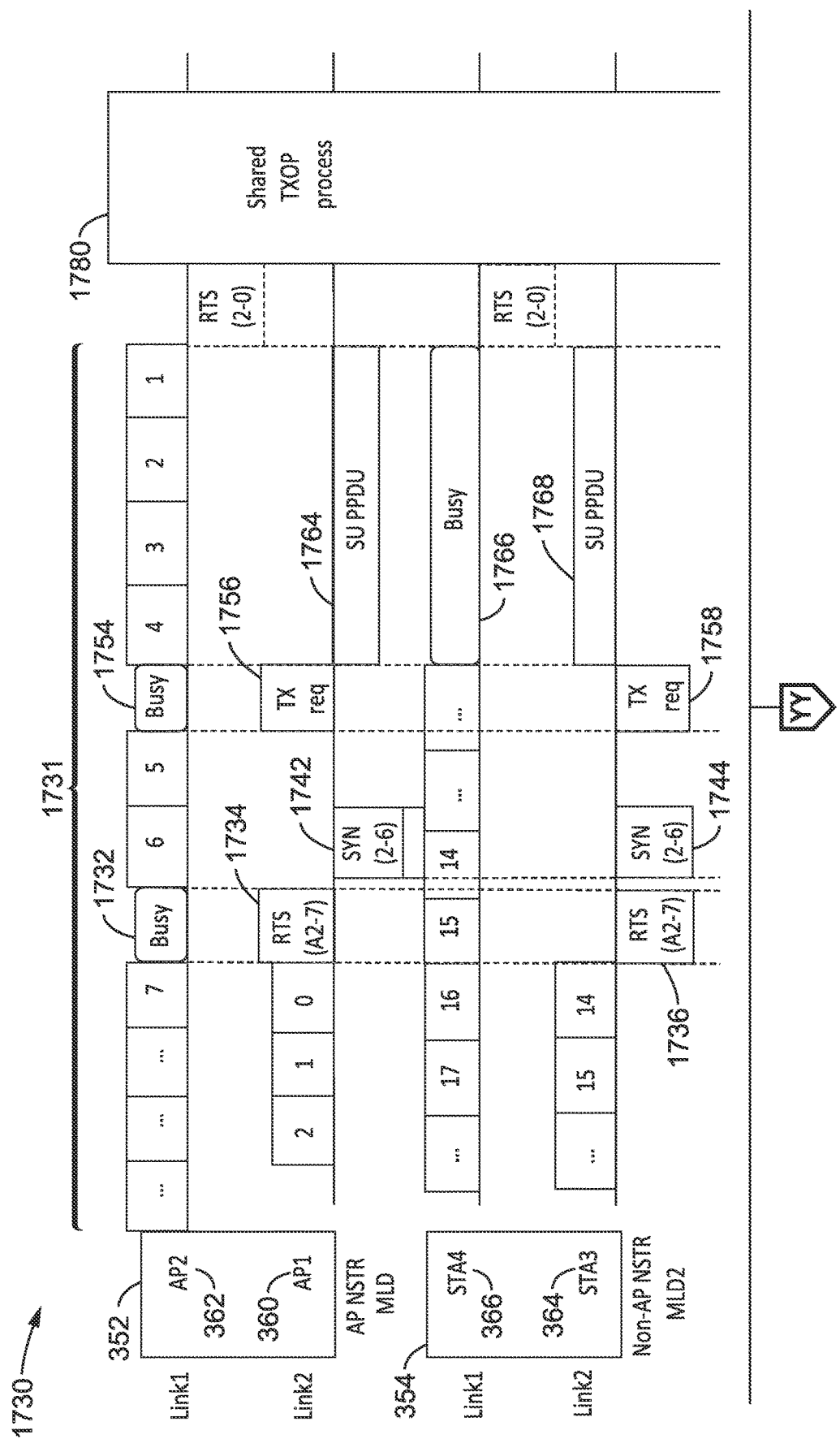
FIG. 32A and FIG. 32B is a communication diagram of a SYN Frame Response after IFS (soft AP NSTR MLD) scenario according to at least one embodiment of the present disclosure.
Figure 32B:
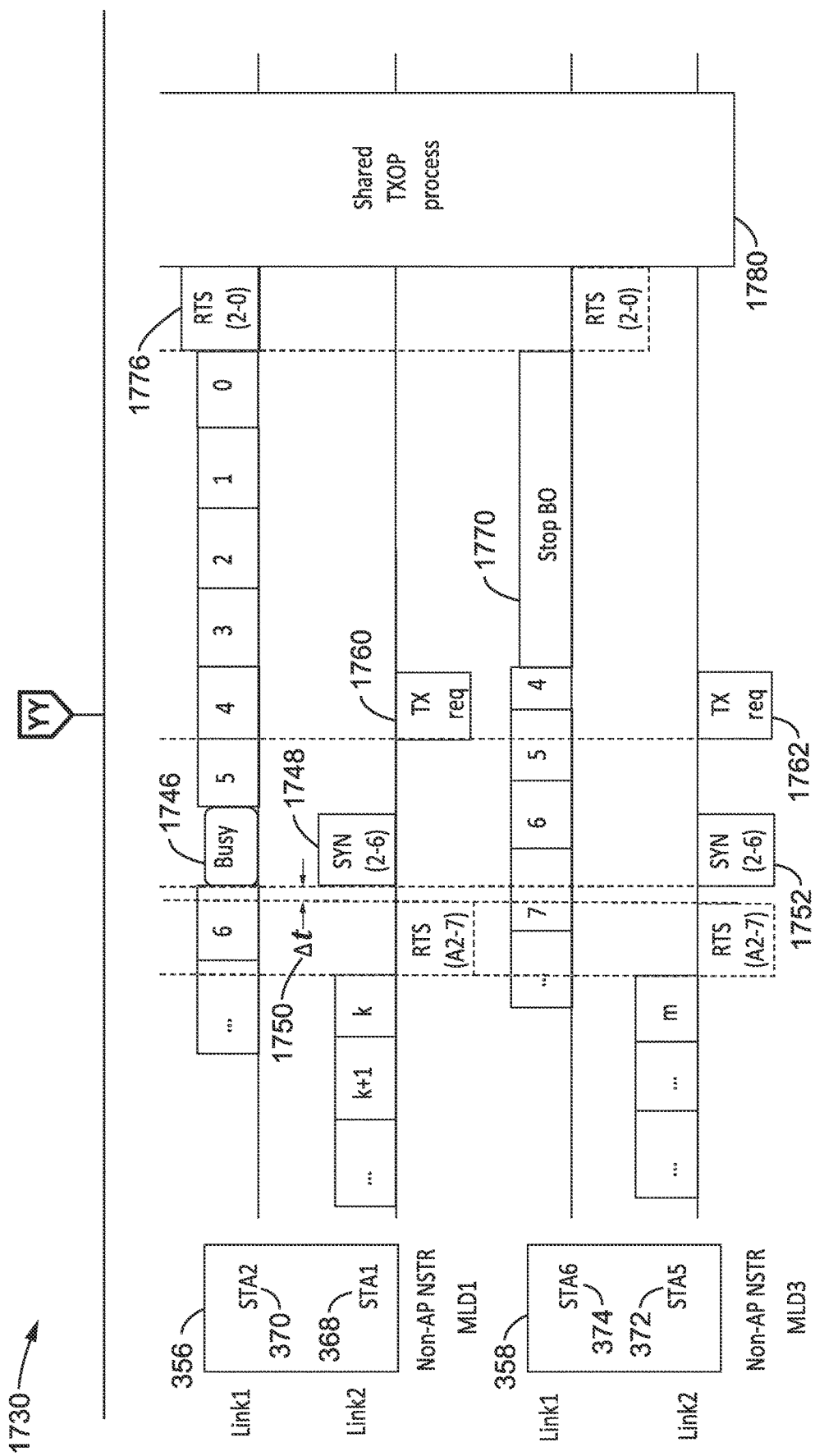

FIG. 32A and FIG. 32B illustrate an example embodiment 1730 of a SYN Frame Response after IFS (soft AP NSTR MLD) scenario. The procedure of this scheduling method is almost the same as that of Section 7.5 with the difference that the APs in this case are affiliated with a soft AP NSTR MLD. The properties of soft AP NSTR MLD are described in Section 7.7. There are also some changes of transmitter and receiver, and UL/DL and SU/MU PPDU transmissions need to be adapted according to this figure. The two variations that have been pointed out in Section 7.9 also apply to this scenario.

The example topology as well as the example MLDs, APs and STAs are the same as in the previous figures, and still is primarily showing interactions during backoff intervals 1731, shown as the sequential time slots being counted down on each link. It will be noted that not all the BO intervals are initially aligned in this example.

In this example, AP1 on Link2 has completed its BO counting, while AP2 on Link1 is still counting. For Link2 AP1 generates an RTS 1734 which incorporates information about the backoff state for both APs in its MLD. This RTS is received 1736 by STA3 and is also available to other STAs on Link2. It will be noted that in AP2 on Link1 enters a busy state 1732 during the RTS and pauses counting.

In order to prevent collision of simultaneous SYN frames, different IFS are determined (e.g., calculated) before different STAs respond with SYN frames over Link2. An delay $\Delta t_1$ 1750 is calculated based on the BO value of STA2 and is used as a BO value before STA1 response a SYN frame to AP1. STA1 responds with SYN 1748, during which the BO of STA2 on Link1 is in a busy state 1746 with BO paused.

SYN frame 1748 reports the concurrent BO value of the other STA (STA2) in the same affiliated NSTR MLD, this SYN frame is shown being received 1742, 1744, and 1752.

From the received SYN frame AP1 determines whether STA2 or AP2 has the smallest BO value on Link1, and thus which should continue counting down. AP1 broadcasts a TX_req frame 1756 to indicate which STA should keep or pause BO counting down on Link1 and which STA or AP should transmit a PPDU(s) on Link2; this frame is received 1758, 1760 and 1762 by the STAs on Link2.

In response to the TX_req from AP1, STA3 transmits a SU PPDU 1768 which is received 1764 by AP1 over Link2. During this time Link1 of STA4 is held busy 1766, and STA6 Link1 has stopped 1770 its BO counting, since it is very close to also reaching a terminal count.

STA2 on Link1 completes its counting and generates RTS 1776, which is also available to other STAs on Link1. After this the shared TXOP process 1780 can commence since both links are available.

Figure 33A:
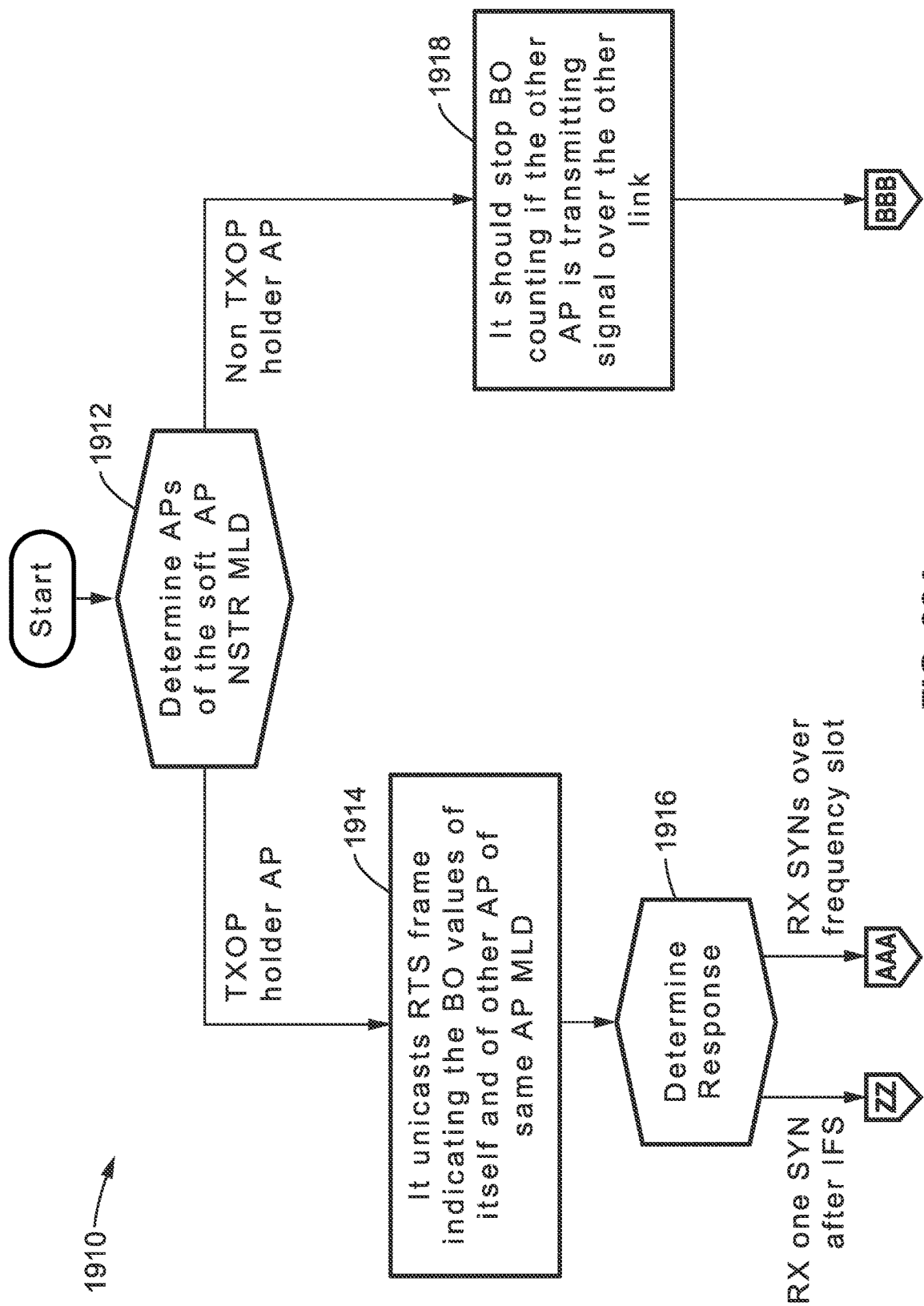
FIG. 33A and FIG. 33B is a flow diagram of channel access at the AP MLD level, which applies to the scenario that AP MLD gains one link initially according to at least one embodiment of the present disclosure.
Figure 33B:
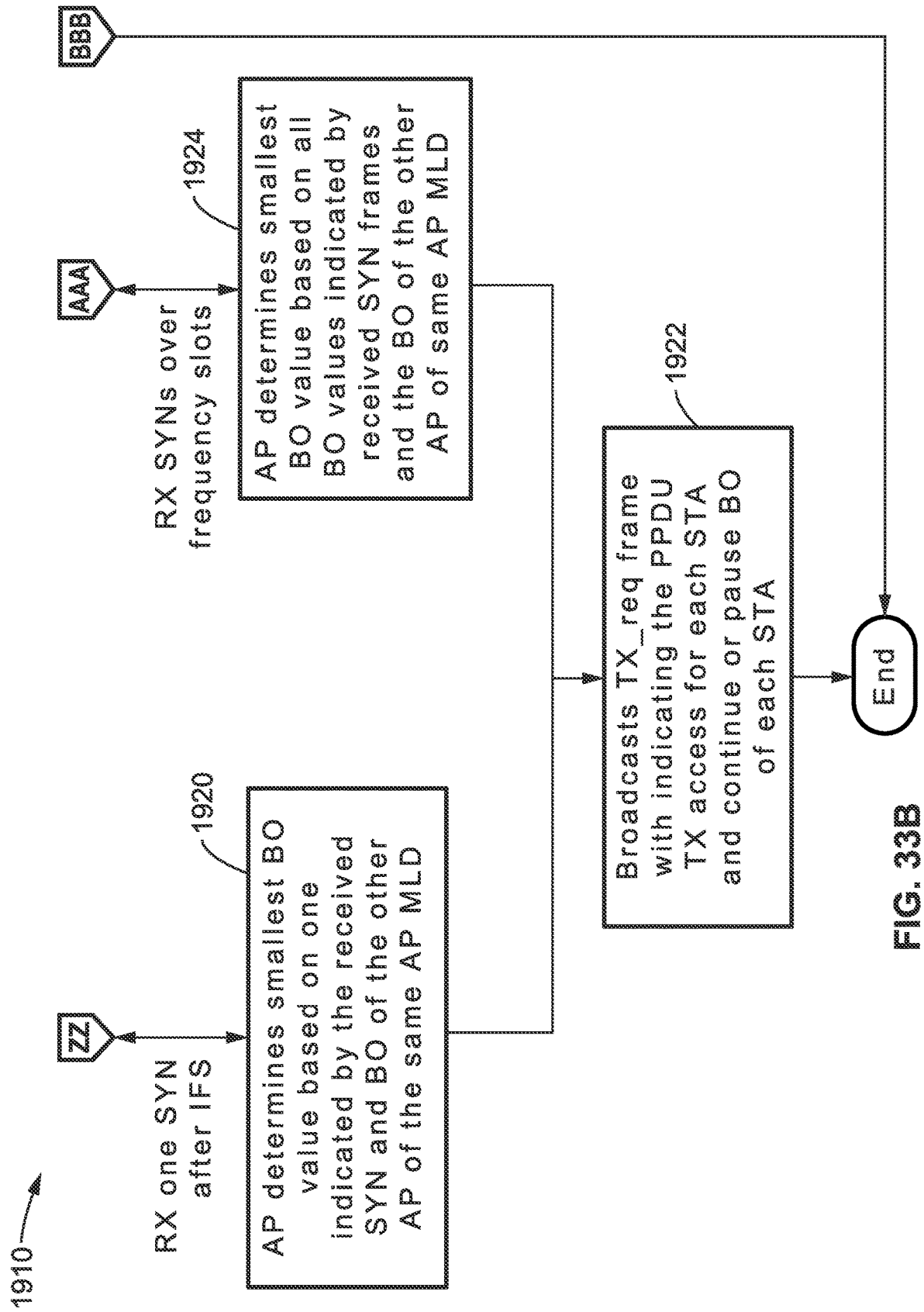

FIG. 33A and FIG. 33B illustrate an example embodiment 1910 of channel access at the AP MLD level, which applies to the scenario in which the AP MLD initially gains one link (and not both) and is similar to FIG. 23.

At decision block 1912 it is determined whether the AP station is the TXOP holder or is a non-TXOP holder of the soft AP NSTR MLD. If it is not the TXOP holder then at block 1918, the AP should stop BO counting if the other AP is transmitting a signal over the other link, after which execution ends.

Otherwise, if the AP is the TXOP holder, then at block 1914 the AP unicasts an RTS frame which indicates the BO values of itself and the other AP of the same AP MLD.

After this a decision block 1916 determines what response to take. If it is determined that the AP should receive one SYN after the IFS, then at block 1920 in FIG. 33B the AP determines which is the smallest BO value based on the one indicated by the received SYN and the BO of the other AP of the same AP MLD.

Otherwise, if decision block 1916 in FIG. 33A, determines that it is to receive SYNs over frequency slots, then at block 1924 in FIG. 33B the AP determines the smallest BO value based on all BO values indicated by the received SYN frames of the BO of the other AP of the same AP MLD.

In either case above, block 1922 is then reached in which the AP broadcasts a TX_req frame indicating to perform PPDU TX access for each STA and whether to continue or pause BO counting for each STA, after which the process ends.

The channel access at the non-AP MLD level, which applies to the scenario in which the AP MLD initially gains one link (and not both) is the same as in FIG. 22.

7.11. Channel Access Protocol for AC_VI and AC_VO

For Access Categories AC_VI and AC_VO traffics, due to their longer data frames there may be insufficient gap time for transmitting one valid PPDU. The STAs that has buffered AC_VI and AC_VO traffic to transmit in this case may not attempt to transmit SU/MU PPDU within the limited time gap.

Figure 34:
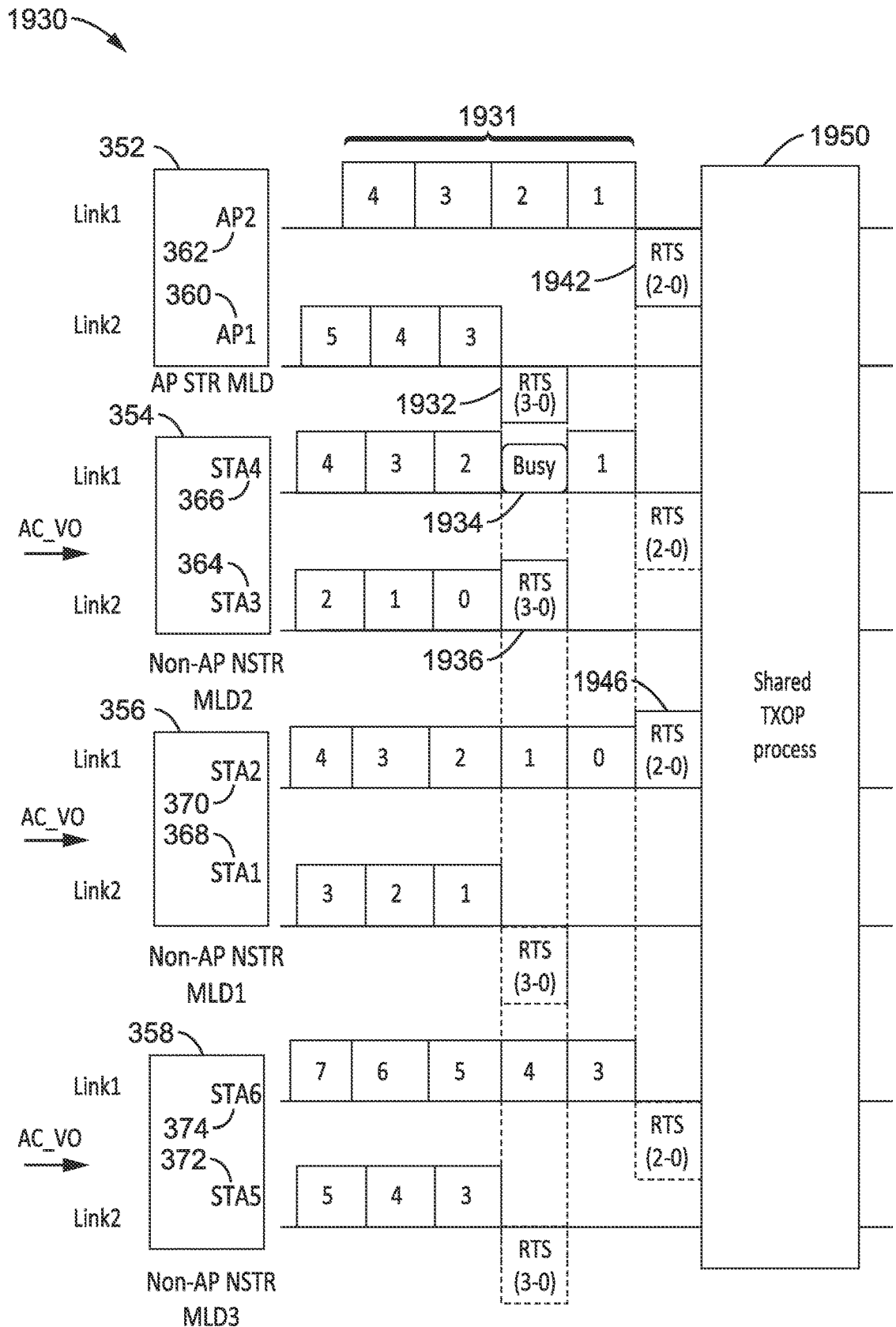
FIG. 34 is a communication diagram of channel access of MLDs with AC_VO according to at least one embodiment of the present disclosure.

FIG. 34 illustrates an example embodiment 1930 of channel access of MLDs with AC_VO. The example topology as well as the example MLDs, APs and STAs are the same as in the previous figures, except for the STAs (e.g., STA1 through STA6) being buffered traffic of Voice (VO) AC. The figure is primarily showing interactions during backoff intervals 1931, shown as the sequential time slots being counted down on each link.

STA3 of non-AP NSTR MLD2 first finishes BO counting and obtains channel access over Link2 by unicasting 1936 a modified RTS frame which is received by AP1 1932 of AP STR MLD and is also available to other STAs on Link2. It will be noted that during RTS 1936, the STA on the other link, which is STA4 pauses its counting and is held in a busy state 1934.

After receiving 1932 this modified RTS frame, AP1 does not respond in view of the limited time for PPDU transmission for the exemplified VO access category of the STAs. Then, STA2 of non-AP NSTR MLD1 finishes BO counting and unicasts a modified RTS frame 1946 which is received 1942 by AP2 of AP STR MLD over Link1. After AP2 receives the modified RTS frame, both AP1 and AP2 are aware that both Link1 and Link2 have been obtained by non-AP STAs, and shared TXOP process 1950 commences.

7.12. Synchronization Among MLDs and Determining a Shared TXOP Holder MLD

Since the multi-link channel access is at the station level, this introduces a potential issue, which is that the TXOP holder STAs over multiple NSTR links are from different MLDs. Toward making the shared TXOP procedure simple and efficient among NSTR MLDs, the shared TXOP procedure should be executed at the MLD level. Thus, a synchronization process between these NSTR MLDs is required to determine the shared TXOP holder MLD.

It should be appreciated that multiple different synchronization processes may be utilized without departing from the teachings of the present disclosure. By way of example and not limitation, in this section two methodologies are described for a synchronization process between these NSTR MLDs to determine the shared TXOP holder MLD. (1) Method 1: shared TXOP scheduled by AP MLD, and (2) Method 2: shared TXOP scheduled by non-AP MLD.

For the other scenarios that TXOP holders over multiple NSTR links are from the same MLD, the proposed methods are still valid. In this case, the AP MLD or non-AP MLD that gains channel access over the NSTR link pair can automatically perform as the shared TXOP holder MLD, as no synchronization process is needed.

7.13. Shared TXOP Scheduled by AP MLD

Figure 35A:
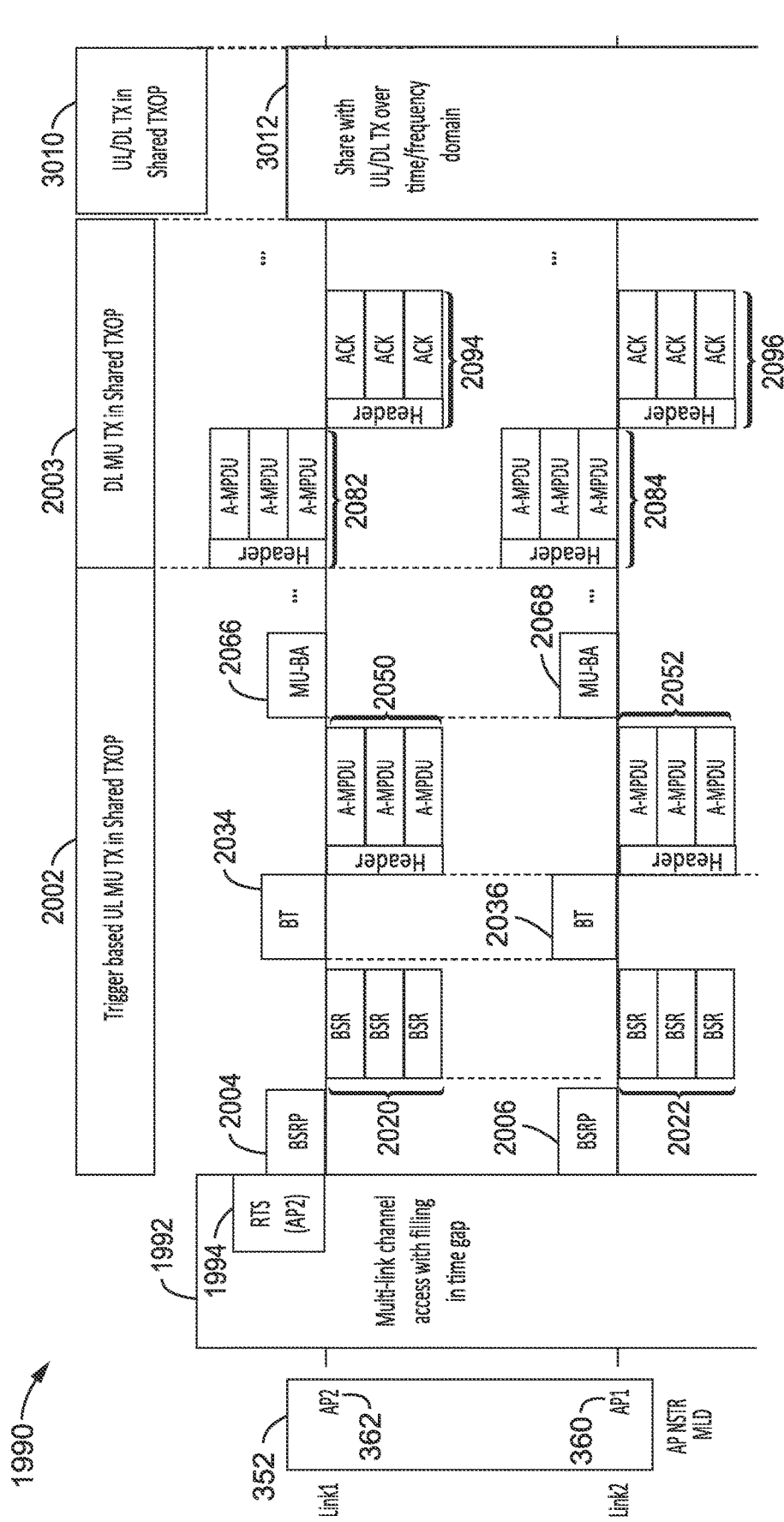
FIG. 35A through FIG. 35C is a communication diagram of shared TXOP among MLDs with AP MLD perform as the shared TXOP holder MLD according to at least one embodiment of the present disclosure.
Figure 35B:
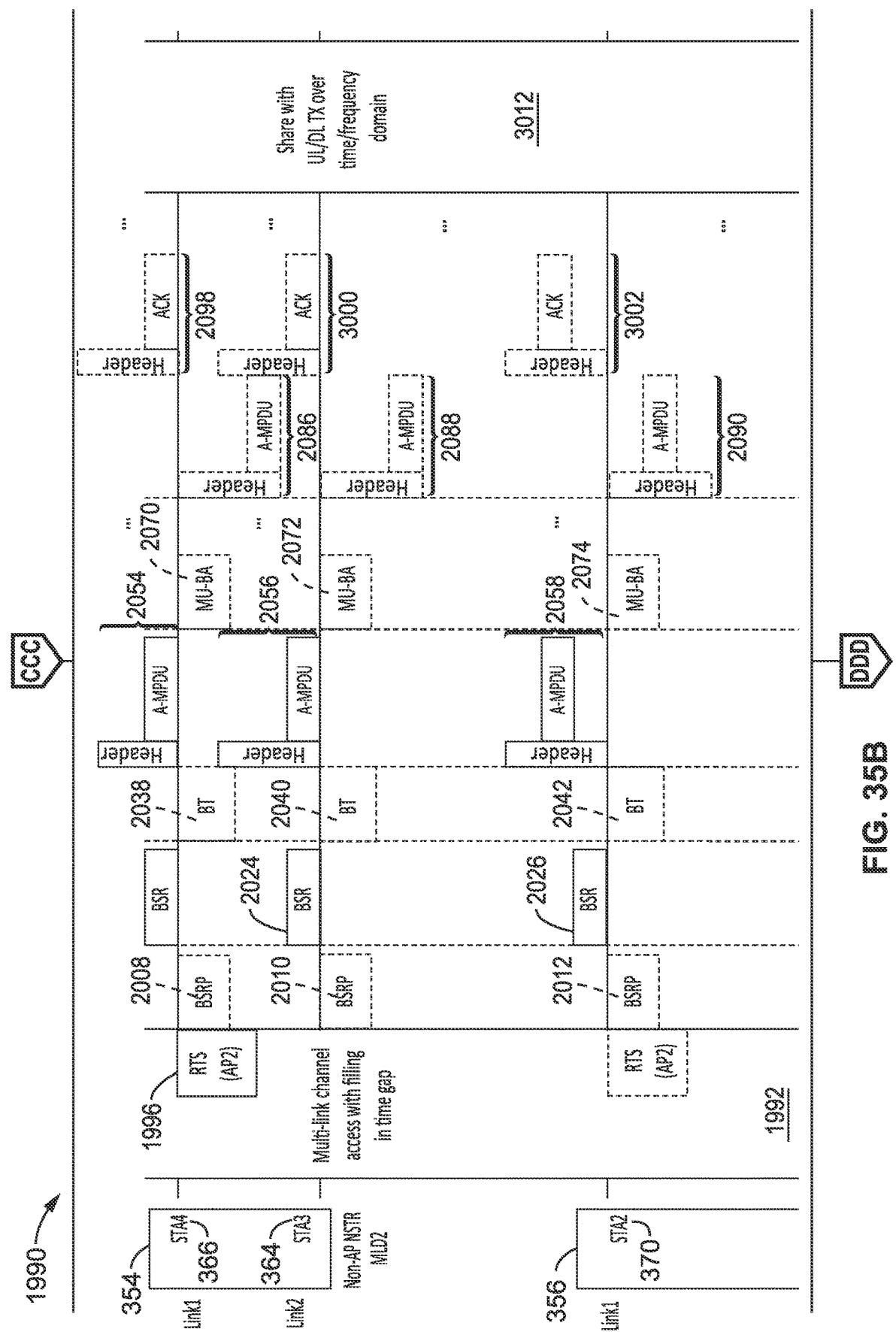
Figure 35C:
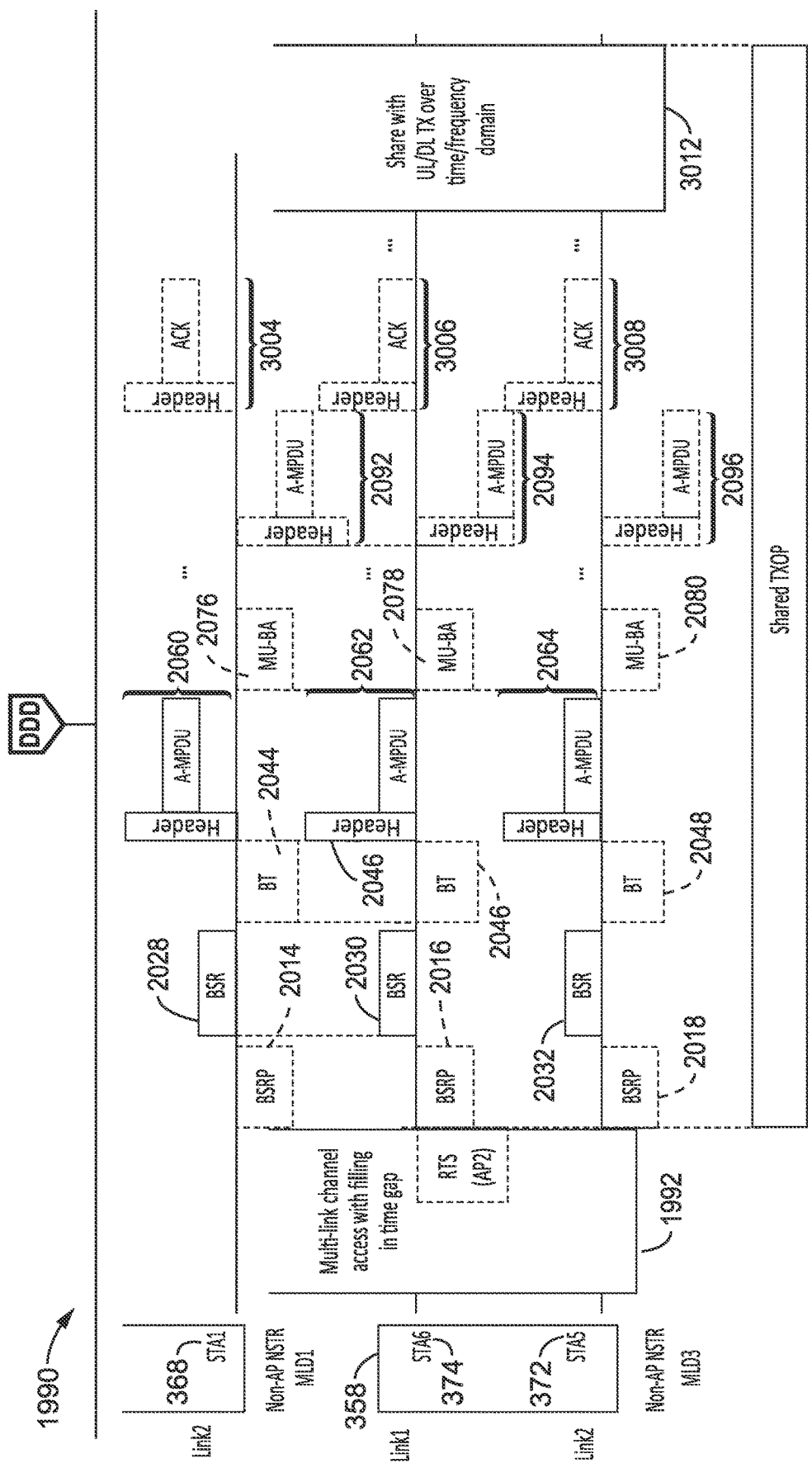

FIG. 35A through FIG. 35C illustrate an example embodiment 1990 of shared TXOP among MLDs with AP MLD perform as the shared TXOP holder MLD. The example topology as well as the example MLDs, APs and STAs are the same as in the previous figures.

This figure shows implementation of methodology 1 based on the scenario that the TXOP holders over multiple NSTR links are from different MLDs.

In this example, during the multi-link channel access procedure 1992, the TXOP holders are STA3 of non-AP NSTR MLD2 over Link2 and AP2 of AP MLD over Link1. In the end of the channel access process, AP2 gains channel access of Link1 and unicasts 1994 a modified RTS which is received 1996 by STA4 of non-AP NSTR MLD2. The AP MLD is aware that both links have been obtained by STA3 and AP2.

The AP MLD can initiate the shared TXOP process for UL/DL MU PPDU transmission based on different methodologies. For example, in these figures the first portion of the shared TXOP is used for a Trigger Based (TB) UL MU PPDU transmission 2002, which is defined in 802.11ax.

A Buffer Status Report Poll (BSRP) is sent 2004 from AP2 for Link1 and another BSRP 2006 is sent from AP1 for Link2, which are received 2008, 2010, 2012, 2014, 2016 and 2018. The STAs respond with BSRs, either single 2024, 2026, 2028, 2030 and 2032, or over different frequencies 2020 and 2022. Thus, the STAs affiliated with the different non-AP NSTR MLDs respond with BSR frames simultaneously over Link1 and Link2 to the reception of BSRP frames.

Based on the received BSR frames AP1 and AP2 simultaneously broadcast Basic Trigger (BT) frame 2034 and 2036 over Link1 and Link2 indicating Resource Unit (RU) allocation.

In response to receiving 2038, 2040, 2042, 2044, 2046 and 2048 the BT frames, the STAs of different non-AP NSTR MLDs transmit 2054, 2056, 2058, 2060, 2062 and 2064 UL MU PPDU simultaneously using assigned RUs over Link1 and link2. MU BlockACK (BA) frames 2066 and 2068 are then broadcast simultaneously by AP1 and AP2 over Link1 and Link2 to confirm the successful reception of the UL PPDU, and are received 2070, 2072, 2074, 2076, 2078 and 2080.

The second portion 2003 of the shared TXOP is used for DL MU transmission, which is defined in 802.11ax. In this portion AP1 and AP2 of the AP MLD are seen simultaneously transmitting 2082 with 2084, and 2094 with 2096 DL MU PPDUs in different RUs over Link1 and Link2, for receipt 2086, 2088, 2090, 2092, 2094, 2096, as well as 2098, 3000, 3002, 3004, 3006 and 3008. After receiving the DL PPDU, the STAs from different non-AP NSTR MLD response with MU ACK frames in different RUs over Link1 and link2.)

The remaining portion 3010 of the shared TXOP can be utilized for transmitting 3012 UL/DL MU PPDU without any specified shared TXOP methodology.

7.14. Shared TXOP Scheduled by Non-AP MLD

Figure 36A:
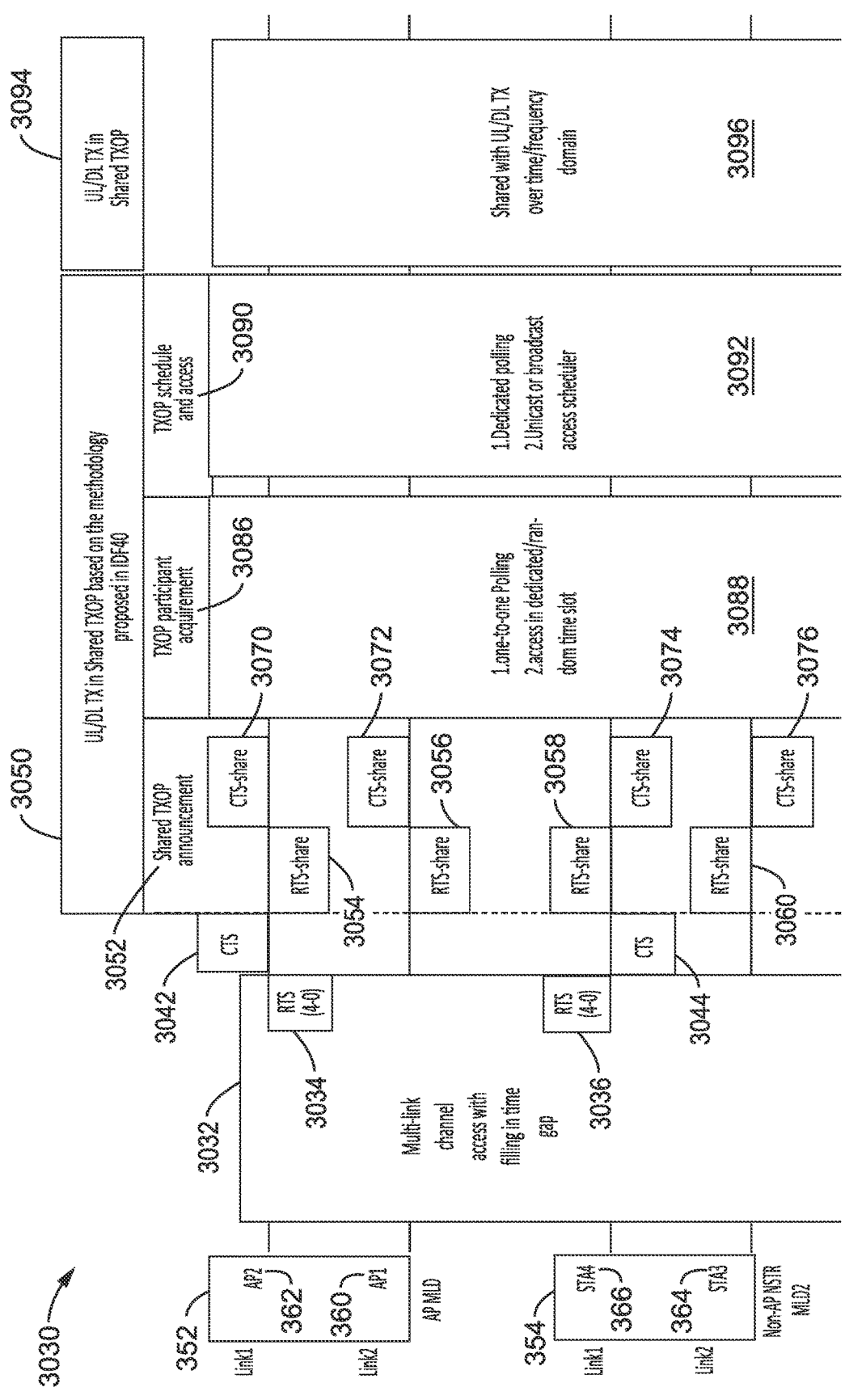
FIG. 36A and FIG. 36B is a communication diagram of a second methodology based on the scenario of the TXOP holders over multiple NSTR links being from different MLDs according to at least one embodiment of the present disclosure.
Figure 36B:
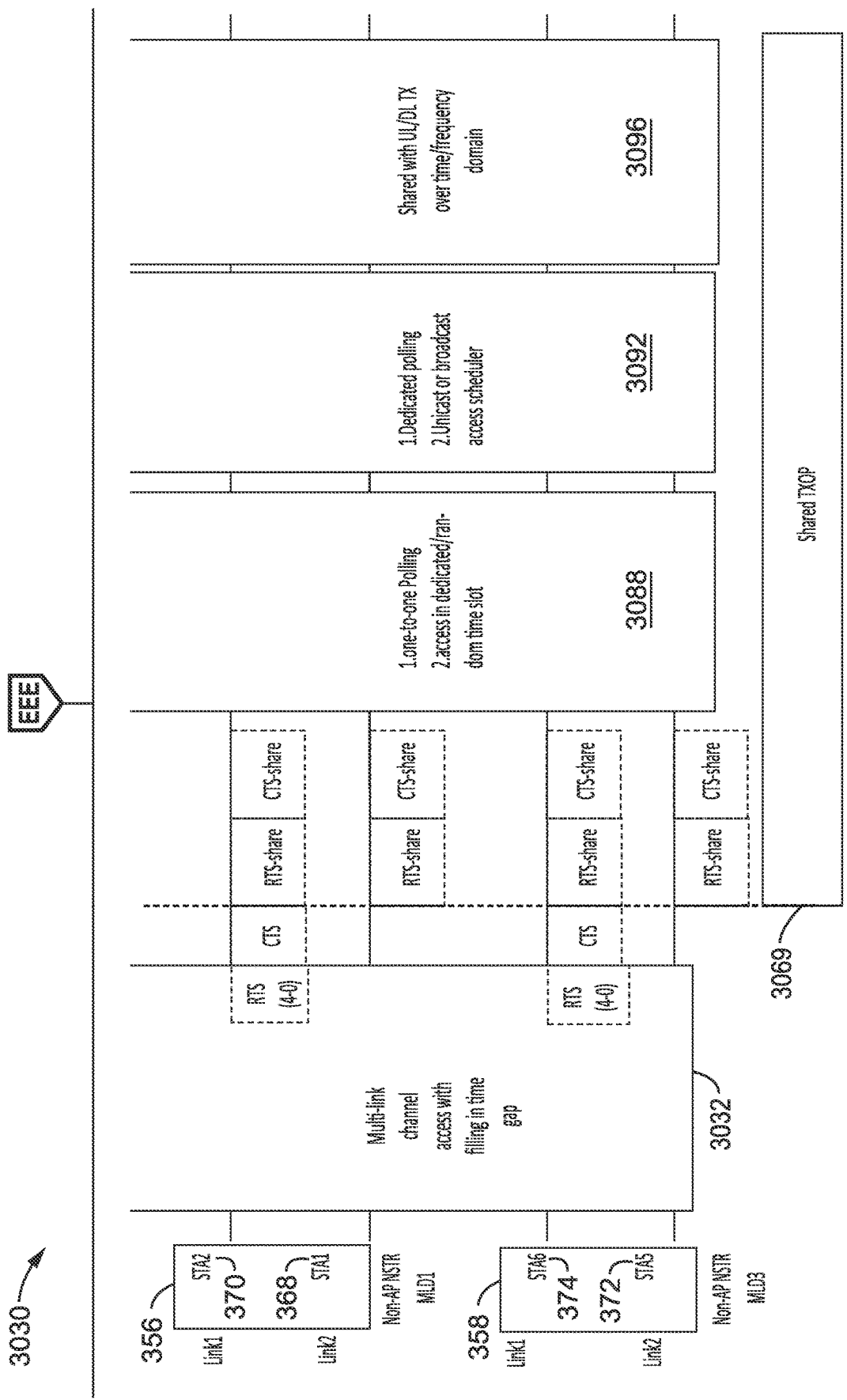

FIG. 36A and FIG. 36B illustrate an example embodiment 3030 of implementing a second methodology based on the scenario of the TXOP holders over multiple NSTR links being from different MLDs. This figure shows the same topology, APs and STAs as in the prior figure.

In this example, during the multi-link channel access procedure 3032, the TXOP holders are STA1 of non-AP NSTR MLD1 over Link2 and STA4 of non-AP NSTR MLD2 over Link1.

In the end of the channel access process, STA4 of non-AP NSTR MLD2 gains channel access of Link1 and unicasts a modified RTS 3036 which is received 3034 by AP2. Thus, AP MLD is made aware that both links have been obtained by STA1 and STA4. AP2 then unicasts 3042 a CTS frame, shown received 3044 by STA4, the CTS frame indicating the AP MLD determination of STA4 of the affiliated non-AP NSTR MLD2 as the shared TXOP holder MLD which can initiate the shared TXOP process 3050.

The shared TXOP MLD can initiate the shared TXOP process for UL/DL MU PPDU transmission in the shared TXOP 3069 based on different methods.

For example, in these figures the first portion of the shared TXOP is based on having several stages. In the first stage, exemplified as a shared TXOP announcement stage 3052, STA3 and STA4 of the shared TXOP holder MLD unicast RTS-share frames 3058 and 3060 for receipt 3054 and 3056 by AP1 and AP2 simultaneously over Link2 and Link1 to initiate a shared TXOP.

AP1 and AP2 respond with CTS-share frames 3070 and 3072 simultaneously over Link2 and Link1, which are received 3074, 3076. In the second stage, exemplified as a TXOP participant acquirement stage 3086, in which different methods 3088 can be utilized, such as but not limited to a one-to-one polling or access in dedicated/random time slot. In a subsequent stage (e.g., third stage), a TXOP schedule and access process 3090 is performed in which different methods 3092 may be utilized for dedicated polling and unicast/broadcast access scheduler. The remaining portion of the shared TXOP 3094 is exemplified as being utilized to transmit UL/DL MU PPDU 3096 without any specified share TXOP methodology.

Figure 37:
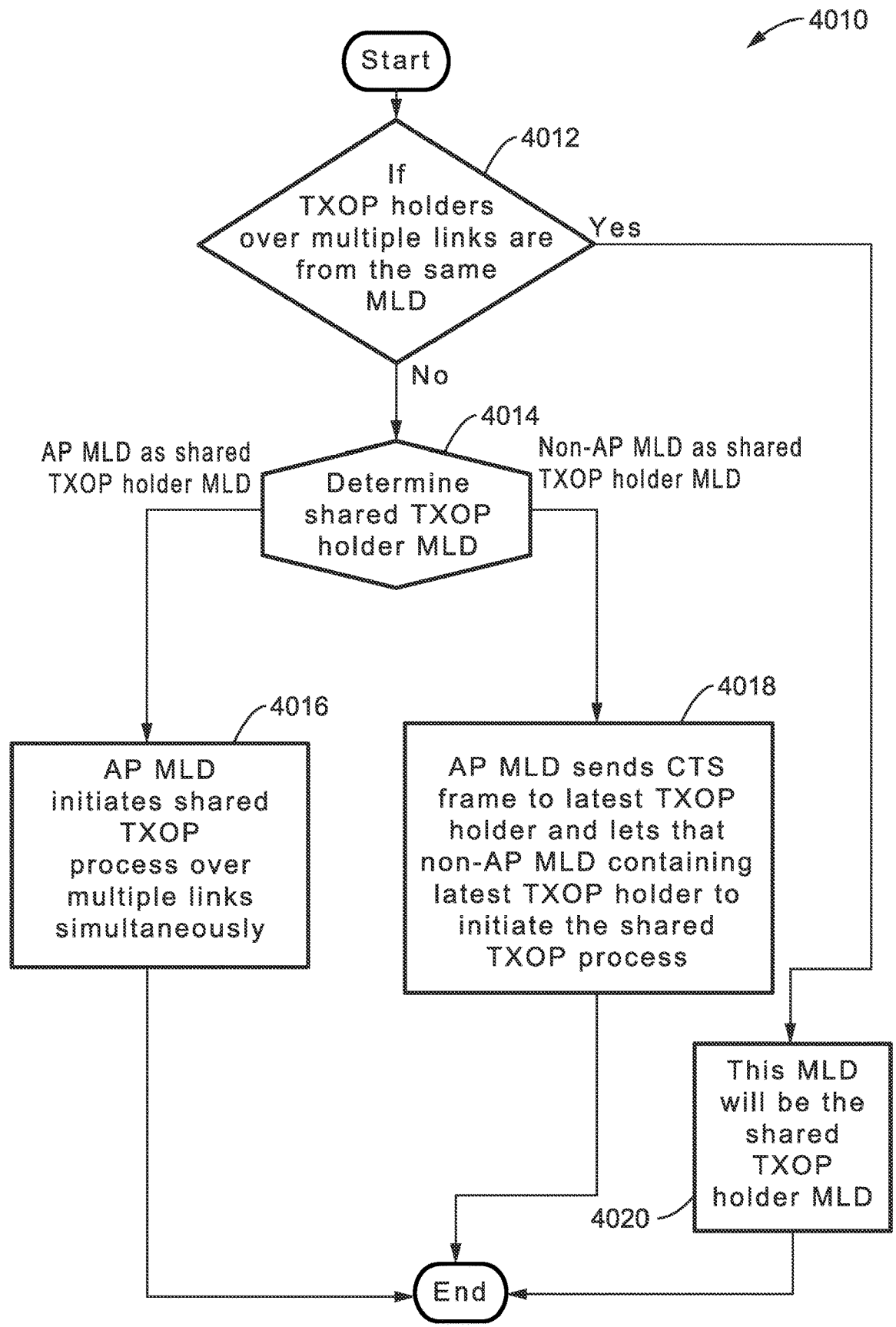
FIG. 37 is a flow diagram of determining the shared TXOP holder MLD according to at least one embodiment of the present disclosure.

FIG. 37 illustrates an example embodiment 4010 of determining the shared TXOP holder MLD. A decision block 4012 determines if TXOP holder STAs over multiple links are from the same MLD. If these STAs are from the same MLD then at block 4020 this specific MLD will be the shared TXOP holder MLD and the process ends.

Otherwise, if the shared TXOP holder STAs over multiple links are not from the same MLD then a check 4014 determines whether the AP MLD or the non-AP MLD will be the shared TXOP holder MLD.

If the AP MLD is to be the shared TXOP holder then execution reaches block 4016 with the AP MLD initiating a shared TXOP process over multiple links simultaneously.

Otherwise, if the non-AP MLD is to be the shared TXOP holder then execution reaches block 4018 with the AP MLD sending a CTS frame to the latest shared TXOP holder STA and allowing the non-AP MLD containing the latest TXOP holder STA to initiate the shared TXOP process.

8. Frame Format Design

It will be appreciated that the data frame and fields are described by way of example and not limitation, and that the present disclosure may be implemented with variations of these without departing from the present teachings. By way of example and not limitation, the fields in the frame format can be modified to different field names or in different sequences or with different bits of each field. Fields can be simplified or removed as long as the functionality of the frame is provided. New fields can also be added to either consolidate or extend the functionality of the frame.

In different frame format designs, there are some common fields, for example Frame control field indicates the type of the frame. A Duration field contains NAV information used for CSMA/CA channel access. An RA field contains a MAC address for the recipient of the frame. A TA field contains the MAC address of the STA that transmitted the frame. An FCS filed contains cyclic redundancy checking (CRC).

8.1. Modified RTS

Figure 38:
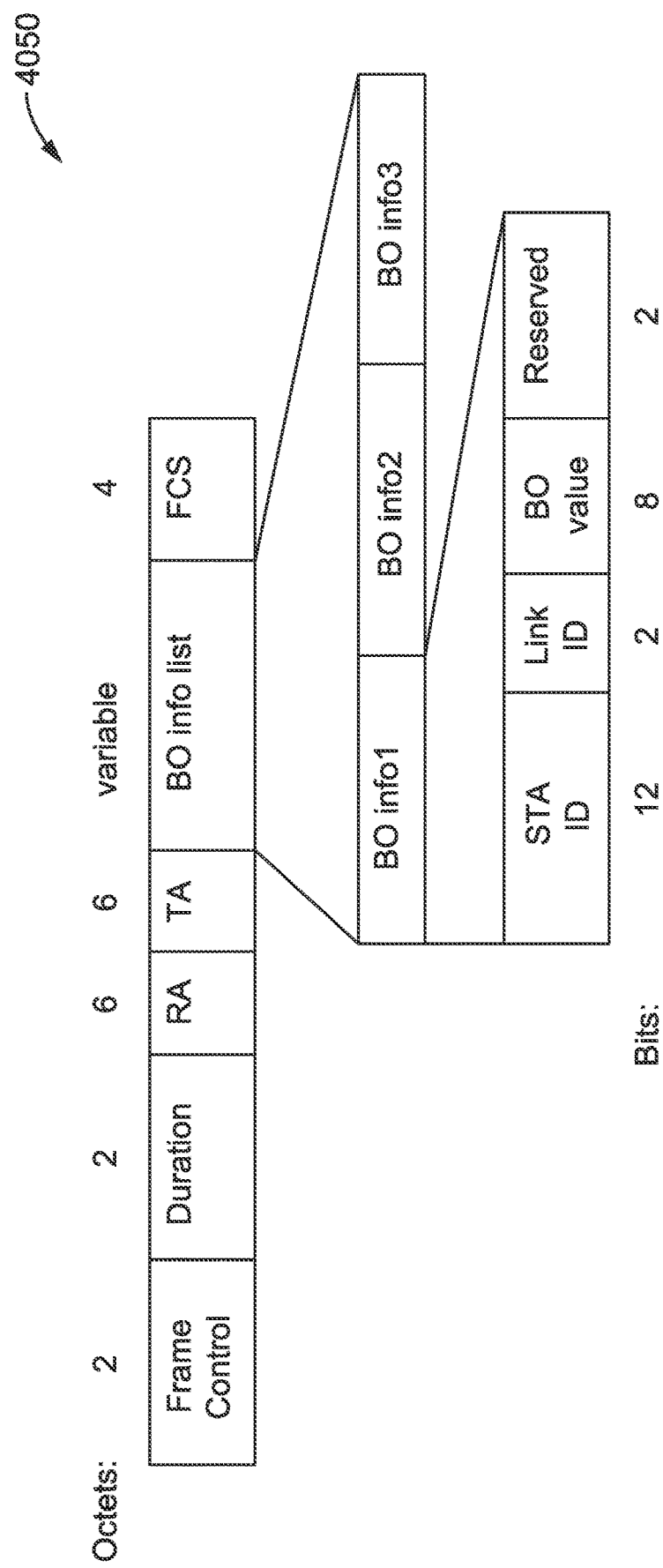
FIG. 38 is a data field diagram of a modified RTS frame sent by the STA/AP that gains channel access according to at least one embodiment of the present disclosure.

FIG. 38 illustrates an example embodiment 4050 of a modified RTS frame sent by the STA/AP that gains channel access. The STA/AP sends the modified RTS frame indicating the BO value of the other STA/AP of the same MLD. If the AP is the destination of the modified RTS frame, then the AP should broadcast a SYN frame after receiving it. If non-AP STAs receive the modified RTS frame from the AP, even if they are not the destination of the modified RTS, then they should respond with a SYN frame that incorporates the BO value of the other STA of the same MLD.

A BO Info List is shown containing one or more BO info fields, exemplified here with three fields. BO info1 is one of the BO info lists, which indicates the BO value of a specific station over a certain link. BO info1 is shown with the following fields. A STA ID subfield is the hash value of the AID associated with the STA. A Link ID subfield indicates the ID of the link over which the STA with the STA ID as indicated in STA ID field is operating. A BO value subfield indicates the backoff value of the STA with the STA ID as indicated in STA ID field.

8.2. SYN Frame

Figure 39:
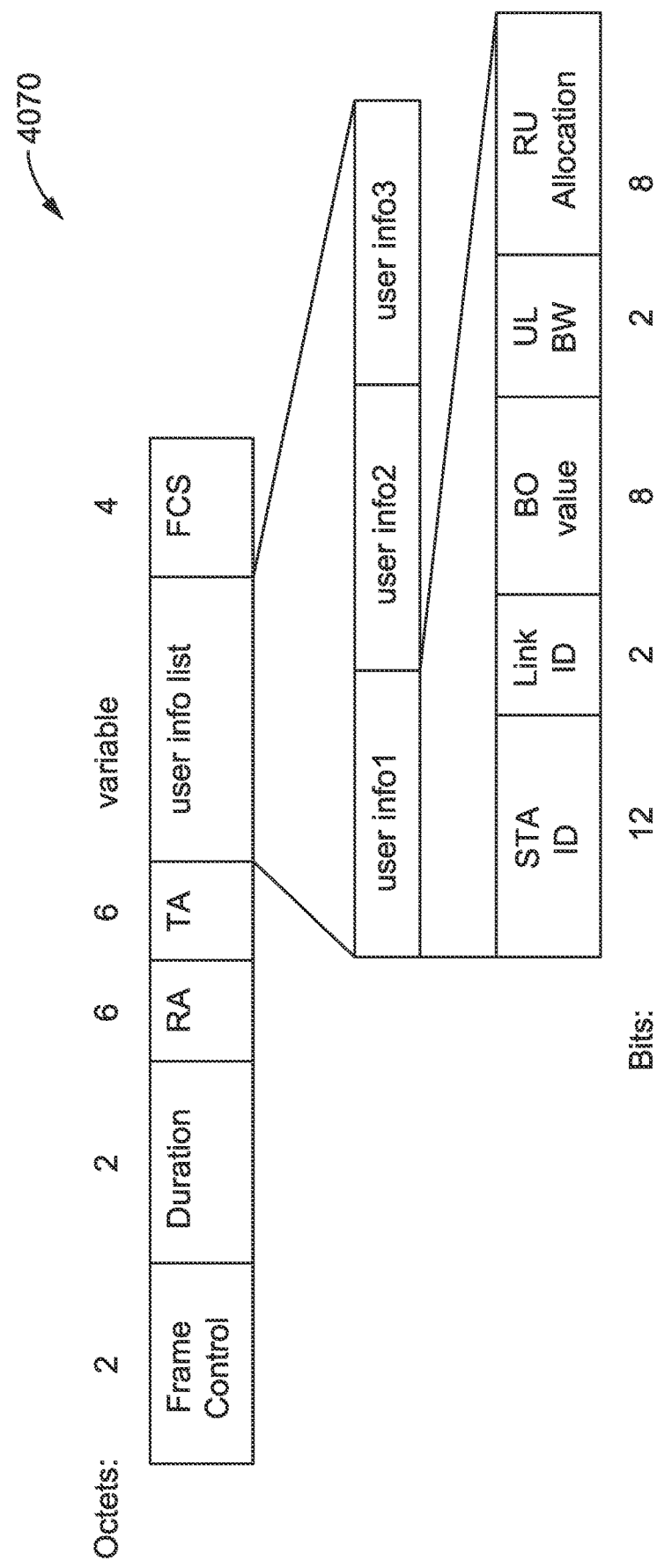
FIG. 39 is a data field diagram of a frame format of the SYN frame according to at least one embodiment of the present disclosure.

FIG. 39 illustrates an example embodiment 4070 of a frame format of the SYN frame. After the AP receives a modified RTS frame, it broadcasts a SYN frame indicating the BO value that was obtained from the modified RTS frame. After non-AP STAs receive a broadcasted SYN frame from the AP, or receive a unicasted modified RTS frame from the AP, then even if the destination of the modified RTS is that of itself, then the non-AP STA should respond with a SYN frame to the AP including the BO value of the other STA operating on the other link of the same MLD. The definition of STA ID, Link ID, BO values are the same as that described in FIG. 38. An RU Allocation subfield along with an UL BW subfield identifies the size and the location of the RU.

8.3. TX_Req Frame

Figure 40:
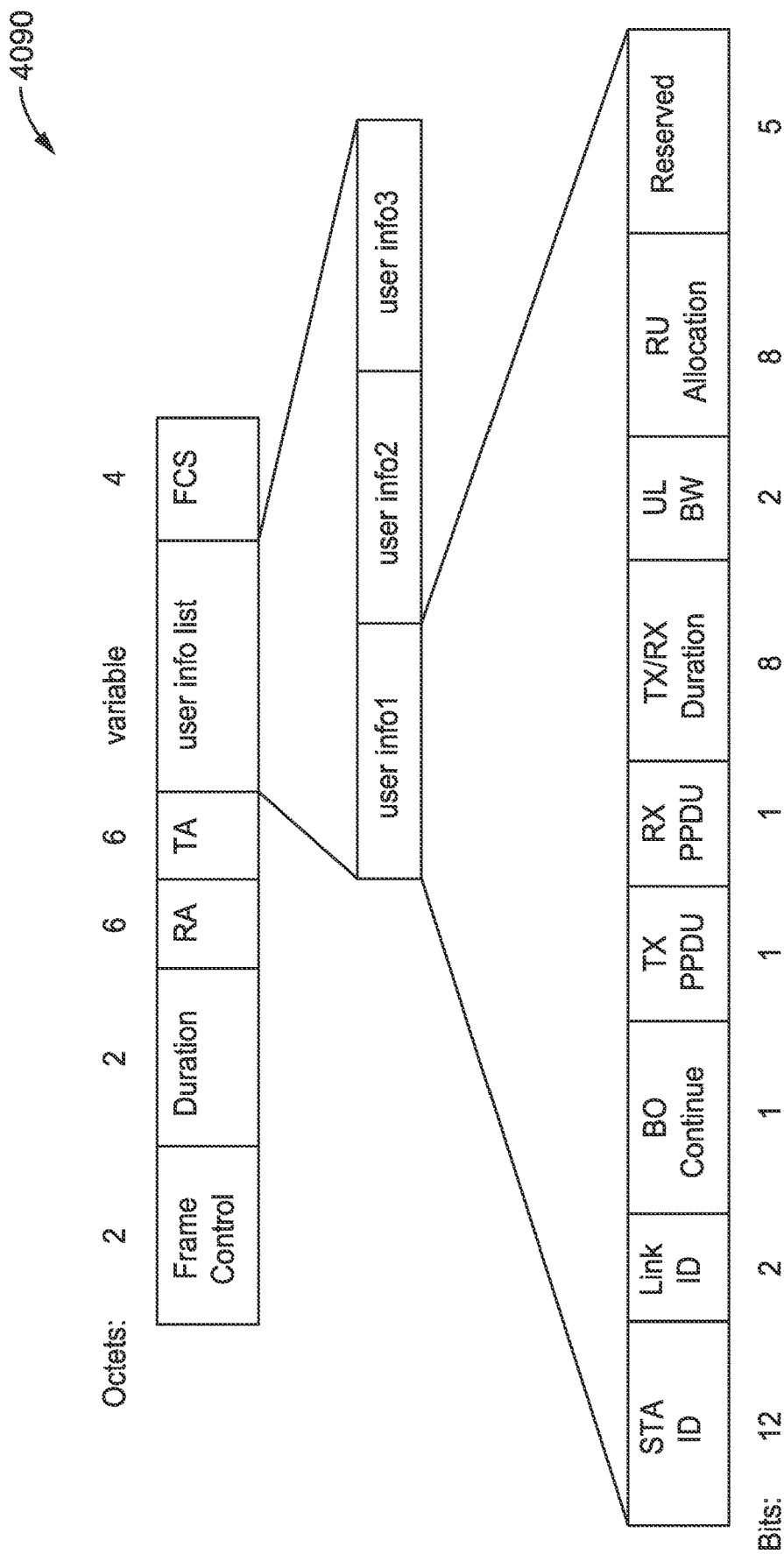
FIG. 40 is a data field diagram of a TX_req frame format according to at least one embodiment of the present disclosure.

FIG. 40 illustrates an example embodiment 4090 of a TX_req frame format. After the AP receives the SYN frame from non-AP STAs, it determines which station should continue/pause its BO counting and transmit/receive PPDU in a certain RU and for a certain period. The AP broadcasts this information with the TX_req frame. After non-AP STAs receive the TX_req frame, they should transmit/receive PPDU in the directed RU and for that certain period.

A user info list contains one or more user information fields, exemplified here as user info1 through user info3. The subfields for user info1 are shown at the bottom of the figure. The STA ID, Link ID, UL BW, and RU Allocation are the same as that described for FIG. 39.

A BO continue subfield indicates if the STA with the STA ID as indicated in the STA ID field should continue backoff counting (e.g., first state indicates yes, and second state indicates no. A TX PPDU subfield indicates the STA with STA ID as indicated in STA ID field should transmit the PPDU. An RX PPDU subfield indicates the STA with STA ID as indicated in STA ID field should receive a PPDU. The TX/RX Duration field indicates the duration of the PPDU to be transmitted/received by the STA with the STA ID as indicated in the STA ID field.

9. General Scope of the Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) operating as either an Access Point (AP) or a non-AP STA within a multi-link device (MLD) which is either capable of simultaneous transmit and receive (STR) in an STR MLD or an MLD which is not capable of simultaneous transmit and receive as a NSTR MLD, wherein the STR MLD or NSTR MLD is configured for wirelessly communicating with other wireless stations (STAs) in performing a multi-link operation (MLO) on a wireless local area network (WLAN) to share a transmit opportunity (TXOP); (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d) (i) obtaining a transmit opportunity (TXOP) for a first link of a link pair within a multi-link operation (MLO) by a STA or AP of a first NSTR MLD; (d) (ii) determining a backoff count value for a STA or AP contending for a second link of the NSTR link pair with a lowest backoff count value of all STAs or APs contending for said second link, whether it be said first NSTR MLD or another MLD; (d) (iii) stopping backoff counting on STAs and/or APs which do not have the lowest count value in contending for said second link; (d) (iv) performing one or more data transmissions between STAs and/or APs on said first link, in a time gap prior to a shared TXOP process, if sufficient time remains within said lowest backoff count value; and (d) (v) starting a shared TXOP process on both said first link and said second link, when said lowest backoff count value has reached a terminal count.

An apparatus for wireless communication in a network, the apparatus comprising: (a) a wireless communication circuit, as a wireless station (STA) operating as either an Access Point (AP) or a non-AP STA within a multi-link device (MLD) which is either capable of simultaneous transmit and receive (STR) in an STR MLD or an MLD which is not capable of simultaneous transmit and receive as a NSTR MLD, wherein the STR MLD or NSTR MLD is configured for wirelessly communicating with other wireless stations (STAs) in performing a multi-link operation (MLO) on a wireless local area network (WLAN) to share a transmit opportunity (TXOP); (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d) (i) obtaining a transmit opportunity (TXOP) for a first link of a link pair within a multi-link operation (MLO) by a STA or AP of a first NSTR MLD, while a second link of said link pair has not been obtained by any other stations; (d) (ii) communicating backoff count value information within a modified ready-to-send (RTS) message between STAs and/or APs by the station obtaining the transmit opportunity (TXOP) for said first link of a link pair; (d) (iii) receiving said modified RTS message by an AP station which broadcasts a message containing synchronization information, as a SYN frame, on said first link which indicates the latest received backoff count values for the second link; (d) (iv) receiving said SYN frame by non-AP stations which respond with a SYN frame, either immediately after a SIFS slot in different frequency slots or after an IFS time period, on said first link; (d) (v) determining, by the AP on said first link which receives said SYN frames from the non-AP stations, which station has the smallest backoff count value of the stations contending for said second link; (d) (vi) determining if sufficient time is available for performing one or more transmissions during a gap time which is the determined time for the smallest backoff count value of the stations contending for said second link to complete counting; (d) (vii) transmitting a frame containing transmission information, as a TX_req frame, from the AP on which stations are to continue counting and which stations are to pause their counting on said second link, and to instruct stations to perform transmission on said first link if the gap time is determined to be sufficient; and (d) (viii) starting a shared TXOP process on both said first link and said second link, when said lowest backoff count value on said second link has reached a terminal count.

An apparatus for wireless communication in a network, comprising: (a) a wireless communication circuit, as a wireless station (STA) operating as either an Access Point (AP) or a non-AP STA within a multi-link device (MLD) which is either capable of simultaneous transmit and receive (STR) in an STR MLD or an MLD which is not capable of simultaneous transmit and receive as a NSTR MLD, wherein the STR MLD or NSTR MLD is configured for wirelessly communicating with other wireless stations (STAs) in performing a multi-link operation (MLO) on a wireless local area network (WLAN) to share a transmit opportunity (TXOP); (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d) (i) obtaining a transmit opportunity (TXOP) for a first link of a multi-link operation (MLO) by an AP of an AP MLD, which has a second link of the NSTR link pair; (d) (ii) communicating a frame containing a backoff count value for both said first link and said second link to other STAs of said second link; (d) (iii) performing one or more data transmissions between STAs and/or APs on said first link if sufficient time remains within said lowest backoff count value of said AP MLD; (d) (iv) communicating a frame indicating when said second link of said AP MLD is ready; and (d) (v) starting a shared TXOP process on both said first link and said second link.

A method of performing wireless communication in a network, comprising: (a) performing wireless communications between a station (STA) operating as either an Access Point (AP) station or a non-AP station within a multi-link device (MLD) which is either capable of simultaneous transmit and receive (STR) in an STR MLD or an MLD which is not capable of simultaneous transmit and receive as a NSTR MLD, wherein the STR MLD or NSTR MLD is configured for wirelessly communicating with other wireless stations (STAs) in performing a multi-link operation (MLO) on a wireless local area network (WLAN) to share a transmit opportunity (TXOP); (b) obtaining a transmit opportunity (TXOP) for a first link of a link pair within a multi-link operation (MLO) by a STA or AP of a first NSTR MLD; (c) determining a backoff count value for a STA or AP contending for a second link of the NSTR link pair with a lowest backoff count value of all STAs or APs contending for said second link, whether it be said first NSTR MLD or another MLD; (d) stopping backoff counting on STAs and/or APs which do not have the lowest count value in contending for said second link; (e) performing one or more data transmissions between STAs and/or APs on said first link, in a time gap prior to a shared TXOP process, if sufficient time remains within said lowest backoff count value; and (f) starting a shared TXOP process on both said first link and said second link, when said lowest backoff count value has reached a terminal count.

The apparatus or method of any preceding implementation, wherein said shared TXOP is performed at an MLD level and is initiated after both links of the NSTR link pair are obtained by stations which do not need to be affiliated with the same NSTR MLD.

The apparatus or method of any preceding implementation, wherein if both links of the NSTR link pair are obtained by stations which are not part of the same NSTR MLD, then said instructions when executed by the processor perform steps further comprising performing synchronization between MLDs.

The apparatus or method of any preceding implementation, wherein said determining said lowest backoff count value by STAs and/or APs which do not have the lowest count value in contending for said second link, is performed by said instructions when executed by the processor further comprising: communicating a modified ready to send (RTS) frame by the STA or AP of said first NSTR MLD which has received said transmit opportunity (TXOP) for said first link, wherein said modified ready to send (RTS) frame includes backoff count information for both links of said first NSTR MLD; and communicating synchronization frames (SYN) between STAs and/or APs on said first link in collecting backoff count values for said second link from STAs and/or APs.

The apparatus or method of any preceding implementation, wherein said stopping backoff counting on STAs and/or APs which do not have the lowest count value in contending for said second link, is performed by said instructions when executed by the processor further comprising broadcasting a frame containing transmit request information, referred to as a transmit request (TX_req) frame, which provides indications on which STAs should continue counting and which should pause or stop their counting.

The apparatus or method of any preceding implementation, wherein said one or more data transmissions between STAs and/or APs on said first link is performed by said instructions when executed by the processor further comprising broadcasting said TX_req which includes directions for data transmissions to be performed.

The apparatus or method of any preceding implementation, wherein said shared TXOP is performed at an MLD level, in which stations affiliated with the same NSTR MLD on different links of a NSTR link pair perform synchronized transmission and reception toward eliminating in-device coexistence (IDC) interference in any single NSTR MLD.

The apparatus or method of any preceding implementation, wherein said apparatus is configured for performing said data transmissions in the time gap prior to the shared TXOP process toward reducing channel contention delay and improved throughput performance.

The apparatus or method of any preceding implementation, wherein said instructions when executed by the processor further perform steps comprising determining which AP or non-AP MLD is to operate as a shared TXOP holder at the MLD level to avoid in-device coexistence (IDC) interference in any single NSTR MLD.

The apparatus or method of any preceding implementation, wherein determining which AP or non-AP MLD is to operate as a shared TXOP holder at the MLD level, is performed by said instructions when executed by the processor comprising: (a) determining if said first link and said second link were obtained by stations on a same MLD, then that MLD is selected as the shared TXOP holder MLD; (b) determining if said first link and said second link were obtained by stations on different MLDs, then performing steps comprising: (b) (i) allowing an AP MLD to perform as the shared TXOP holder MLD by directly initiating the shared TXOP process; or (b) (ii) allowing a non-AP MLD whose station obtained said second link to be the shared TXOP holder MLD.

The apparatus or method of any preceding implementation, wherein starting said shared TXOP process is performed by said instructions when executed by the processor comprising stations of the shared TXOP holder MLD initiating the share TXOP process upon each station of the shared TXOP holder MLD receiving a clear-to-send (CTS) frame.

The apparatus or method of any preceding implementation, wherein said CTS frames are received from AP stations in response to receipt of previous sent modified RTS frames.

The apparatus or method of any preceding implementation, wherein said MLD is operating under IEEE 802.11.

The apparatus or method of any preceding implementation, wherein said apparatus is configured to provide enhanced distributed channel access (EDCA) having more than one access category (AC).

The apparatus or method of any preceding implementation, wherein said IFS time period is determined as proportional to the backoff counting value of the station on said second link who is affiliated with the same MLD as the STA receiving the said SYN frame.

The apparatus or method of any preceding implementation, wherein said instructions when executed by the processor further perform steps comprising determining which AP or non-AP MLD is to operate as a shared TXOP holder at the MLD level to avoid in-device coexistence (IDC) interference in any single NSTR MLD.

The apparatus or method of any preceding implementation, wherein determining which AP or non-AP MLD is to operate as a shared TXOP holder at the MLD level, is performed by said instructions when executed by the processor comprising: (a) determining if said first link and said second link were obtained by stations on a same MLD, then that MLD is selected as the shared TXOP holder MLD; (b) determining if said first link and said second link were obtained by stations on different MLDs, then performing steps comprising: (b) (i) allowing an AP MLD to perform as the shared TXOP holder MLD by directly initiating the shared TXOP process; or (b) (ii) allowing a non-AP MLD whose station obtained said second link to be the shared TXOP holder MLD.

The apparatus or method of any preceding implementation, wherein starting said shared TXOP process is performed by said instructions when executed by the processor comprising stations of the shared TXOP holder MLD initiating the share TXOP process upon each station of the shared TXOP holder MLD receiving a clear-to-send (CTS) frame.

The apparatus or method of any preceding implementation, wherein said CTS frames are received from AP stations in response to receipt of previous sent modified RTS frames.

The apparatus or method of any preceding implementation, wherein said apparatus is configured to provide enhanced distributed channel access (EDCA) having more than one access category (AC).

The apparatus or method of any preceding implementation, wherein the frame being communicated which contains said backoff count value comprises a modified ready-to-send (RTS) frame which incorporates backoff information.

The apparatus or method of any preceding implementation, wherein said apparatus is configured to provide enhanced distributed channel access (EDCA) having more than one access category (AC).

An MLO apparatus in which the NSTR MLDs cooperate with each other to share a portion of its TXOP to others or joining others' shared TXOP to reduce the contention and competition for channel access for all cooperating MLDs, wherein shared TXOP are utilized to reduce the delay caused by channel contention for improving worst-case performance.

The apparatus or method of any preceding implementation, wherein shared TXOP is performed at the MLD level shall make the shared TXOP schedule simple and efficient. In this case, stations affiliate with the same NSTR MLD on different links of a NSTR link pair shall perform synchronized transmission and reception and, thus, shall not experience IDC interference in any single NSTR MLD.

The apparatus or method of any preceding implementation, wherein the shared TXOP at the MLD level is initiated as long as all links of the NSTR link pair are gained by stations that not necessarily affiliate with the same NSTR MLD, such as in the shared TXOP holder MLD.

The apparatus or method of any preceding implementation, wherein simultaneous channel access is accelerated over multiple NSTR links at MLD level, by eliminating the limitation that channel accesses over multiple links have to be obtained by the stations from the same MLD.

The apparatus or method of any preceding implementation, wherein upon multi-link channel access being obtained by different STAs from different MLDs, then synchronization among the MLDs is performed to determine the MLD to access multi-links.

The apparatus or method of any preceding implementation, wherein to efficiently utilize the time gap between one link of a NSTR link pair has been obtained until all links of the NSTR link pair have been gained, several methodologies are proposed to improve channel utilization efficiency over multiple NSTR links.

The apparatus or method of any preceding implementation, wherein If one link (L1) of the NSTR link pair is obtained by a STA and the other link (L2) of the NSTR link pair is not gained by any other STAs, only the STA has the smallest BO value should continue counting down over L2 and the other stations from different MLDs shall utilize this BO period to transmit PPDU over L1.

The apparatus or method of any preceding implementation, wherein a modified RTS frame is transmitted on L1 by the station wins channel access of L1, with indicating BO value of other affiliated station of the same NSTR MLD on L2.

The apparatus or method of any preceding implementation, wherein the AP shall broadcast a SYN frame on L1 to indicate the received latest BO value counting down on L2.

The apparatus or method of any preceding implementation, wherein after receiving a modified RTS frame or SYN frame sent from AP on L1, non-AP STAs response SYN frame either after an IFS time or immediately in different frequency slots on L1. The SYN indicates the BO value of other affiliated station of the same MLD that is counting down on L2.

The apparatus or method of any preceding implementation, wherein in MLO systems, the NSTR MLDs could cooperate with each other to share partial of its TXOP (if available) to others or join others' shared TXOP to reduce the contention and competition for channel access for all cooperating MLDs. The application of shared TXOP should reduce the delay caused by channel contention and especially benefit for improving the worst-case performance.

The apparatus or method of any preceding implementation, wherein operating shared TXOP in MLD level, stations affiliated with the same NSTR MLD on different links of a NSTR link pair shall perform synchronized transmission and reception and, thus, shall not experience IDC interference in any single NSTR MLD.

The apparatus or method of any preceding implementation, wherein the shared TXOP in MLD level shall be initiated as long as all links of the NSTR link pair are gained by stations that not necessarily affiliate with the same NSTR MLD (i.e., shared TXOP holder MLD).

The apparatus or method of any preceding implementation, wherein simultaneous channel access over multiple NSTR links at MLD level accelerates access by eliminating the limitation that channel accesses over multiple links have to be obtained by the stations from the same MLD.

The apparatus or method of any preceding implementation, wherein if multi-link channel access are obtained by different STAs from different MLDs, synchronization among the MLDs is needed to determine the MLD to access multi-links.

The apparatus or method of any preceding implementation, wherein in order to efficiently utilize the time gap between one link of a NSTR link pair has been obtained until all links of the NSTR link pair have been gained, several methodologies are proposed to improve channel utilization efficiency over multiple NSTR links.

The apparatus or method of any preceding implementation, wherein if one link (L1) of the NSTR link pair is obtained by a STA and the other link (L2) of the NSTR link pair is not gained by any other STAs, only the STA has the smallest BO value should continue counting down over L2 and the other stations from different MLDs shall utilize this BO period to transmit PPDU over L1.

The apparatus or method of any preceding implementation, wherein the modified RTS frame is transmitted on L1 by the station wins channel access of L1, with indicating BO value of other affiliated station of the same NSTR MLD on L2.

The apparatus or method of any preceding implementation, wherein the AP broadcasts a SYN frame on L1 to indicate the received latest BO value counting down on L2.

The apparatus or method of any preceding implementation, wherein after receiving a modified RTS frame or SYN frame sent from AP on L1, non-AP STAs response SYN frame either after an IFS time or immediately in different frequency slots on L1. The SYN indicates the BO value of other affiliated station of the same MLD that is counting down on L2.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit, as a wireless station (STA) operating as either an Access Point (AP) or a non-AP STA within a multi-link device (MLD) which is either capable of simultaneous transmit and receive (STR) in an STR MLD or an MLD which is not capable of simultaneous transmit and receive as a NSTR MLD, wherein the STR MLD or NSTR MLD is configured for wirelessly communicating with other wireless stations (STAs) in performing a multi-link operation (MLO) on a wireless local area network (WLAN) to share a transmit opportunity (TXOP);
   (b) a processor coupled to said wireless communication circuit for operating on the WLAN as a STA;
   (c) a non-transitory memory storing instructions executable by the processor for communicating with other STAs; and
   (d) wherein said instructions, when executed by the processor, perform one or more steps comprising:
      (i) obtaining a transmit opportunity (TXOP) for a first link of a link pair within a multi-link operation (MLO) by a STA or AP of a first NSTR MLD;
      (ii) determining a backoff count value for a STA or AP contending for a second link of the NSTR link pair with a lowest backoff count value of all STAs or APs contending for said second link, whether it be said first NSTR MLD or another MLD;

(iii) wherein said determining said lowest backoff count value by STAs and/or APs which do not have the lowest count value in contending for said second link, is performed comprising: (A) communicating a modified ready to send (RTS) frame by the STA or AP of said first NSTR MLD which has received said transmit opportunity (TXOP) for said first link, wherein said modified ready to send (RTS) frame includes backoff count information for both links of said first NSTR MLD; and (B) communicating synchronization frames (SYN) between STAs and/or APs on said first link in collecting backoff count values for said second link from STAs and/or APs;

(iv) stopping backoff counting on STAs and/or APs which do not have the lowest count value in contending for said second link;

(v) performing one or more data transmissions between STAs and/or APs on said first link, in a time gap prior to a shared TXOP process, if sufficient time remains within said lowest backoff count value; and (vi) starting a shared TXOP process on both said first link and said second link, when said lowest backoff count value has reached a terminal count.

2. The apparatus of claim 1, wherein said shared TXOP is performed at an MLD level and is initiated after both links of the NSTR link pair are obtained by stations which do not need to be affiliated with the same NSTR MLD.

3. The apparatus of claim 1, wherein if both links of the NSTR link pair are obtained by stations which are not part of the same NSTR MLD, then said instructions when executed by the processor perform steps further comprising performing synchronization between MLDs.

4. The apparatus of claim 1, wherein said stopping backoff counting on STAs and/or APs which do not have the lowest count value in contending for said second link, is performed by said instructions when executed by the processor further comprising broadcasting a frame containing transmit request information, referred to as a transmit request (TX_req) frame, which provides indications on which STAs should continue counting and which should pause or stop their counting.

5. The apparatus of claim 4, wherein said one or more data transmissions between STAs and/or APs on said first link is performed by said instructions when executed by the processor further comprising broadcasting said TX_req which includes directions for data transmissions to be performed.

6. The apparatus of claim 1, wherein said shared TXOP is performed at an MLD level, in which stations affiliated with the same NSTR MLD on different links of a NSTR link pair perform synchronized transmission and reception toward eliminating in-device coexistence (IDC) interference in any single NSTR MLD.

7. The apparatus of claim 1, wherein said apparatus is configured for performing said data transmissions in the time gap prior to the shared TXOP process toward reducing channel contention delay and improved throughput performance.

8. The apparatus of claim 1, wherein said instructions when executed by the processor further perform steps comprising determining which AP or non-AP MLD is to operate as a shared TXOP holder at the MLD level to avoid in-device coexistence (IDC) interference in any single NSTR MLD.

9. The apparatus of claim 8, wherein determining which AP or non-AP MLD is to operate as a shared TXOP holder at the MLD level, is performed by said instructions when executed by the processor comprising:

(a) determining if said first link and said second link were obtained by stations on a same MLD, then that MLD is selected as the shared TXOP holder MLD;

(b) determining if said first link and said second link were obtained by stations on different MLDs, then performing steps comprising:
  (i) allowing an AP MLD to perform as the shared TXOP holder MLD by directly initiating the shared TXOP process; or
  (ii) allowing a non-AP MLD whose station obtained said second link to be the shared TXOP holder MLD.

10. The apparatus of claim 9, wherein starting said shared TXOP process is performed by said instructions when executed by the processor comprising stations of the shared TXOP holder MLD initiating the share TXOP process upon each station of the shared TXOP holder MLD receiving a clear-to-send (CTS) frame.

11. The apparatus of claim 10, wherein said CTS frames are received from AP stations in response to receipt of previous sent modified RTS frames.

12. The apparatus of claim 1, wherein said MLD is operating under IEEE 802.11.

13. The apparatus of claim 1, wherein said apparatus is configured to provide enhanced distributed channel access (EDCA) having more than one access category (AC).

14. An apparatus for wireless communication in a network, the apparatus comprising:

(a) a wireless communication circuit, as a wireless station (STA) operating as either an Access Point (AP) or a non-AP STA within a multi-link device (MLD) which is either capable of simultaneous transmit and receive (STR) in an STR MLD or an MLD which is not capable of simultaneous transmit and receive as a NSTR MLD, wherein the STR MLD or NSTR MLD is configured for wirelessly communicating with other wireless stations (STAs) in performing a multi-link operation (MLO) on a wireless local area network (WLAN) to share a transmit opportunity (TXOP);

(b) a processor coupled to said wireless communication circuit for operating on the WLAN as a STA;

(c) a non-transitory memory storing instructions executable by the processor for communicating with other STAs; and (d) wherein said instructions, when executed by the processor, perform one or more steps comprising:
  (i) determining which AP or non-AP MLD is to operate as a shared TXOP holder at the MLD level to avoid in-device coexistence (IDC) interference in any single NSTR MLD, comprising: comprising: (A) determining if said first link and said second link were obtained by stations on a same MLD, then that MLD is selected as the shared TXOP holder MLD; (B) determining if said first link and said second link were obtained by stations on different MLDs, then performing steps comprising: (1) allowing an AP MLD to perform as the shared TXOP holder MLD by directly initiating the shared TXOP process; or (2) allowing a non-AP MLD whose station obtained said second link to be the shared TXOP holder MLD;
  (ii) obtaining a transmit opportunity (TXOP) for a first link of a link pair within a multi-link operation (MLO) by a STA or AP of a first NSTR MLD, while a second link of said link pair has not been obtained by any other stations;
  (iii) communicating backoff count value information within a modified ready-to-send (RTS) message between STAs and/or APs by the wireless station obtaining the transmit opportunity (TXOP) for said first link of a link pair;

(iv) receiving said modified RTS message by a wireless station operating as an AP station which broadcasts a message containing synchronization information, as a SYN frame, on said first link which indicates the latest received backoff count values for the second link;

(v) receiving said SYN frame by non-AP stations which respond with a SYN frame, either immediately after a SIFS slot in different frequency slots or after an IFS time period, on said first link;

(vi) determining, by the wireless station operating as the AP on said first link which receives said SYN frames from the non-AP stations, which station has the smallest backoff count value of the stations contending for said second link;

(vii) determining if sufficient time is available for performing one or more transmissions during a gap time which is the determined time for the smallest backoff count value of the stations contending for said second link to complete counting;

viii) transmitting a frame containing transmission information, as a TX_req frame, from the AP on which stations are to continue counting and which stations are to pause their counting on said second link, and to instruct stations to perform transmission on said first link if the gap time is determined to be sufficient;

(ix) starting a shared TXOP process on both said first link and said second link, when said lowest backoff count value on said second link has reached a terminal count; and (x) wherein starting said shared TXOP process is performed by said instructions when executed by the processor comprising stations of the shared TXOP holder MLD initiating the share TXOP process upon each station of the shared TXOP holder MLD receiving a clear-to-send (CTS) frame.

15. The apparatus of claim 14, wherein said IFS time period is determined as proportional to the backoff counting value of the station on said second link who is affiliated with the same MLD as the STA receiving the said SYN frame.

16. The apparatus of claim 14, wherein said CTS frames are received from AP stations in response to receipt of previous sent modified RTS frames.

17. The apparatus of claim 14, wherein said MLD is operating under IEEE 802.11.

18. The apparatus of claim 14, wherein said apparatus is configured to provide enhanced distributed channel access (EDCA) having more than one access category (AC).

19. An apparatus for wireless communication in a network, the apparatus comprising:

(a) a wireless communication circuit, as a wireless station (STA) operating as either an Access Point (AP) or a non-AP STA within a multi-link device (MLD) which is either capable of simultaneous transmit and receive (STR) in an STR MLD or an MLD which is not capable of simultaneous transmit and receive as a NSTR MLD, wherein the STR MLD or NSTR MLD is configured for wirelessly communicating with other wireless stations (STAs) in performing a multi-link operation (MLO) on a wireless local area network (WLAN) to share a transmit opportunity (TXOP);

(b) a processor coupled to said wireless communication circuit for operating on the WLAN as a STA;

(c) a non-transitory memory storing instructions executable by the processor for communicating with other STAs; and (d) wherein said instructions, when executed by the processor, perform one or more steps comprising:

(i) determining which AP or non-AP MLD is to operate as a shared TXOP holder at the MLD level to avoid in-device coexistence (IDC) interference in any single NSTR MLD, comprising: (A) determining if said first link and said second link were obtained by stations on a same MLD, then that MLD is selected as the shared TXOP holder MLD; (B) determining if said first link and said second link were obtained by stations on different MLDs, then performing steps comprising: (1) allowing an AP MLD to perform as the shared TXOP holder MLD by directly initiating the shared TXOP process; or (2) allowing a non-AP MLD whose station obtained said second link to be the shared TXOP holder MLD;

(ii) obtaining a transmit opportunity (TXOP) for a first link of a link pair within a multi-link operation (MLO) by a STA or AP of a first NSTR MLD;

(iii) determining a backoff count value for a STA or AP contending for a second link of the NSTR link pair with a lowest backoff count value of all STAs or APs contending for said second link, whether it be said first NSTR MLD or another MLD;

(iv) stopping backoff counting on STAs and/or APs which do not have the lowest count value in contending for said second link;

(v) performing one or more data transmissions between STAs and/or APs on said first link, in a time gap prior to a shared TXOP process, if sufficient time remains within said lowest backoff count value; and (vi) starting a shared TXOP process on both said first link and said second link, when said lowest backoff count value has reached a terminal count and wherein starting said shared TXOP process is performed by said instructions when executed by the processor comprising stations of the shared TXOP holder MLD initiating the share TXOP process upon each station of the shared TXOP holder MLD receiving a clear-to-send (CTS) frame.

20. The apparatus of claim 19, wherein said shared TXOP is performed at an MLD level and is initiated after both links of the NSTR link pair are obtained by stations which do not need to be affiliated with the same NSTR MLD.

21. The apparatus of claim 19, wherein if both links of the NSTR link pair are obtained by stations which are not part of the same NSTR MLD, then said instructions when executed by the processor perform steps further comprising performing synchronization between MLDs.

22. The apparatus of claim 19, wherein said determining said lowest backoff count value by STAs and/or APs which do not have the lowest count value in contending for said second link, is performed by said instructions when executed by the processor further comprising:

(a) communicating a modified ready to send (RTS) frame by the STA or AP of said first NSTR MLD which has received said transmit opportunity (TXOP) for said first link, wherein said modified ready to send (RTS) frame includes backoff count information for both links of said first NSTR MLD; and (b) communicating synchronization frames (SYN) between STAs and/or APs on said first link in collecting backoff count values for said second link from STAs and/or APs.

23. The apparatus of claim 19, wherein said stopping backoff counting on STAs and/or APs which do not have the lowest count value in contending for said second link, is performed by said instructions when executed by the processor further comprising broadcasting a frame containing transmit request information, referred to as a transmit request (TX_req) frame, which provides indications on which STAs should continue counting and which should pause or stop their counting.

24. The apparatus of claim 23, wherein said one or more data transmissions between STAs and/or APs on said first link is performed by said instructions when executed by the processor further comprising broadcasting said TX_req which includes directions for data transmissions to be performed.

25. The apparatus of claim 19, wherein said shared TXOP is performed at an MLD level, in which stations affiliated with the same NSTR MLD on different links of a NSTR link pair perform synchronized transmission and reception toward eliminating in-device coexistence (IDC) interference in any single NSTR MLD.

26. The apparatus of claim 19, wherein said apparatus is configured for performing said data transmissions in the time gap prior to the shared TXOP process toward reducing channel contention delay and improved throughput performance.

27. The apparatus of claim 19, wherein said CTS frames are received from AP stations in response to receipt of previous sent modified RTS frames.

28. The apparatus of claim 19, wherein said MLD is operating under IEEE 802.11, and configured to provide enhanced distributed channel access (EDCA) having more than one access category (AC).

* * * * *